United States Patent [19]

Schrenk et al.

[11] 4,091,550
[45] May 30, 1978

[54] AUTOMATED INSTRUCTIONAL APPARATUS AND METHOD

[75] Inventors: Lorenz P. Schrenk; James R. Datta, both of Minneapolis; David G. Alden, Brooklyn Center, all of Minn.

[73] Assignee: Honeywell Inc., Minneapolis, Minn.

[21] Appl. No.: 713,261

[22] Filed: Aug. 10, 1976

Related U.S. Application Data

[63] Continuation of Ser. No. 508,997, Sep. 25, 1974, abandoned.

[51] Int. Cl.² ........................................... G09B 23/18
[52] U.S. Cl. .................................................... 35/19 A
[58] Field of Search ............... 35/8 R, 8 A, 9 R, 9 A, 35/9 B, 9 C, 10, 13, 19 A, 48 R; 235/184; 340/324 AD; 364/200, 900

[56] References Cited

U.S. PATENT DOCUMENTS

| | | | |
|---|---|---|---|
| 3,071,876 | 1/1963 | Swanberg | 35/19 A |
| 3,077,038 | 2/1963 | Williams et al. | 35/9 B |
| 3,154,862 | 11/1964 | Culpepper | 35/9 R |
| 3,310,883 | 3/1967 | Young | 35/10 |
| 3,477,142 | 11/1969 | Cornell et al. | 35/9 A |
| 3,541,699 | 11/1970 | Baker | 35/9 A |
| 3,584,396 | 6/1971 | Hannah et al. | 35/9 A |
| 3,604,128 | 9/1971 | Homann | 35/13 |
| 3,823,490 | 7/1974 | Konik et al. | 35/10 |
| 3,832,790 | 9/1974 | Fryer et al. | 35/8 R |

OTHER PUBLICATIONS

*Honeywell Technical Bulletin;* "Model S-50 Graphic CRT Display System;" Honeywell Marine Systems Center; 1971.

*Primary Examiner*—Richard C. Pinkham
*Assistant Examiner*—Vance Y. Hum
*Attorney, Agent, or Firm*—Allegretti, Newitt, Witcoff & McAndrews

[57] ABSTRACT

The disclosure describes a computer-aided instructional system for teaching a student to trouble-shoot a piece of equipment, such as a radio receiver, with a tester, such as a volt-ohm meter (VOM). In order to achieve this result, the receiver and VOM are simulated by non-operating components which are controlled by the computer to respond as if they were fully operative and functioning devices. A computer-operated display presents instructions to the student and monitors the student's responsive use of the simulated receiver and VOM. Additional instructions are selected for display depending on the nature of the student's responses. In this way, the student learns to analyze the equipment by proper use of the tester.

22 Claims, 9 Drawing Figures

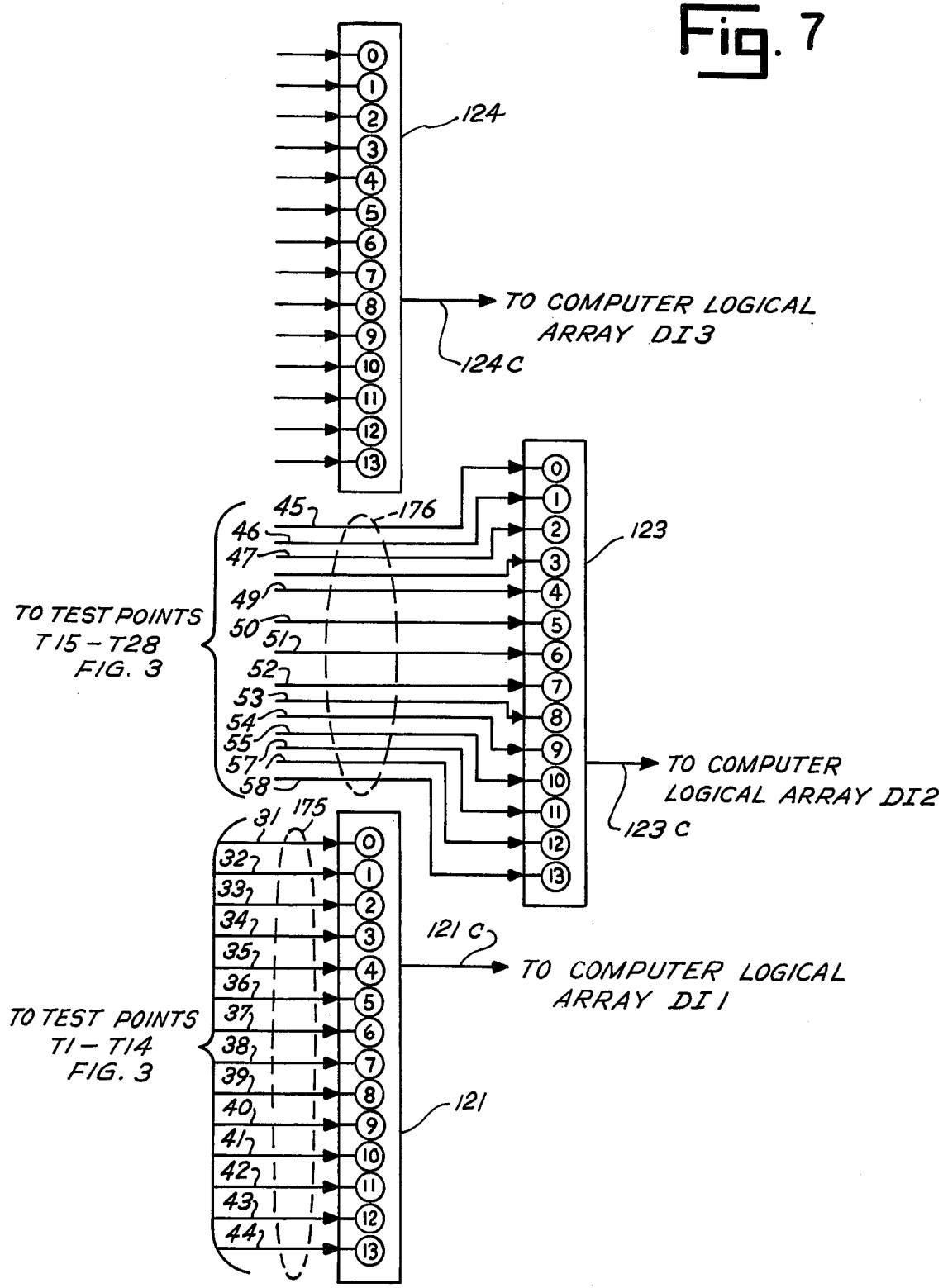

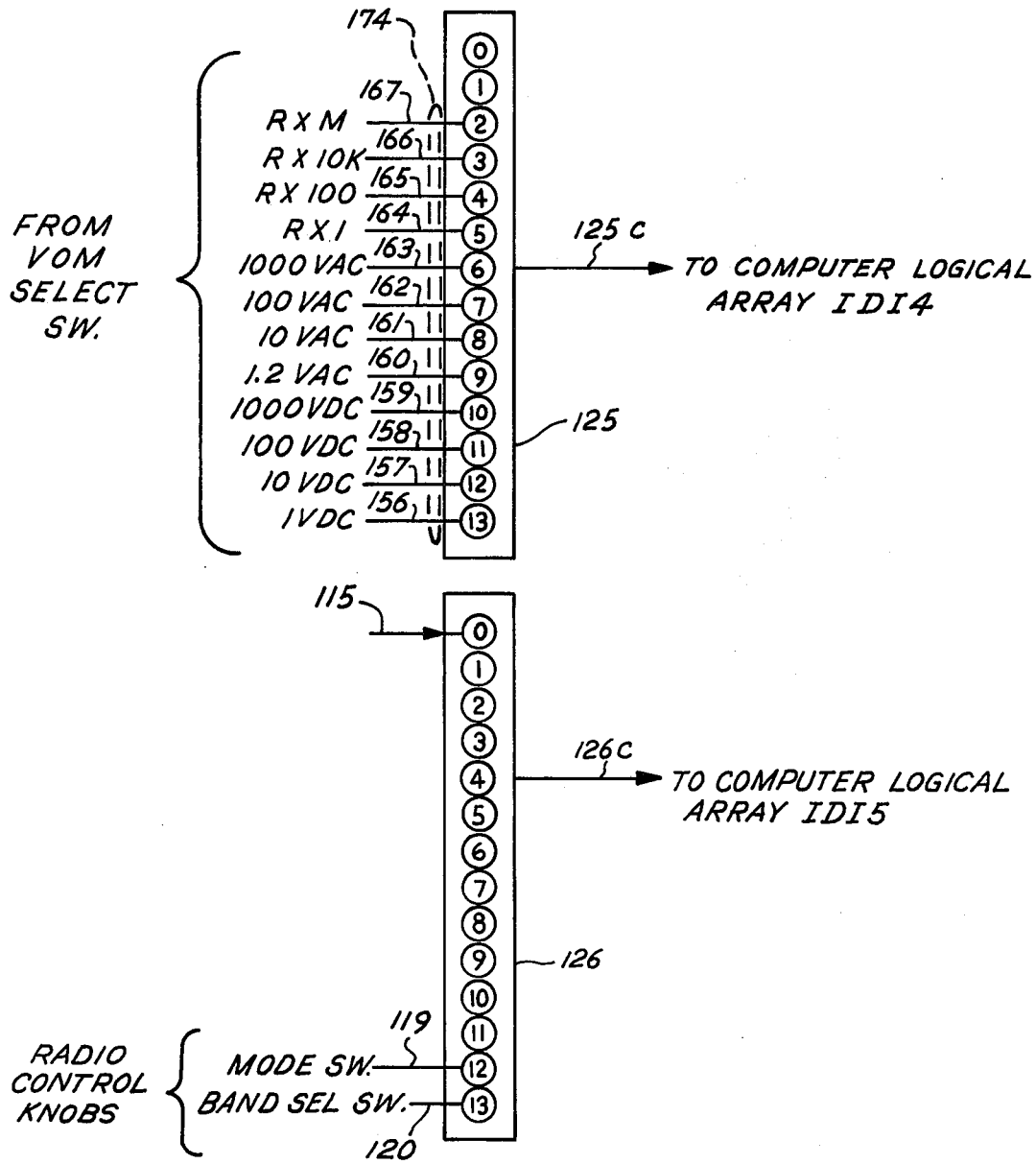

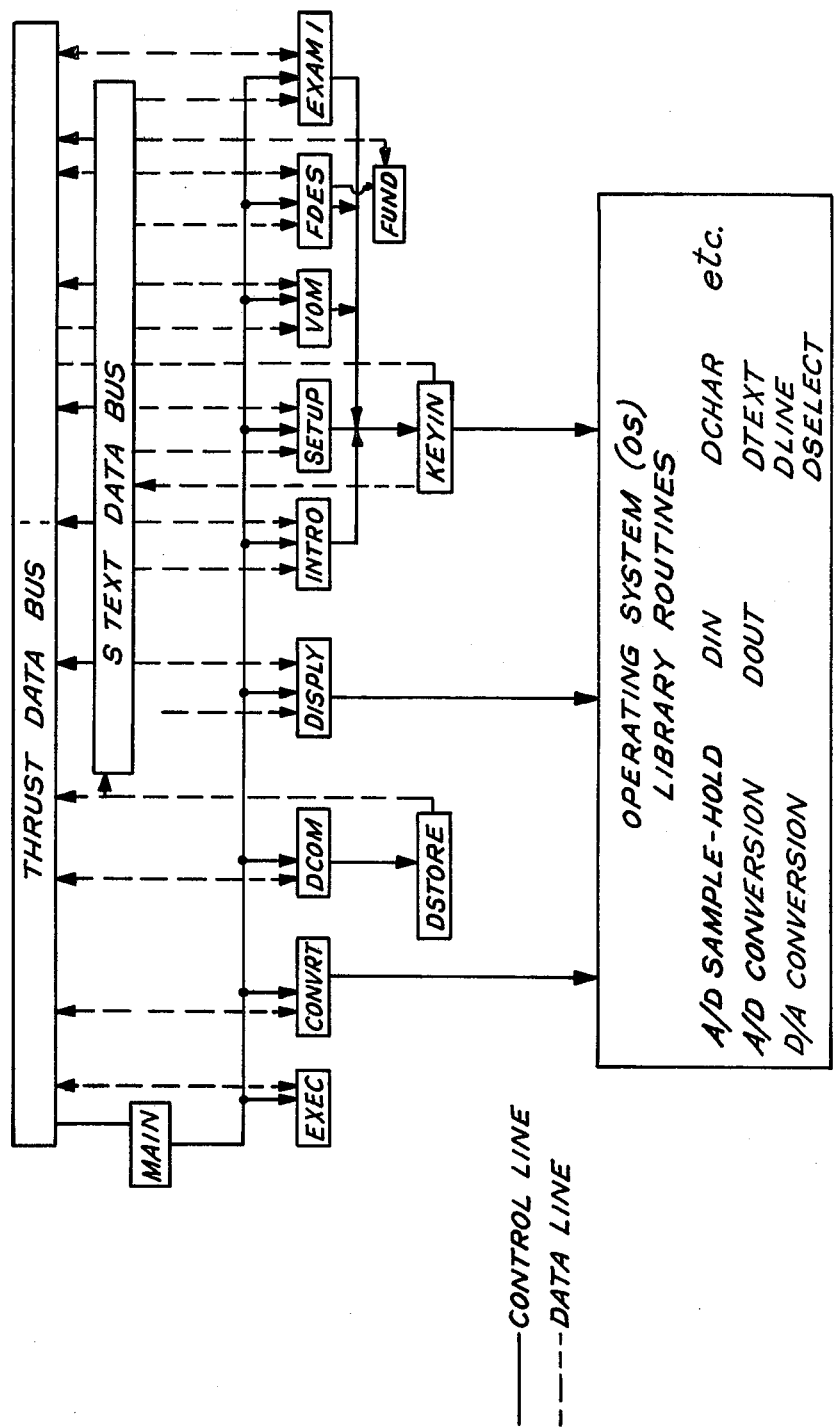

AUTOMATED INSTRUCTIONAL APPARATUS AND METHOD

This is a continuation of application Ser. No. 508,997, filed Sept. 25, 1974, now abandoned.

BACKGROUND AND SUMMARY OF THE INVENTION

This invention relates to instructional systems and more particularly relates to automated systems for sequentially presenting instructions to a student.

Automated devices for presenting instructions to students and for monitoring their responses have been devised in the past. Although these systems have been adequate to teach purely intellectual or abstract reasoning skills, experience has shown that they are inadequate to teach psychomotor skills needed for the trouble-shooting, repair or maintenance of complicated devises, such as electronics equipment. In order to improve psychomotor skills of the type needed to handle electronics equipment, the student must be given the "hands-on" experience of actually working with the equipment. This requirement leads to substantial difficulties if large numbers of students must be trained on large, complex electronics systems. Typically, the systems are not available in sufficient quantity to provide each student with his own piece of equipment and the systems are too valuable, delicate or dangerous to place in the hands of a novice.

In order to overcome these difficulties, the applicants have invented an improved system for teaching a student to evaluate equipment, such as a radio receiver, having a plurality of points normally maintained at predetermined conditions, such as particular DC voltages, by means of a tester, such as a volt-ohm meter (VOM), capable of indicating point conditions sensed by a probe connected to the tester.

In accordance with a principal feature of the invention, the equipment being taught is simulated by inexpensive, nonoperating components. For example, in the case of a radio receiver, the outer case, control knobs and printed circuit boards holding the electrical chassis are provided, but the electronic chassis is omitted. The tester is also simulated. For example, if the tester is a VOM, the outer case, control knobs and indicating meter are provided, but the electronic chassis is omitted.

A test point data storage device, such as a digital memory, stores digital test point condition signals which represent a simulated condition at preselected test points of the simulated equipment, for example, conductors between components and conductors connected to control knobs, indicator lamps and the like. Likewise, probe detection storage means store a digital test point identification signal which represents the test point of the simulated equipment communicated with by the detector of the simulated tester. Instruction means, such as a scope display unit, present instructions and questions to the student.

A data processing device, such as a general purpose digital computer, controls the presentation of the instructions to the student and monitors the student's responsive use of the simulated equipment and tester. For example, in response to a request to place the detector on a particular test point, the data processing means scans the detection storage means to determine which test point, if any, is touched by the detector. The digital test point condition signal corresponding to the touched test point is then obtained from the test point storage device, and a tester indicating signal corresponding to the fetched digital test point condition signal is generated and transmitted to the simulated tester. If the tester simulates a VOM, the display signal causes the needle of the meter in the simulated VOM to indicate a voltage corresponding to the actual voltage which would be encountered in a real piece of equipment, such as a radio receiver, at the test point touched by the detector. In addition, the instruction means, such as the scope display unit, can highlight on the circuit schematic the desired test point location and can outline on the circuit schematic the test point actually touched by the probe. This permits the student to relate the functional electrical operations, illustrated by the circuit schematic, and the actual physical location of the components and test points on the circuit board.

According to another feature of the invention, the test point storage device is capable of storing different test point condition signals for each test point. By use of this technique, the invention can simulate both normal equipment operation and operation while certain components of the equipment have failed. Thus, the student is able to learn trouble-shooting under controlled equipment failure conditions without the necessity for actually placing inoperative components in the equipment.

A system of the foregoing type offers a number of advantages. Since there is a direct electronic link between the data processing means and the simulated equipment and tester, the data processing means can continuously monitor the reaction of the student to any instruction requiring him to use the tester or simulated equipment. The ability of the applicants' system to continually monitor the student's performance and responses makes the system virtually "cheat" proof.

The applicants' system also gives the student hands-on experience which accurately simulates the training received on real pieces of equipment using real testers. However, since the applicants' simulated equipment and testers employ low voltages and current values, there is no danger that either the student or the equipment will be harmed or rendered inoperative by any mistake of the student. This feature offers a substantial cost saving over the use of actual equipment for training purposes. When real equipment is utilized, a mistake by a novice or careless student could destroy or seriously damage the equipment. Such equipment is generally costly and time-consuming to repair, and the training procedure is interrupted until the repair is completed. Furthermore, introduction of faulty components for practice in malfunction diagnosis often causes other components in the operating circuit to be damaged. Then, even if the device continues to operate, the student is precluded from observing properly functioning equipment.

The applicants' invention also increases the safety of the student. Many types of electronic equipment employ high voltages or high currents which are harmful, if not fatal. By using simulated equipment of the type described, the voltage levels are low and undetectable to the touch of the student.

The applicants' system also is adaptable for use by large numbers of students in geographically separated classrooms. However, even when the system is used for such group teaching techniques, each student is free to choose his own instructional sequence and to proceed individually at his own pace through the sequence of instructions.

DESCRIPTION OF THE DRAWINGS

These and other advantages and features of the present invention will appear in connection with the accompanying drawings wherein:

FIG. 7 is an enlarged, electrical schematic drawing of a portion of the hybrid link illustrated in FIG. 6;

FIG. 8 is an enlarged, electrical schematic drawing of another portion of the hybrid link illustrated in FIG. 6; and FIG. 9 is a block diagram of a preferred form of software system used in connection with the training system shown in FIG. 6.

DESCRIPTION OF THE PREFERRED EMBODIMENT

Figure 1:
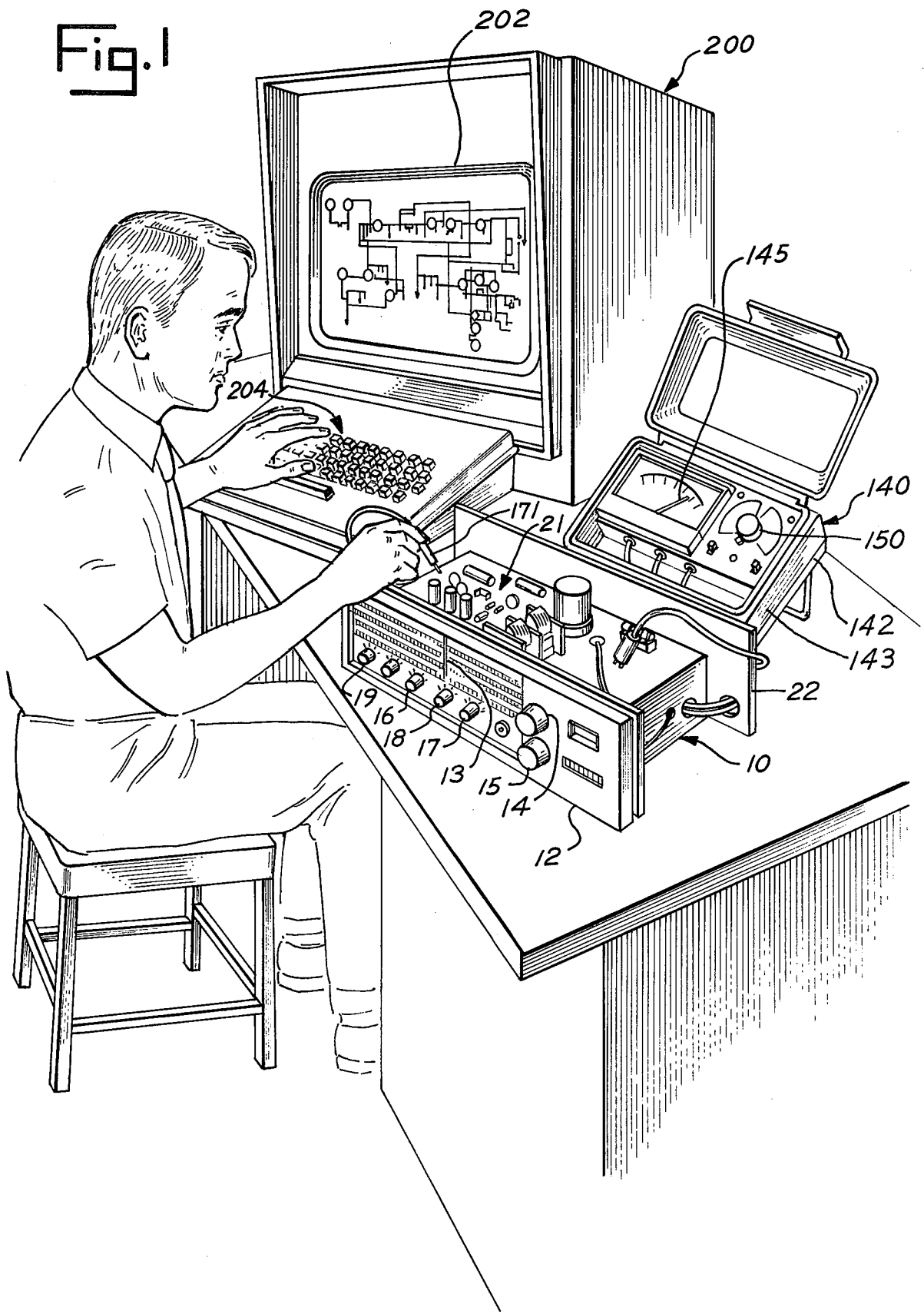
FIG. 1 is an isometric view of a preferred form of student station made in accordance with the present invention, including an exemplary simulated shortwave radio receiver, an exemplary simulated volt-ohm meter, a CRT display, and keyboard input.
Figure 2:
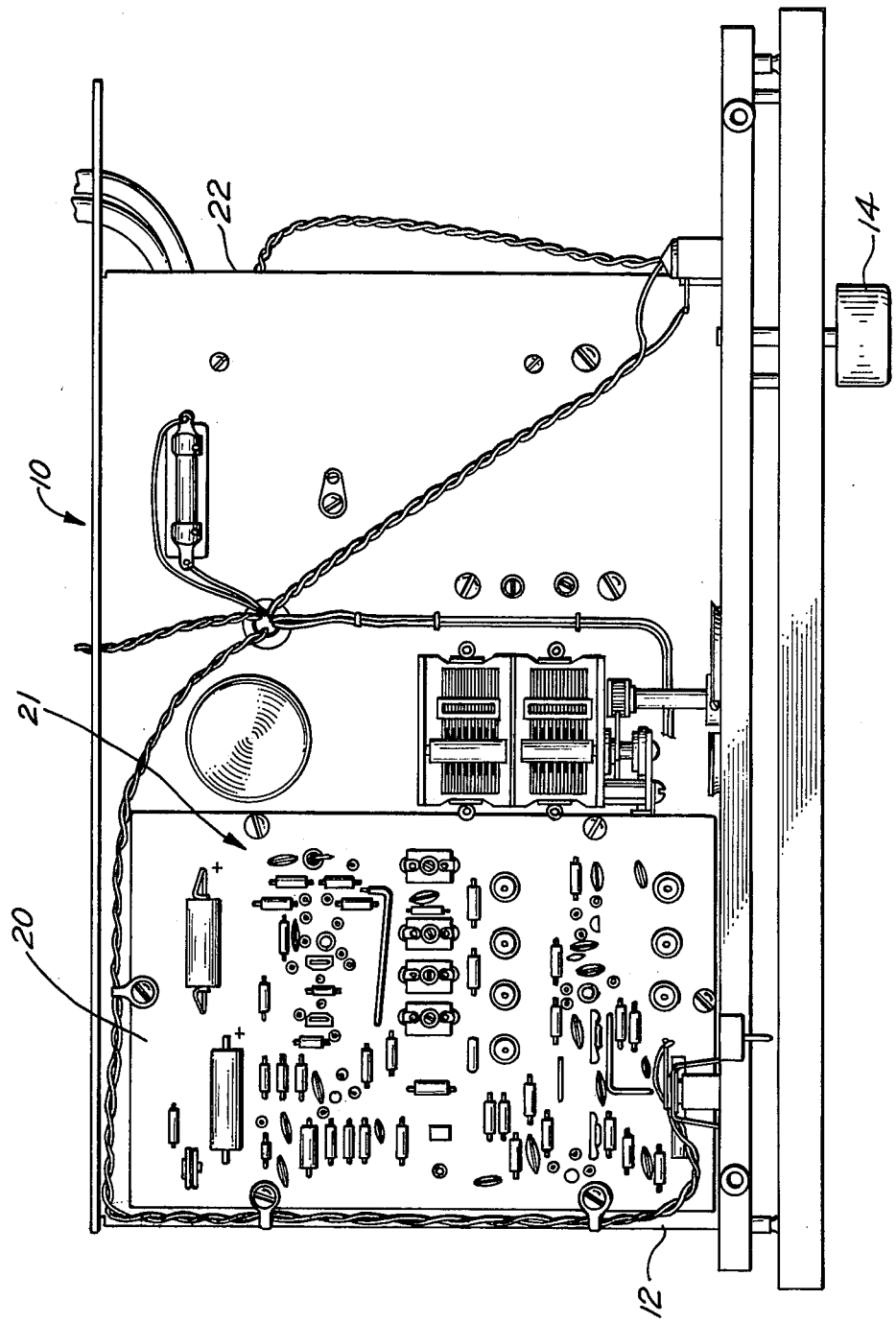
FIG. 2 is a top plan view of the radio receiver shown in FIG. 1.

Referring to the drawings, a preferred form of computer-aided training system made in accordance with the present invention basically comprises a simulated piece of electronic equipment 10, a simulated piece of test equipment 140, a data processor 180, a hybrid link 190, a display and keyboard unit 200 and a software system used in connection with the data processor.

More specifically, referring to FIGS. 1-4, simulated electronic equipment 10 comprises a shortwave radio receiver 12 with parts of the normal chassis removed. The simulated receiver includes a tuning indicator 13, a tuning dial 14, a volume dial 15, a beat frequency oscillator (BFO) dial 16, a mode selector dial 17, a band selector dial 18 and an on-off dial 19. The receiver also includes a printed circuit board 20 which supports simulated components 21 on a frame 22. Of course, the components may be actual instead of simulated. However, since no power is applied to the components, they remain inoperative in any case.

Figure 3:
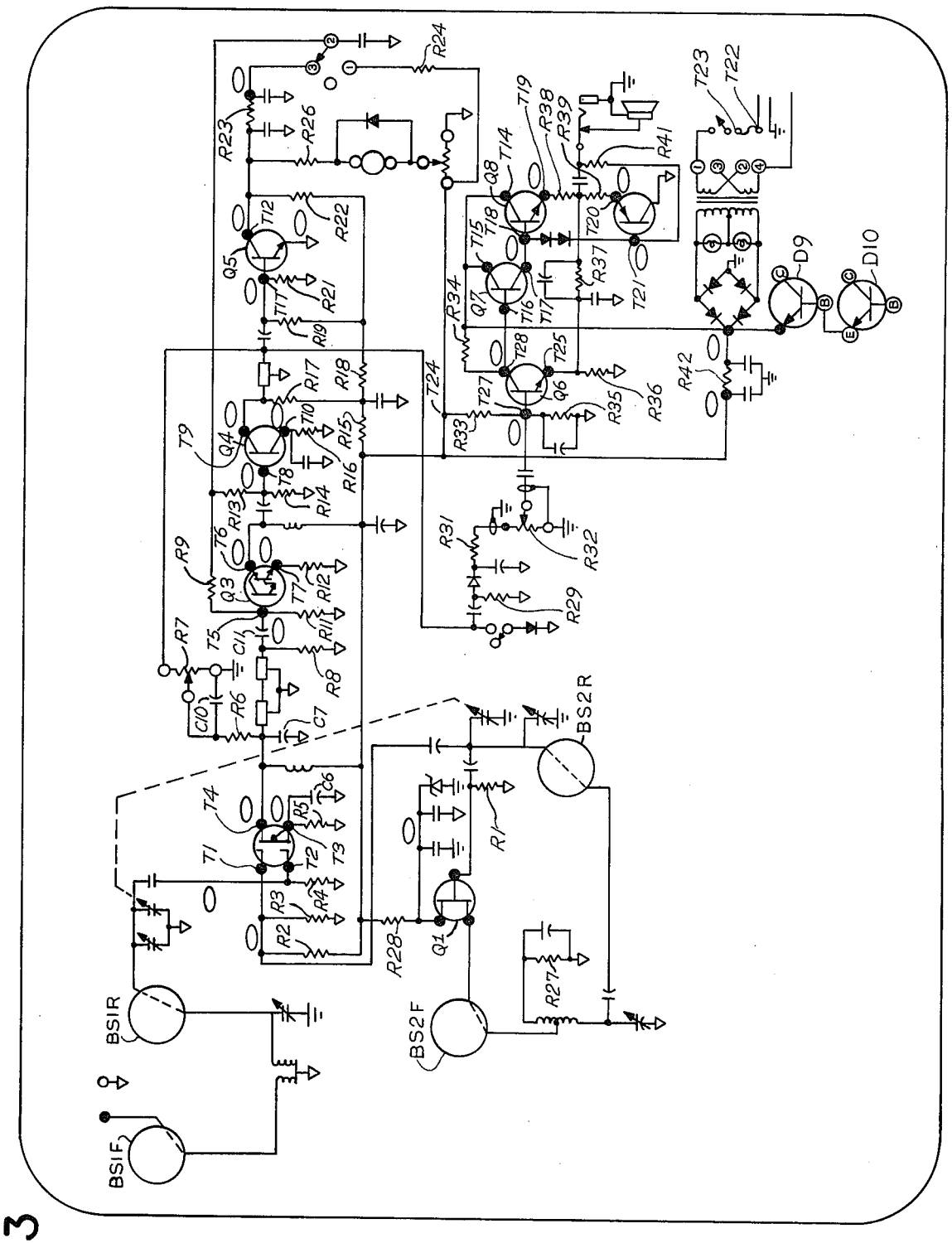
FIG. 3 is an electrical schematic diagram that is shown to the student on the CRT display of the student station shown in FIG. 1.
Figure 6:
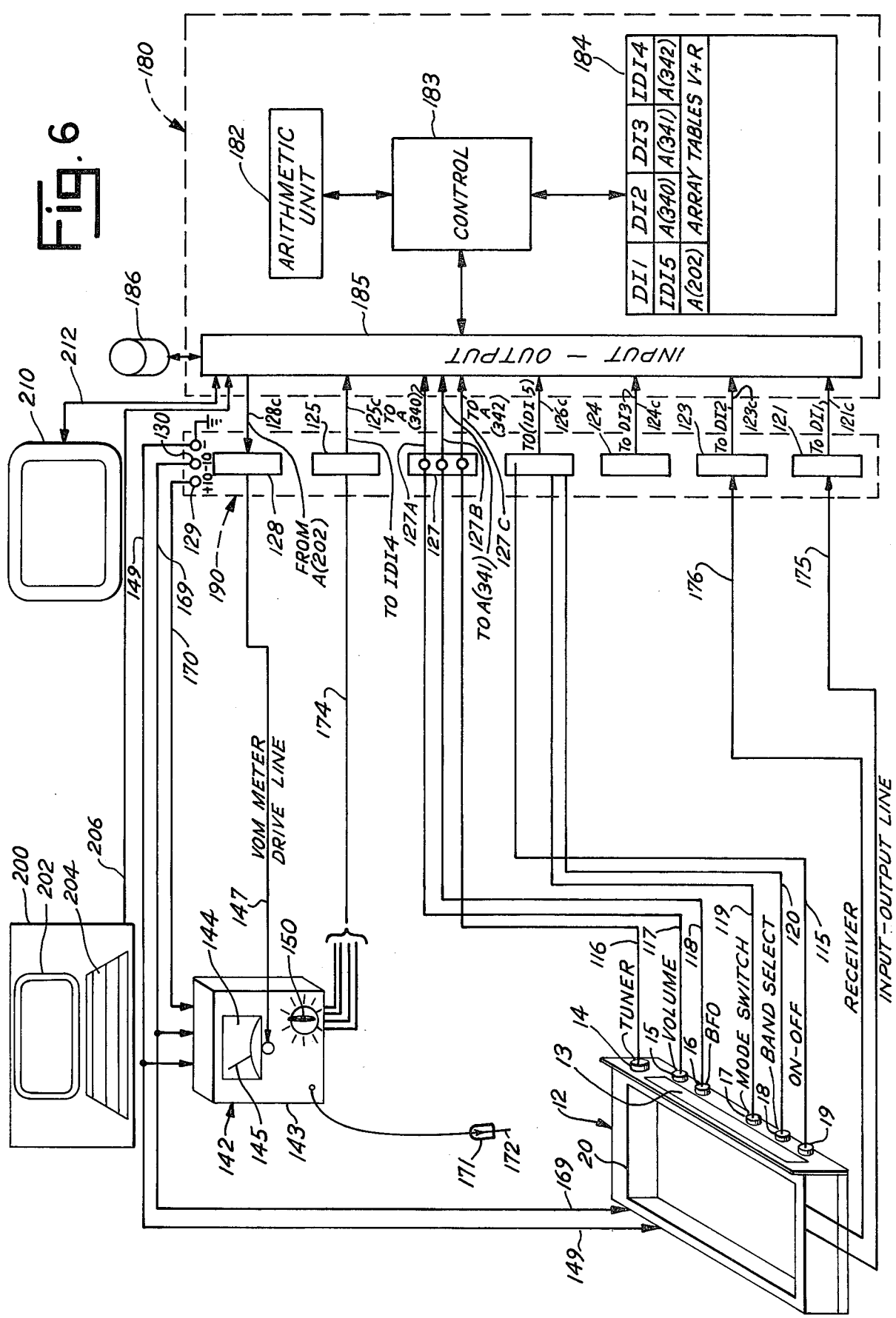
FIG. 6 is a block diagram of a preferred form of computer-aided training system made in accordance with the present invention.

Referring to FIGS. 3, 6 and 7, multiple conductors are connected to defined test points of the receiver components. More specifically, test points T1-T12 are connected to conductors 31-42, respectively; test points T14-T17 are connected to conductors 44-47, respectively; test point T18 is also connected to conductor 47; test points T19-T25 are connected to conductors 49-55, respectively; and test points T27, T28 are connected to conductors 57, 58, respectively. Receiver 12 includes simulated resistors R1-R19, R21-R29, R31-R39, and R41, R42; rotary switches BS1F, BS1R, RS2F and BS2R; and transistors Q1-Q9, D9 and D10.

Figure 4:
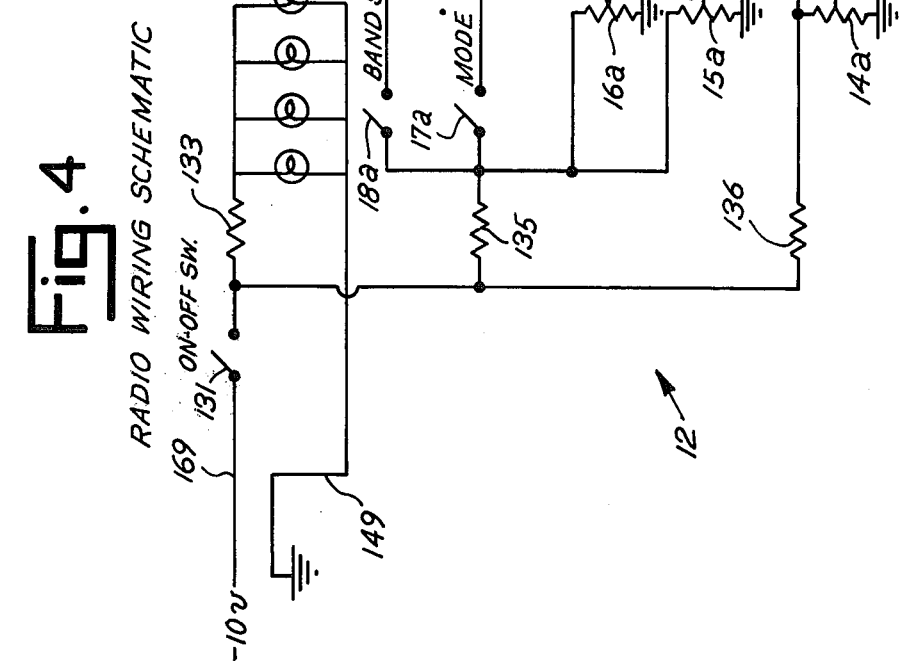
FIG. 4 is an electrical schematic diagram illustrating a portion of the simulated radio receiver shown in FIG. 1.

Referring to FIGS. 4 and 6, -10 volts is supplied to simulated receiver 12 through a conductor 169, and ground potential voltage is supplied to receiver 12 through a conductor 149. The voltage on conductor 169 is applied to additional circuitry in the receiver through an on-off switch 131 (FIG. 4) which is controlled by on-off dial 19. For example, the voltage is applied to a series of indicator bulbs 132 through a resistor 133.

When switch 131 is closed, -10 volts is also supplied through a resistor 135 to switches 17A, 18A and potentiometers 15A and 16A. The operation of switches 17A and 18A is controlled by mode selector dial 17 and band selector dial 18, respectively. The operation of potentiometers 15A and 16A is controlled by volume dial 15 and BFO dial 16, respectively. The switches and potentiometers are connected to conductors 117-120 in the manner shown in FIG. 4. These conductors act as test points for detecting the condition or state of the control knobs 17-20.

When switch 131 is closed, 10 volts also is supplied through a resistor 136 to a potentiometer 14A controlled by tuning dial 14. A conductor 116 is connected to potentiometer 14A and another conductor 115 is connected to resistor 136 in the manner shown in order to test whether switch 131 is in the on or off position. Thus, conductors 115 and 116 are test points for determining the condition or state of tuner dial 14 and switch 131.

Of course, simulated equipment 10 can simulate different features from different actual pieces of equipment. For example, the mixer circuit from one radio and the detector circuit from another radio can be simulated by the same piece of simulated equipment, so that the student can learn different types of radio circuits existing in different radios from a single piece of simulated equipment.

Figure 5:
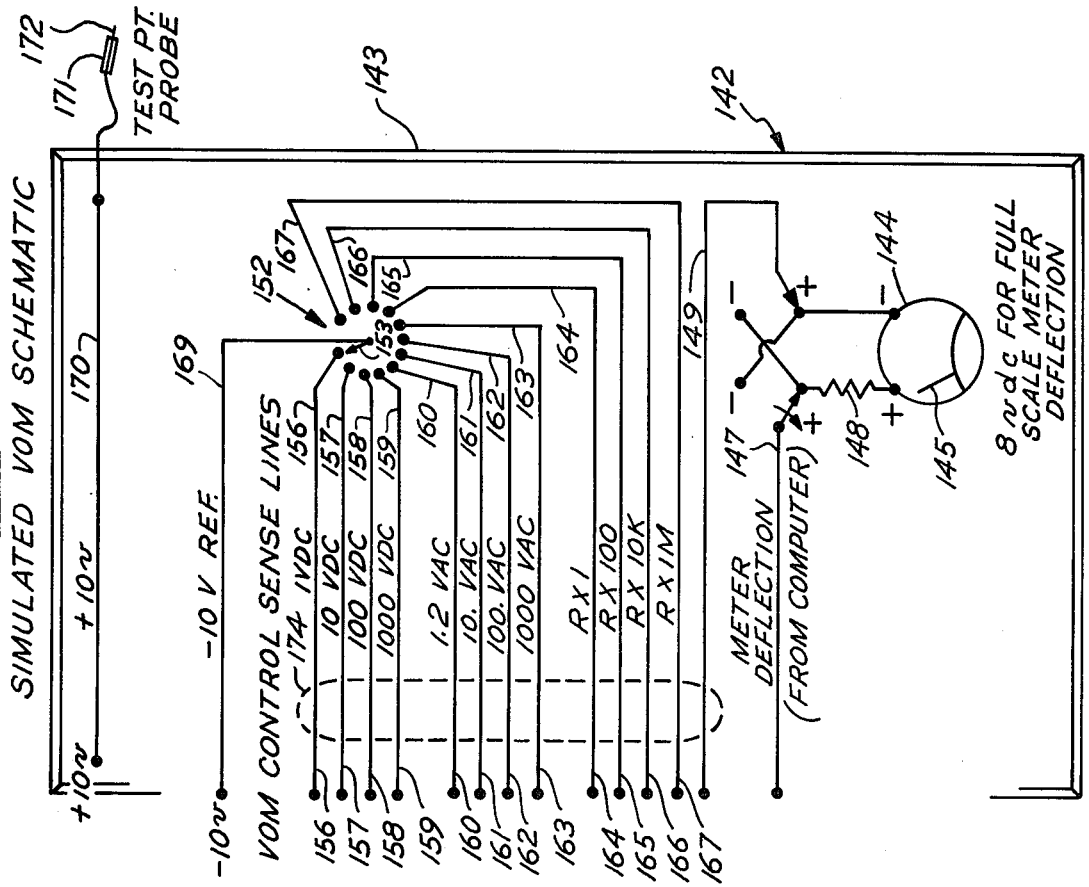
FIG. 5 is an electrical schematic diagram of the simulated volt-ohm meter shown in FIG. 1.

Referring to FIGS. 5 and 6, simulated test equipment 140 preferably comprises a volt-ohm meter (VOM) 142 including a case 143 and a conventional meter movement 144 that operates a deflection needle 145. Behind the needle are various scales which read in volts DC, volts AC and ohms. Eight volts DC must be applied to the meter movement in order to achieve full scale deflection of needle 145. A tester indicating signal which deflects needle 145 is received over a conductor 147 and through a resistor 148. Conductor 149 is connected from the meter movement to ground potential.

A scale selector knob 150 moves a rotary control switch 152 comprising a movable arm 153 which makes contact with conductors 156-167 one-at-a-time. Minus 10 volts is supplied to arm 153 via conductor 169. Conductors 156-167 correspond to various scales inscribed on the face of meter 142. For example, conductors 156-159 are used in connection with the 1 volt DC, 10 volt DC, 100 volt DC, and 1000 volt DC scales, respectively. Likewise, conductors 160-163 are used in connection with the 1.2 volt AC, 10 volt AC, 100 volt AC and 1000 volt AC scales, respectively. Conductors 164-167 are used in connection with the resistance x1, resistance x100, resistance x10K and resistance x1M scales, respectively. Knob 150 is operated by the student in order to identify the desired sensitivity of the tester on the volts DC, volts AC and resistance scales.

Plus 10 volts is transmitted over a conductor 170 to a detector probe 171 having a tip 172 that is adapted to comate with the test points in receiver 12. Detector probe 172 is sufficiently large to be handled manually by a student using the system.

As shown in FIG. 6, conductors 156-167 are bound together in a cable 174, conductors 31-42 and 44 are bound together in a cable 175, and conductors 45–47 and 49–58 are bound together in a cable 176.

Data processor 180 preferably comprises an XDS Sigma-5 computer with a FORTRAN compiler. The processor includes an arithmetic unit 182, a control unit 183, and a memory 184 having logical arrays DI1, DI2, DI3, IDI4, IDI5 and designated memory locations A (340), A (341), A (343) and A (202). Memory 184 also includes array tables V and R. Logical arrays DI1 and DI2 comprise probe detection means for storing a different digital test point identification signal for each test point touched by probe 171. Thus, arrays DI1 and DI2 are responsive to the voltage on probe 171. Array table V comprises test point storage means for storing digital test point condition signals representing a simulated voltage condition at each of the test points. Array table R serves the same function for resistance conditions at each of the test points. Array IDI4 comprises tester control storage means for storing a digital tester control signal representing the state of the VOM control switch 152.

Data processor 180 also includes an input-output unit 185 which preferably comprises an XDS model 7929 direct input-output adapter. Additional storage capacity is provided by a conventional 3.3M magnetic disk storage unit 186 with an average access time of 17 milliseconds at a rate of 0.2M characters per second.

Referring to FIGS. 6–8, data processor 180 communicates with receiver 12 and VOM 142 through a hybrid link 190 which preferably is an Adage Model 770 computer link. Link 190 comprises: a 14-bit discrete input 121 which receives data from cable 175 and transmits data to memory logical array DI1 over a 14-bit cable 121C; a 14-bit discrete input 123 which receives data from cable 176 and transmits data over a 14-bit cable 123C to memory logical array DI2; a 14-bit discrete input 124 having its inputs disconnected and having its outputs connected to memory logical array DI3 over a 14-bit cable 124C; and a 14-bit discrete input 125 which receives data from cable 174 and transmits data over a 14-bit cable 125C to memory logical array IDI4. Input 125 provides a means for sensing the state or position of VOM control switch 152. Input 124 may be used to expand the number of test points that can be probed on receiver 12.

Link 190 includes a 14-bit discrete input 126 which receives data from mode switch 17a and band switch 18a and transmits data over a cable 126C to memory logical array IDI5. Link 190 also comprises an analog-to-digital converter 127 (FIG. 6) which receives data over conductors 116–118 from potentiometers 14a–16a and transmits corresponding digital data over conductors 127A–127C to memory locations A (340)–A (342), respectively. Input 126 and converter 127 comprise equipment control detection means for sensing the position of the receiver control knobs 14–29 and for communicating this information to processor 180. Likewise, memory array IDI5 and memory locations A (340)–A (342) comprise equipment operating control storage means for storing digital equipment control condition signals representing the positions of the receiver control knobs 14–19.

Link 190 also includes a digital-to-analog converter 128 which receives digital data from memory location A (202) and transmits a corresponding tester indicating signal over conductor 147 to VOM 142.

Link 190 provides a source of plus 10 volts 129 and a source of minus 10 volts 130 to conductors 170 and 169, respectively. Conductor 149 is grounded through link 190 as shown in FIG. 6.

Referring to FIGS. 1 and 6, the training system includes a student scope display and keyboard input unit 200 which preferably is a Honeywell Information System Model S-50. Unit 200 comprises a cathode ray tube (CRT) display 202 and a conventional keyboard input 204. Unit 200 is connected to other parts of the system through a cable 206.

The training system also comprises an instructor scope display unit 210 which preferably is a Control Data Corporation Model DD-40 display unit. Unit 210 is connected to other parts of the system by a cable 212. Data processor 180 is programmed by a unique software system. The function of the software system is to:

(1) Display text material explaining the operation of VOM 142 and receiver 12;
(2) Provide a simple structure for a student question-answer dialog;
(3) Drive and monitor VOM 142;
(4) Provide a short summary of results;
(5) Display the student's progress on instructor CRT 210; and
(6) Monitor the receiver switch and knob settings.

In this system, computer 180 is programmed to instruct a student by displaying on CRT 202 both text material and the schematic of receiver 12 shown in FIG. 3. The student responds via keyboard 204 or by measuring a specified test point using VOM 142. Radio receiver 12 is made of simulated components, control knobs and test points. The control knobs are monitored by the computer for proper setup. The test points are also monitored to sense if VOM probe 171 contacts them.

VOM probe 171 has a low voltage (+10 volts) on tip 172 which completes a circuit when it touches a test point. By monitoring all test points, the computer "knows" which point is touched. VOM needle 145 is deflected according to the VOM setting of control knob 150, the test point touched and the test point condition data prestored in the memory tables V and R. This test point condition data can simulate normal receiver operation or receiver operation under different types of component failures. The present system is programmed to simulate dc voltage and resistance-to-chassis-ground measurements for normal operation and abnormal operation due to one type of failure. In addition, the test probe location can be superimposed on the schematic displayed on the CRT.

Instructor display 210 displays time and the location of the student in the programmed learning and testing phase. In addition, if the student requests help, a message appearing on the instructor display notes that assistance is required by the student.

Student responses from keyboard 204, as well as data from VOM 142 and receiver 12, are input and output via the I/O 185 and hybrid computer link 190. As previously described, this link consists of an analog-to-digital converter 127, a digital-to-analog converter 128 and discrete input and output words 121, 123, 125 and 126, all under computer control. the computer monitors the receiver test points and VOM control knob settings through the discrete input words. Upon computing the proper VOM needle deflection, converter 128 sets deflection needle 145 accordingly by transmitting a tester indicating signal over conductor 147.

By using the disk storage unit 186, text material displayed on CRT's 202 and 210 is brought into the computer memory. As each instructional module is accessed, a new block of text is brought in from disc 186 in 6.4K character blocks. Each new text block overlays the previous block. In addition, a common 6.4K character text block is used by all modules and is not changed. This latter block contains messages indicating student errors, representative system responses shared by all modules, the student's name, etc. This method of storing and swapping text information consumes only 0.5 sec. for each 6.4K block of data swapped, and does not appear to influence performance.

FIG. 9 illustrates the software organization of the computer. The control hierarchy starts at the MAIN routine, which in turn calls the system routines (EXEC) or the instructional modules (INTRO, SETUP, VOM, FDES, EXAM): These in turn access lower level routines which perform special purposes. For example, KEYIN monitors the student keyboard and stores keyboard characters in a buffer in data bus STEXT.

Communication between modules or routines is primarily through common data blocks in memory. These blocks are denoted by THRUST and STEXT. Routines which access these data blocks or buses are shown by the open (dotted) lines.

During operation, a student proceeds through a series of instructions and questions programmed in the instructional modules and displayed on CRT 202. Based on his response, the routines set pointers denoting text to be displayed, instructional paths, repeat paths for errors, etc. For example, when an instruction requests the student to perform a step of a test procedure, the system pauses to give the student time to attempt to perform the step. A variety of responses can then be displayed on CRT 202 depending on the manner in which the student performs the step.

Use of this pointer method permits a simpler coding form and ease in allocating instructional paths. The pointer system is based on a section-chapter-paragraph order. An example is found in the functional descriptive routine FDES (which will be disclosed in detail later). In this case, FDES is denoted by the section pointer being 4. The routine contains 16 chapters. Initial entry to this routine is with the chapter and paragraph equal to 1. Each time the student sets the keyboard carriage return key, the paragraph counter is incremented. The chapter counter has a variable increment dependent upon the response. For some errors, the counter may be reset to one causing a repeat of a chapter, or going to the next chapter for a correct response.

The software routines and their respective functions are shown in the following Table 1.

TABLE 1

| | |
|---|---|
| System Routines | |
| MAIN | Basic Routine to call other subroutines. |
| EXEC | Provides input of trainer parameters and data dump. Also provides time counter. |
| Input/Output Routines | |
| CONVERT | Provides analog-to-digital (A/D) and digital-to-analog (D/A) control and scaling. |
| DISPLAY | Controls both instructor's and student's CRT display. For instructor's CRT, provides time and location of student in program. For student's CRT, displays text statements from text library, based on text pointers, and outlines circuits, components or probe test points on the schematic. |
| KEDISP | Samples student keyboard input and stores input text in memory. Also sets carriage return flag, decodes messages like "help" and sets "help" flag. |
| DSTORE | Inputs test sentences and test point data, and stores in specified files. |

TABLE 1-continued

| | |
|---|---|
| QUE | Inputs text data to memory from files. Text is automatically input every time a new section module (FDES) is referenced by program. Common text occupies 1st 100 locations of ITLIB. Section dependent text, which is overlayed for each section, occupies the upper 100 locations of ITLIB., i.e., ITLIB (17,101) to ITLIB (17,200). Text is assessed by DISPLY. QUE routine also provides a student monitor function to note gross error, like making resistant measurements with radio on. |
| DCOM | Data command routine, brings test point data into memory, calls DSTORE. Also computes test point student is probing and VOM needle deflection voltage to D/A 1. |
| Instructional Routines | |
| INTRO | Describes system operation and command structure to student, and provides student computer dialog. |
| SETUP | Instructs student on proper radio receiver setup, and provides correction logic and text to correct improper setup. |
| VOM | Instructs student as to VOM operation and set up. Provides text for student to perform simple VOM measurements. Monitors student test responses and provides error detection and corrective text logic. |
| FDES | Instructs student on function and operation of radio receiver. Provides test logic for student to probe circuit board and display probe position on CRT with schematic overlay. Also provides series of tests designed to evaluate student's knowledge of circuit board and functional operation. |
| EXAM 1 | Instructs student on typical trouble-shooting techniques for given failure. Provides symptoms and typical procedure for this type of failure. |
| KEYIN | Checks for errors made by student. Determines whether VOM input voltage is within the proper range and whether dial 150 is set properly. |
| Library Routines | |
| FUND | Provides data for outlines of predetermined areas of CRT display. The FUND routine is the data source used to outline a functional block of the radio receiver with a schematic overlay on the student CRT display. |
| Additional library routines for utilizing link 190 are executed: | |
| | (1) to input to processor 180 a discrete (14-bit) word in hybrid link 190 (See FIG. 9); |
| | (2) to output a discrete word (IWORD) from processor 180 to link 190; |
| | (3) to input word I (I=123, 124, etc.); and |
| | (4) to set a 14 element logical array to true or false depending on the bits being on or off. (Link bit 0 is the most significant link bit, 13 is the least significant, i.e., if link bit 0 is true, IA(I) is true.) |
| Other library routines for utilizing display units 200 and 210 are executed: | |
| | (1) to display a hollerith character on CRT display 202 at a position specified by X and Y; |
| | (2) to display a hollerith character string on CRT display 202, starting at a position defined by X and Y; |
| | (3) to draw a line from the present raster located on CRT display 202 to that defined by X and Y; and |
| | (4) to specify if scope commands DCHAR, DTEXT and DLINE are displayed on the instructor scope display 210 or the student scope display 202. |

Instructions for preparing these additional library routines generally are provided by the link and display unit manufacturers and are well within the skill of persons trained in computer programming.

The SETUP routine is an important feature of the system, because it alters the instructions to the student depending on the manner in which the receiver control knobs 14–19 are adjusted by the student. As a result, the system is capable of training the student how to operate the receiver as well as to repair it.

The DISPLY routine is also an important feature because it enables a schematic diagram of receiver 12 (FIG. 3) to be displayed on CRT 202 and, more importantly, it identifies the test point to be touched by probe 171 on the displayed schematic.

One of the principal features of the system is its ability to simulate the operation of electronic equipment and of a test instrument useful in trouble-shooting the electronic equipment. In the preferred embodiment, the electronic equipment is simulated radio receiver 12 and the test instrument is simulated VOM 142. Through conductors 115–120 and cables 174–176, computer 180 monitors the setting of receiver knobs 14–19, VOM scale selector dial 150, and the receiver test points touched by probe 171.

In order to determine the particular test point touched by VOM probe 171, the probe has a +10v potential conducted to its tip 172. When this tip touches a receiver test point, it raises the voltage of the test line connected between link 190 and the touched test point. About 10 times per second, computer 180 monitors these lines and notes if a test point line is true (maintained at 10 volts) or false (maintained at 0 volts). If all test lines are maintained at zero volts, the probe is not touching a test point. If a line is true, the computer notes the test point touched and accesses a corresponding value from a pre-stored data table (either table V or R). This data then is scaled to a value corresponding to the proper deflection of VOM needle 145 and is converted to an analog voltage used to deflect the needle.

As noted in Table 1, the software routine which provides the simulation capability is DCOM. This routine is accessed by the primary calling routine MAIN. The routine CONVERT, also called from MAIN, causes digital data to be converted to an analog voltage in order to deflect needle 145. A preferred form of the DCOM routine programmed in FORTRAN is given in Table 2.

TABLE 2

```
1:      SUBROUTINE DCOM
2: C
3: C         THIS ROUTINE COMPUTES TEST POINT SAMPLED
4: C
5:      COMMON/THRUST/MODE, A(1000)
6:      COMMON/SWITCH/ISS1, ISS2, ISS3, ISS4, ISS5
7: C
8:      DIMENSION V(2,40), R(2,40)
9:      DIMENSION DI1(14), DI2(14), DI3(14), IDI4(14), IDI5(14)
10:     LOGICAL DI1, DI2, DI3
11:     REAL METER
12: C
13: C          PARAMETER INPUTS
14: C
15:     EQUIVALENCE (V    , A(601)), (R    , A(701)), (SFACT   , A(208))
16: C
17: C          VARIABLE INPUTS
18: C
19:     EQUIVALENCE (VOMA   , A(446))
20: C
21: C          VARIABLE OUTPUTS
22: C
23:     EQUIVALENCE (ITP    , A(200)), (TP      , A(201)), (ATD    , A(202)),
24:    1            (METER  , A(203)), (IMETER  , A(204)), (FAIL   , A(205)),
25:    2            (IFAIL  , A(206)), (IDI4    , A(320)), (IDI5   , A(300)),
26:    3            (VOM    , A(340)), (BFO     , A(341)), (TUNE   , A(342)),
27:    4            (ATDPV  , A(215)), (ITPMPV  , A(216))
```

Table 2 - continued

```
28:  C
29:        IF (MODE) 100,200,500
30:  100   CONTINUE
31:        ISET   = 2
32:        ICLEAR = 1
33:        SFACT  = 8.0
34:        JF     = 1
35:        FAIL   = 1.
36:        VOMLMT = 12.0
37:        RETURN
38:  200   CONTINUE
39:  C
40:  C                IF IFAIL = 1, A NOMINAL CONDITION EXISTS
41:  C
42:        IFAIL   = FAIL + 0.01
43:  C
44:  C          INPUT DATA FROM CARD FILE AND REWIND UNITS
45:  C        CALL IN DATA FROM FILE TDATA DURING THE FIRST RUN ONLY
46:  C
47:        REWIND 20
48:        REWIND 21
49:        REWIND 22
50:        REWIND 23
51:        REWIND 24
52:        CALL DSTORE
53:  C
54:        REWIND 20
55:        REWIND 21
56:        REWIND 22
57:        REWIND 23
58:        REWIND 24
59:  C
60:  500   CONTINUE
61:  C
62:  C          INPUT TEST POINT VIA DISCRETE INPUTS
63:  C
64:  C
65:  C                SET DIS. INPUTS 123, 124, 125
66:  C
67:        CALL DOUT(121,ISET)
```

Table 2 - continued

```
68:         CALL DOUT(122,ISET)
69: C
70:         CALL DIN14(121,DI1)
71:         CALL DIN14(123,DI2)
72:         CALL DIN14(124,DI3)
73:         CALL DIN14(125,ID14)
74:         CALL DIN14(126,ID15)
75: C
76: C            COMPUTE CHASSIS TEST POINT
77: C
78:         I    = 0
79:    510  I    = I + 1
80:         IF (DI1(I)) GO TO 530
81:         IF (I·EQ·14) GO TO 520
82:         GO TO 510
83:    520  I    = 0
84:    530  ITP  = 1
85:         IF (ITP·NE·0) GO TO 650
86: C
87:         I    = 0
88:    560  I    = I + 1
89:         IF (DI2(I)) GO TO 580
90:         IF (I·EQ·14) GO TO 570
91:         GO TO 560
92:    570  I    = 0
93:    580  IF (I·NE·0) ITP = I + 14 ; GO TO 650
94:         I    = 0
95:    590  I    = I + 1
96:         IF (DI3(I)) GO TO 610
97:         IF (I·GE·7) GO TO 600
98:         GO TO 590
99:    600  I    = 0
100:   610  IF (I·NE·0) ITP = I + 28
101:   650  TP   = ITP
102: C
103: C            COMPUTE VOM METER SCALE
104: C
105:        I    = 0
106:   700  I    = I + 1
107:        IF (ID14(I)·LT·0) GO TO 720
```

Table 2 - continued

```
108:            IF (I·GE·13) GO TO 710
109:            GO TO 700
110:        710 I   = 0
111:        720 IMETER=1
112:            METER = IMETER
113: C
114: C
115: C           CLEAR DIS. INPUTS 123,124,125
116: C
117:            CALL DOUT (121,ICLEAR)
118:            CALL DOUT (122,ICLEAR)
119: C
120: C
121: C           OUTPUT ANALOG VOLTAGE TEST POINT READING
122: C
123:            IF (IMETER·EQ·0) ATD = 0.
124:            IF (IMETER·EQ·1) ATD=SFACT*V(IFAIL,ITP)
125:            IF (IMETER·EQ·2) ATD=SFACT*V(IFAIL,ITP)*0.1
126:            IF (IMETER·EQ·3) ATD=SFACT*V(IFAIL,ITP)*0.01
127:            IF (IMETER·EQ·4) ATD=SFACT*V(IFAIL,ITP)*0.001
128:            IF (IMETER·EQ·5) ATD=1.20*V(IFAIL,ITP)
129:            IF (IMETER·EQ·6) ATD = 1.0*V(IFAIL,ITP)
130:            IF (IMETER·EQ·7) ATD=.100*V(IFAIL,ITP)
131:            IF (IMETER·EQ·8) ATD=0.01*V(IFAIL,ITP)
132:            RM   = R(IFAIL,ITP)
133: C
134:            IF (IMETER·EQ·9) ATD = SFACT*RM/(10.+RM)
135:            IF (IMETER·EQ·10) ATD=SFACT*RM/(1000.+RM)
136:            IF (IMETER·EQ·11) ATD=SFACT*RM/(100000.+RM)
137:            IF (IMETER·EQ·12) ATD=SFACT*RM/(10000000.+RM)
138:            IF (ABS(ATD)·GT·VOMLMT) ATD=SIGN(VOMLMT,ATD)
139:            IF (ITP·NE·0) ATDPV=ATD ; ITPMPV=ITP
140:            RETURN
141:            END
```

An illustration of how the system simulates receiver 12 and VOM 142 by means of routine DCOM is given in the following example. During the course of instruction, the student is requested, by the computer, to enter on keyboard 204 the dc voltage at a specified receiver test point.

Assume in this case the test point is T1, and its simulated normal voltage is 5.0 volts, dc. Assume also the student sets VOM control knob 150 to the 10v dc scale. As seen in FIG. 5, the setting of knob 150 results in +10 volts being applied to VOM sense line 157. Line 157, as well as lines 156 and 158–167, are connected between VOM 142 and link 190. The electrical voltages on these lines are converted to computer data in subroutine DCOM. Routine DCOM inputs the data from link 190 and stores the voltage control levels in a memory array IDI4 in response to the CALL DINI4 (125, IDI4) command. At line nos. 102 to 112 of DCOM (Table 2), each array location is examined in a sequential manner to see which VOM line was selected by knob 150. IDI4 (1) corresponds to line 156, ..IDI4 (10) corresponds to line 165 etc. Hence the variable IMETER (line nos. 111, 112 of DCOM) is set to 2, since line 157 was on, causing IDI4 (2) to be logically true (less than zero).

The test point touched by VOM probe 171 is computed in line nos. 61 through 101 of DCOM. If probe 171 touches a test point, the test point line associated with that test point is raised to +10 volts. This causes an electronic element to be set in computer link 190 which can be input into computer 180 by the CALL DINI4 (I, DI) command in line nos. 70–74 of routine DCOM. Link 190 is made up of 14 lines per word, where words are designated as units 121, 123, etc. The variable DI is a data array in memory 184 in which each line state is stored. Hence the command "CALL DINI4 (121, DI1)" stores the first 14 test point lines (lines 31–44) in DI1. The next 14 test point lines (lines 45–58) are input through word 123 and are stored in DI2. The values stored in DI1 and DI2 are true if the line has 10 volts. (i.e., if the probe is applied), or false if the line has 0 volts (i.e., if no probe is applied). For computer 180, true is a number less then zero.

In line nos. 75–101 of DCOM, the program checks through the test point data arrays in a sequential fashion to determine which, if any, test point has the probe on it. If the test probe is not touching any test point, the data array elements DI1, DI2, DI3 are false resulting in the test point indicator ITP being equal to zero. In this example, the student applies probe 171 to test point T1, so that line 31 is raised to +10 volts and the variable ITP is set to 1.

The system is capable of simulating two different voltage conditions (or resistance values) at test point T1, or any other test point. In the present example, data from voltage and resistance measurements are prestored in array tables V (I,J) and R (I,J). I is a failure flag: if I=1, normal operation is simulated, and if I=1, failure type 1 operation is simulated. J is the test point designator. Hence location V (1,1) contains the voltage value at test point T1 for a normal or no-failure condition, and location V (2,1) contains the voltage value at test point T1 for a failure condition. During initialization of the run, both normal and failure simulation data is read into tables V and R of the memory by the routine DSTORE.

The failure flag is set through the EXEC routine. In addition to use by the DCOM routine, the failure flag is used by routine KEYIN (line no. 81) for making sure that the student enters the proper VOM value on keyboard 204 and for cuing the student when he starts reading abnormal test values.

Line nos. 123 through 139 of DCOM illustrate how VOM 142 is driven from the computer based on the VOM meter setting (IMETER), the test point touched (ITP), and the failure condition or flag. Basically, computer 180 calculates the proper voltage needed to deflect VOM needle 145 in order to simulate the voltage present at test point T1. Of course, resistance measurements also can be simulated.

Since meter needle deflection is a function of the VOM control knob setting, the meter setting (IMETER) is checked to identify the appropriate data table or array. If IMETER is greater than 9, resistance or R data is evaluated; if IMETER is less than 9, voltage data or V data is evaluated. After the correct data is accessed, it is scaled appropriately and stored in variable ATD. ATD is stored in the common memory area A(202). The value of ATD is converted to an analog voltage in routine CONVRT.

The scale factors used in determining ATD in DCOM are based on the assumption that an 8 volt input to meter 144 causes a full scale deflection of needle 145. If IMETER=2, indicating that the 10 volt dc VOM scale was selected, a 5 volt dc reading would produce a 50% scale deflection. In order to achieve a 50% scale deflection, VOM drive line 147 must be raised to 4 volts. Since IMETER=2 in this example, ATD is calculated at line no. 125 of DCOM by the equation:

$$ATD = SFACT*V (IFAIL, ITP)* 0.1.$$

Since SFACT is the full scale to ATD unit conversion factor (8 volts) and V (IFAIL, ITP)=5 volts (i.e., the voltage to be simulated at test point T1, $$ATD = 8x (5) x0.1 = 4.$$

The 0.1 term refers to the fact that the meter deflection scale is 10 times greater than the unit's scale when IMETER=2. Hence, the driving voltage when IMETER=2 is one-tenth the driving voltage when IMETER=1. For resistance measurements, a log VOM scale is used. The log scale is approximated by the equation:

$$ATD = SFACT \times R/ (scale+R)$$

where SCALE is a variable dependent on the resistance VOM scale selected. (See line nos. 134–137 of DCOM).

In summary, if the student sets VOM 142 to the +10 volt dc scale and places probe 171 on test point T1, needle 145 reads 5 volts, just as a real VOM would read if its probe were placed on test point T1 of a real receiver.

Additional features of the system will be apparent to those skilled in the art from the following detailed listing of the above-described software routines in FORTRAN

```
C
C
C                TEST POINT DATA POSITION FOR DISPLAY
TPTX
                X - AXIS
        0.28        0.28        0.33        0.33        0.50        0.54        0.
        0.62        0.66        0.66        0.79        0.83        0.95        0.
        0.79        0.76        0.79        0.83        0.85        0.25        0.
        0.95        0.95        0.70        0.71        0.71        0.68        0.
        0.28        0.22        0.22        0.06
-2
TPTY
                Y - AXIS
        0.85        0.825       0.825       0.85        0.85        0.875       0.
        0.85        0.837       0.813       0.85        0.887       0.813       0.
        0.67        0.63        0.61        0.61        0.59        0.53        0.
        0.42        0.45        0.44        0.60        0.63        0.615       0.
        0.68        0.69        0.67        0.99
-2
VOLT
   1 1          NOMINAL VOLTAGES
        .88         .0          .23         9.5         1.5         9.3         0.
        1.8         6.8         1.17        0.5         8.8         6.8         20
        20.0        10.1        20.8        10.1        9.5         9.4         A.
        22.         10.         5.0         21.5        5.8
        -5.4        8.8         .29
-1
   1 2          VOLTAGE FOR LS OPEN
        .85         .0          .0          .0          1.5         9.3         0.
        1.8         6.8         1.17        0.5         8.8         6.8         20
        20.0        10.1        20.8        10.1        9.5         9.4         A.
        22.         10.         5.0         21.5        5.0
        -5.4        8.8         .29
-2
OHMS
   1 1          NOMINAL RESISTANCE IN KILO-OHMS
        0.1         2.1         3.1         4.1         5.1         6.1         7.1
        8.1         9.1         5.2         6.2         7.2         8.2         9.2
        .02         .03         99.         50.         60.         70.         80.
        .02         0.3         56.         57.         65.         99.         28.
-1
   1 2          RESISTANCE WITH Q-1 SHORTED OUT
        0.5         2.5         3.5         4.5         5.5         6.5         7.5
        8.1         9.1         5.2         6.2         7.2         8.2         9.2
        .02         .03         99.         50.         60.         70.         80.
        .02         0.3         56.         57.         65.         99.         28.
-2
C
C              ARRAY OF TEXT FOR DISPLAY
C
C
TEXT
0               COMMON TEXT SECTION
0         THIS SECTION IS TO BE USED FOR REPEATED
0         STATEMENTS WHICH OCCUR THROUGHOUT THE PROGRAM
0
0
0  TYPE YES OR NO, FOLLOWED BY PRESSING THE CR KEY.
0  ENTER VOM READING THROUGH THE KEYBOARD
0  VERY GOOD, NOW PROCEED TO THE NEXT FRAME.
0  IF YOU WISH TO REPEAT THE VOM MODULE, TYPE IN YES.
0  NOW, MAKE A RESISTANCE MEASUREMENT AT TEST POINT XXXX .
0  NOW, MAKE A VOLTAGE MEASUREMENT AT TEST POINT XXXX .
0
0                                    SUBJECT NAME STORAGE
0  GOOD LUCK
0
0
0
0  HELP WILL ARRIVE SHORTLY. IN MEANTIME DO NOT TOUCH ANYTHING.
0  YOU FORGOT YOUR DECIMAL POINT, REENTER YOUR DATA.
0  YOU MADE A MEASUREMENT ERROR, RE-ENTER YOUR VOM READING.
0  YOU ARE ON THE WRONG VOM PARAMETER SCALE.
0  YOU DID NOT ENTER THE DATA FROM THE INSTRUCTED TEST POINT.
0  YOUR READING IS NORMAL, PROCEED TO THE NEXT FRAME.
0  YOUR READING IS NOT NORMAL, NOTE AND PROCEED.
0  YOU MADE A ERROR IN READING THE VOM OR ENTERING THE DATA.
0  YOUR VOM SCALE IS TOO HIGH.
0  YOUR VOM SCALE IS TOO LOW.
0
0       YOU HAVE MADE A SERIOUS ERROR IN YOUR PROCEDURE
0  RESISTANCE MEASUREMENTS ARE TO BE MADE WITH THE RECEIVER OFF,
0  SINCE THIS CAN DAMAGE YOUR VOM.
0  NOW TURN OFF THE RECEIVER AND REPEAT YOUR MEASUREMENT.
0
0  IT WOULD HELP YOUR VOLTAGE MEASUREMENT IF THE RECEIVER WERE ON.
0
0
0
0
0
0
0
0
```

```
0
0
0
0
0
0
0
0  CONGRATULATIONS, YOU HAVE COMPLETED 60 PER-CENT OF THE COURSE.
0     THE PURPOSE OF THIS SECTION IS TO AID YOU IN RELATING
0  FUNCTIONAL OPERATION OF THE RECEIVER TO THE ACTUAL HARDWARE
0  MOUNTED ON THE CHASSIS. RELATING FUNCTIONAL RECEIVER OPERATION
0  AND HARDWARE LOCATION WILL AID YOUR TROUBLESHOOTING TASKS.
0
0  YOU WILL BE TOLD TO PLACE YOUR DC VOLTAGE PROBE ON A DESIGNAT-
0  ED TEST POINT, DENOTED BY A STAR ON THE SCOPE. THE CIRCLE
0  APPEARING ON THE SCOPE INDICATES, ON THE SCHEMATIC, WHICH TEST
0  POINT YOU LAST TOUCHED. CONTINUE TESTING UNTIL YOU TOUCH THE
0  DESIGNATED TEST POINT. THEN PRESS TURN CR FOR THE NEXT POINT.
0       WHEN YOU HAVE SUFFICIENT KNOWLEDGE OF THE CIRCUIT
0  BOARD TYPE DONE, OTHERWISE TURN CR.
0  THIS POINT IS IN THE HF OSCILLATOR CIRCUIT OUTLINED ABOVE.
0  YOU ARE IN THE HF OSCILLATOR CIRCUIT, TRY AGAIN.
0  YOU ARE IN THE MIXER CIRCUIT, TRY AGAIN.
0  YOU ARE IN THE IF CIRCUIT, TRY AGAIN.
0  YOU ARE IN THE AGC CIRCUIT, TRY AGAIN.
0  YOU ARE IN THE AUDIO CIRCUIT, TRY AGAIN.
0  YOU ARE IN THE POWER SUPPLY CIRCUIT, TRY AGAIN.
0  YOU ARE IN THE RIGHT CIRCUIT, BUT WRONG POINT, TRY AGAIN.
0  VERY GOOD, YOU HAVE FOUND THE HF OSCILLATOR CIRCUIT OUTPUT.
0  PLACE YOUR PROBE ON THE DRAIN OF G2.
0  THIS POINT IS PART OF THE MIXER CIRCUIT, OUTLINED ABOVE.
0  PLACE YOUR PROBE ON THE GATE OF Q1.
0  PLACE YOUR PROBE ON THE DRAIN OF G2.
0  PLACE YOUR PROBE ON THE COLLECTOR OF Q3.
0  PLACE YOUR PROBE ON THE COLLECTOR OF G5.
0  PLACE YOUR PROBE ON THE COLLECTOR OF Q6.
0  PLACE YOUR PROBE ON THE RESISTOR R33.
0
0  VERY GOOD, THIS POINT IS THE OUTPUT OF THE HF OSCILLATOR.
0  VERY GOOD, THIS POINT IS THE OUTPUT OF THE MIXER.
0  VERY GOOD, THIS POINT IS THE 1ST STAGE IF OUTPUT.
0  VERY GOOD, THIS POINT IS THE OUTPUT OF THE GAIN COMPENSATOR.
0  VERY GOOD, THIS POINT IS THE 1ST STAGE AUDIO OUTPUT.
0  VERY GOOD, THIS POINT IS THE FILTERED DC VOLTAGE SUPPLY.
0
0  NOW, SET YOUR VOM TO THE 100 VDC SCALE. REMEMBER TO USE THE
0  DC VOLTAGE (BLACK) PROBE TO LOCATE THE DESIGNATED TEST POINT.
0
-1
1  WELCOME TO THE HONEYWELL AUTOMATED MAINTENANCE AND
1  TROUBLESHOOTING TRAINER DEMONSTRATION
1  IS THIS YOUR FIRST VISIT       IF SO, TYPE YES, OTHERWISE
1  TYPE NO.  TERMINATE THIS BY PRESSING THE GRAY CARRIAGE RETURN
1  (CR) KEY IN THE UPPER LEFT HAND CORNER OF THE KEYBOARD.
1  PLEASE TYPE YOUR NAME USING THE GRAY KEYBOARD---FIRST NAME,
1  MIDDLE INITIAL, AND LAST NAME, IN THAT ORDER.
1  TERMINATE THIS BY PRESSING THE CARRIAGE RETURN (CR) KEY.
1       THIS IS AN INITIAL TEST PATTERN
1  SINCE THIS IS YOUR FIRST VISIT,
1  YOU WILL BE PROVIDED WITH THE INSTRUCTIONS NECESSARY
1  TO COMMUNICATE WITH THIS SYSTEM, AND ADVANCE THE TEXT.
1  PRESS TURN, FOLLOWED BY PRESSING THE CR KEY.
1
1  THE BASIC SYSTEM INSTRUCTIONS ARE
1   TURN - WHICH ADVANCES THE TEXT
1   HELP - WHICH CALLS THE INSTRUCTOR
1   ERASE- WHICH ERASES THE INPUT OR ENTRY
1   DONE - TERMINATES THIS PORTION OF THE LESSON
1  TO ENTER THESE COMMANDS, TYPE THE WORD AND PRESS THE CR KEY.
1  STRIKING THE GRAY CR KEY ENTERS YOUR RESPONSE INTO THE
1  SYSTEM. REMEMBER THAT AFTER TYPING YOUR RESPONSE, YOU MUST
1  HIT THE CR KEY. ALSO IF YOU ARE REQUESTED TO TYPE IN NUMERICAL
1  DATA, YOU MUST HIT THE CR KEY IN ORDER TO LET THE SYSTEM
1  KNOW YOU HAVE MADE AN ENTRY. NOW PRESS TURN AND CR.
1     YES - INDICATES AN AFFIRMATIVE RESPONSE
1     NO  - INDICATES A NEGATIVE RESPONSE
1     FINISH - TERMINATES THE COURSE PRESENTATION.
1
1  THE TURN KEY WILL ADVANCE THE TEXT TO CONTINUE WITH THE
1  LESSON. IF YOU ARE NOT PROVIDED WITH SPECIFIC INSTRUCTIONS
1  DURING A LESSON, PRESS TURN, FOLLOWED BY PRESSING CR.
1  YOU SHOULD HAVE PRESSED TURN AND CR, PLEASE DO SO.
1
1  THE ERASE KEY WILL DELETE OR ERASE A KEYBOARD ENTRY.
1  NOTE THAT THE ERASE KEY
1  IS ONLY USED PRIOR TO HITTING THE CR KEY. ONCE YOU HIT THE
1  CR KEY, THE SYSTEM ASSUMES THAT IS YOUR RESPONSE.
1  THE HELP COMMAND (FOLLOWED BY A CR) WILL SUMMON THE
1  INSTRUCTOR TO YOUR ASSISTANCE.
```

```
1  TO TERMINATE A LESSON, USE THE DONE COMMAND, AGAIN
1  FOLLOWED BY PRESSING THE CR KEY.
1  WE ARE NOW GOING TO GIVE YOU A SHORT TEST TO EVALUATE
1  YOUR UNDERSTANDING OF THE SYSTEM INSTRUCTIONS.
1  PRESS THE KEYS NECESSARY TO ADVANCE THE TEXT.
1  WRONG, PRESS TURN AND CR TO RECEIVE MORE INSTRUCTION.
1  VERY GOOD, NOW ASSUME THAT YOU NEED ASSISTANCE FROM THE
1  INSTRUCTOR.
1  TYPE THE COMMAND TO CALL FOR ASSISTANCE.
1  DO YOU WISH TO HAVE A REVIEW OF THE SYSTEM INSTRUCTIONS
1  IF SO, TYPE YES FOLLOWED BY STRIKING THE CR KEY.
1  DO YOU WISH TO REPEAT THE INTRODUCTORY INSTRUCTIONS
1 PAUL
1  ARE YOU THAT BIG , HANDSOME, SEXY DEVIL THAT WORKS AT
1  NAVAIR
1  COME ON UP SOMETIME TIGER, AND TEST MY RESISTANCE, (OHMS).
1
1  THATS REALLY TO BAD, BUT I WILL SHOW YOU WHAT I GOT ANYWAY.
1  THIS COMPLETES THE INTRODUCTION TO THIS PROGRAM.
1  THE NEXT PORTION IS CONCERNED WITH SETTING UP THE
1  EQUIPMENT YOU ARE TO TROUBLESHOOT.
1  THIS DEMONSTATION CONSISTS OF FOUR PARTS. THE FIRST IS THE
1  INTRODUCTION AND SET-UP, WHICH YOU ARE IN NOW. THE SECOND IS
1  INSTRUCTION IN OPERATION OF THE VOLT-OHM METER. THE THIRD
1  SECTION CONSISTS OF A DESCRIPTION OF THE RECEIVER, WHILE THE
1  LAST IS AN EXAMPLE OF TROUBLESHOOTING FAILURES. PRESS TURN CR.
1  VERY GOOD, YOU HAVE COMPLETED THE SYSTEM INTRODUCTION SECTION
1  OF THE COURSE. IF YOU WISH A REPEAT OF THE SYSTEM INSTRUCTIONS
1  TYPE YES , OTHERWISE TURN, CR.
1  THE NEXT SECTION PRESENTED WILL PROVIDE INSTRUCTION AS TO
1  THE PROPER SETUP OF THE RECEIVER FOR TRAINING.
1
*1
2  PLACE RECEIVER ON TABLE ADJACENT TO THE KEYBOARD.
2  TYPE ENTER AND CR.
2  VERY GOOD, NOW
2  GOOD, NOW
2
2  TURN THE VOLUME KNOB TO 3 O'CLOCK.
2  YOUR VOLUME IS SET TOO HIGH, TURN THE VOL KNOB TO THE LEFT.
2  YOUR VOLUME IS SET TOO LOW, TURN THE VOL KNOB TO THE RIGHT.
2  TURN THE BFO KNOB TO 2 O CLOCK.
2  YOUR BFO SETTING IS TOO HIGH,TURN THE BFO KNOB TO THE LEFT.
2  YOUR BFO SETTING IS TOO LOW, TURN THE BFO KNOB TO THE RIGHT.
2  SET THE MODE SWITCH TO AM.
2  THE MODE SWITCH IS WRONG,
2  SET THE BAND SELECT KNOB TO BAND A
2  YOUR BAND SELECT KNOB SETTING IS IN ERROR.
2  SET THE MAIN TUNING KNOB SO THAT THE INDICATOR IS AT 2.2 MHZ.
2  THE MAIN TUNER IS SET TOO HIGH, REDUCE THE FREQUENCY.
2  THE MAIN TUNER IS SET TOO LOW, INCREASE THE FREQUENCY.
2  THE MAIN TUNER IS IN ERROR ,
2  NOW RECHECK THE CONTROLS. IF YOU FEEL THEY ARE PROPERLY SET
2  TYPE TURN CR. IF NOT, RESET THE CONTROLS AND TYPE TURN CR.
2  THERE HAS BEEN A CHANGE IN SETTINGS.
2  VERY GOOD. YOU HAVE CORRECTLY COMPLETED SETTING THE RECEIVER
2  INTO AN OPERATIONAL CONDITION.
2  SET UP THE EQUIPMENT. SET UP THIS RADIO RECEIVER AS FOLLOWS
2  * BFO SETTING TO 2 O CLOCK        * VOLUME SETTING TO FULL ON
2  * BAND SELECT KNOB TO B (MHZ)    * MODE SWITCH TO AM
2     * TUNING CONTROL TO 2.2 MHZ
2  THE FIRST STEP IN TROUBLESHOOTING IS TO PROPERLY
2  CORRECT THE SETTING AND CONTINUE.
2  FOR THE REMAINDER OF THE LESSON, ONLY THE VOLUME OR ON-OFF
2  SWITCH CONTROL NEED BE CHANGED. ALL OTHER KNOB OR CONTROLS
2  SHOULD REMAIN AS THEY ARE PRESENTLY SET.
*1
3  THE TEST EQUIPMENT YOU WILL BE USING IS A VOLT-OHM METER (VOM)
3  YOU WILL USE THIS VOM TO MEASURE THE ELECTRICAL CHARACTER-
3  ISTICS OF THE RECEIVER AND TO DIAGNOSE COMPONENT FAILURES.
3  ASSUME THE VOM READING INDICATES NINE AND ONE-HALF VOLTS.
3  ENTER THIS VALUE INTO THE SYSTEM.
3  VERY GOOD, THE CORRECT FORM IS 9.5
3  WRONG, THE CORRECT FORM IS 9.5, ENTER THE CORRECT VALUE.
3
3  WHEN YOU ARE REQUESTED TO ENTER A VOM READING INTO THE
3  COMPUTER, SUCH AS VOLTS OR OHMS,REMEMBER TO INCLUDE THE DEC-
3  CIMAL POINT. IF YOU ENTER THE WRONG VALUE, TYPE ERASE AND THEN
3  TYPE IN THE CORRECT DATA. TO ENTER THE DATA, PRESS CR.
3
3  RESISTANCE MEASUREMENTS CAN BE ENTERED IN OHMS OR KILO-OHMS.
3  WHEN ENTERING RESISTANCE DATA IN TERMS OF KILO-OHMS, TYPE K
3  AFTER THE NUMERICAL DATA TO INFORM THE SYSTEM THAT THE
3  DATA ENTRY IS IN KILO-OHMS.
3  ASSUME YOU KNOW THE VOLTAGE TO BE READ IS 0.8 VOLTS DC.
3  SELECT THE BEST VOM SCALE FOR THIS READING. AND TURN, CR.
3  VERY GOOD, WITH THIS SCALE YOU WILL GET THE MOST SENSITIVITY
3  WITHOUT PEGGING THE METER.
3  WRONG, THE 1.0 DC VOLT SCALE WILL GIVE YOU THE MOST SENSITIVTY
```

```
3  ASSUME THE VALUE TO BE MEASURED IS 5200.0 OHMS.
3  WRONG, THE R X 100 SCALE WILL GIVE YOU THE MOST SENSITIVITY.
3  THE VOM IS A DEVICE USED TO MEASURE VOLTAGES BETWEEN TWO
3  POINTS. THESE POINTS ARE DETERMINED BY PLACEMENT OF THE TEST
3  PROBES. NORMALLY VOLTAGES ARE MEASURED WITH RESPECT TO GROUND.
3  ATTACH THE VOM COMMON OR ALLIGATOR CLIP
3  TO THE CHASSIS GROUND STRAP.
3  IN ORDER TO ACTIVATE THE VOM IT IS NECESSARY TO PLACE THE
3  ON-OFF SWITCH IN THE ON POSITION. PLEASE DO SO.
3  THE POLARITY SWITCH IS USED TO SELECT + AND - VOLTAGES.
3  IF THIS SWITCH IS SET + AND A NEGATIVE DC VOLTAGE IS APPLIED,
3  THE NEEDLE WILL MOVE TO THE LEFT, BELOW ZERO.
3  TO MEASURE A - VOLTAGE, SET THE POLARITY SWITCH TO -. FOR AC
3  VOLTAGE MEASUREMENTS, EITHER POSITION MAY BE USED.
3  THIS METER WILL COVER A VOLTAGE RANGE BETWEEN + AND - 1000.0
3  VOLTS. GENERAL ACCURACY IS ABOUT 2 PER CENT, WHICH IS ACCEPT-
3  ABLE, SINCE THE EQUIPMENT YOU WILL BE MEASURING HAS A TOL-
3  ERANCE OF + OR - 10 PER CENT.
3  IN USING THE METER, IT IS GENERAL PRACTICE TO START AT THE
3  HIGHEST RANGE SCALE AND DECREASE THE SCALE UNTIL THE
3  MAXIMUM NEEDLE DEFLECTION OR SENSITIVITY IS OBTAINED WITHOUT
3  DRIVING THE NEEDLE AGAINST THE END.
3  THIS CAN PERMANENTLY DAMAGE THE INSTRUMENT.
3  RESISTANCE MEASUREMENTS IN OHMS ARE OBTAINED BY SELECTING THE
3  OHMS POSITION ON THE SELECT SWITCH. FOR RESISTANCE MEASURE-
3  MENTS, THE POLARITY SWITCH SHOULD BE POSITIVE. RESISTANCE
3  VALUES ARE FOUND BY MULTIPLYING THE NEEDLE INDICATION BY THE
3  MULTIPLICATION FACTOR ON THE SELECT SWITCH.
3  ONE IMPORTANT POINT SHOULD BE NOTED. DURING RESISTANCE
3  MEASUREMENTS --- TURN OFF THE RECEIVER ---.
3  WITH THE RECEIVER ON, IT IS POSSIBLE TO CAUSE AN ABNORMAL LOW
3  RESISTANCE TO GROUND. THIS CAN BURN OUT A METER.
3  THIS METER MAY NOT BE THE BEST, BUT IT IS ALL I HAVE.
3  AGAIN, IN MAKING MEASUREMENTS, START WITH THE HIGHEST SCALE
3  AND WORK DOWN TO A POINT OF MAXIMUM NEEDLE DEFLECTION WITH-
3  OUT PEGGING THE NEEDLE AGAINST THE STOPS.
3
3  ARE YOU FAMILIAR WITH THE USE OF THIS TYPE OF VOLT-OHM METER
3  TYPE YES OR NO, FOLLOWED BY PRESSING THE CR KEY.
3  ASSUME YOU HAVE A VOM READING OF SIXTY ONE HUNDRED OHMS.
3  6.1 K OR 6100.0 IS CORRECT.
3  WRONG, THE VALUE IS 6.1 K OR 6100.0, ENTER THE CORRECT VALUE.
3
3  IN ORDER TO ILLUSTRATE USE OF THE VOM, TWO SAMPLE PROBLEMS ARE
3  PRESENTED. THE 1ST OF THESE IS TO MEASURE A DC VOLTAGE WITH
3  THE BLACK VOM PROBE. MAKE SURE THE COMMON CLIP IS ATTACHED TO
3  THE CHASSIS GROUND, AND THE METER IS ON.
3  NOTE THAT ALL VALID TEST POINTS ARE PAINTED HOT GREEN.
3     MEASURE THE VOLTAGE AT R33, AND ENTER IT TO THE SYSTEM.
3  THE NOMINAL VOLTAGE YOU SHOULD READ IS DISPLAYED ABOVE.
3
3
3  CONSIDER THE CASE WHERE YOU ARE TO MEASURE RESISTANCE AT A
3  GIVEN TEST POINT. THE NOMINAL RESISTANCE IS SHOWN ABOVE.
3  SELECT THE PROPER VOM SCALE AND PRESS TURN CR.
3  NOW MEASURE AND ENTER THE RESISTANCE ON THE LINE SIDE OF THE
3  FUSE MOUNTED ON THE CHASSIS.
3  REPEAT THE VOLTAGE MEASUREMENT AT R33.
3  REPEAT THE RESISTANCE MEASUREMENT AT THE G2 DRAIN.
3  YOU HAVE SELECTED THE WRONG PARAMETER ON THE SCALE. HENCE
3  YOU WILL BE GIVEN A REVIEW OF THE VOM OPERATION.
3  IT APPEARS THAT YOU COULD USE A REVIEW OF THE VOM. HENCE
3  YOU ARE ON TO HIGH A SCALE, REDUCE THE SCALE FACTOR BEFORE
3  MEASURING AND ENTERING THE DATA.
3  YOU HAVE MISREAD THE VALUE ON THE METER, REREAD AND ENTER THE
3  CORRECT VALUE.
3  YOU HAVE TOUCHED THE WRONG TEST POINT, MEASURE THE CORRECT
3  ONE AND ENTER IT INTO THE COMPUTER.
3  IF YOU WISH A REPEAT OF THE VOM TYPE YES, OTHERWISE TURN.
3  SET THE POLARITY SWITCH TO +, AND CONTINUE.
3  WITHOUT PEGGING THE METER, SET THE METER TO THE PROPER SCALE.
3
3  CORRECT, THE R X 1 IS THE PROPER SCALE. PRESS TURN CR.
3  WRONG, THE R X 1 IS THE PROPER SCALE, CORRECT YOUR VOM SCALE.
-1
4  H F OSCILLATOR
4
4  MIXER
4  I F AMPLIFIER
4  AGC AMPLIFIER
4  AUDIO
4  POWER SUPPLY
4  AT THIS TIME WE WILL RELATE THE CIRCUIT BOARD TEST POINTS
4  TO THOSE SHOWN ON THE SCHEMATIC ABOVE.
4  THIS NEXT SECTION IS A FUNCTIONAL DECRIPTION OF THE RECEIVER.
4  IT WILL TAKE 20 MINUTES TO COMPLETE. IF YOU WISH TO BYPASS
4  THIS NEXT SECTION TYPE YES, OTHERWISE NO.
4  THE FOLLOWING IS A FUNTIONAL DESCRIPTION OF THE RECEIVER. USE
```

```
    THE TURN KEY TO ADVANCE THE DESCRIPTIVE TEXT. WHEN YOU ARE
    ASKED TO FIND A TEST POINT, USE THE BLACK DC VOLTAGE PROBE.
    IF YOU DO NOT GET THE PROPER POINT, KEEP PROBING UNTIL YOU
    TOUCH THE CORRECT ONE. WHEN YOU HAVE FOUND THE PROPER TEST
    POINT, PRESS TURN TO ADVANCE TO THE NEXT FUNTIONAL BLOCK.

THE PURPOSE OF THIS RECEIVER IS TO CONVERT RADIO SIGNALS TO
    AN AUDIO SIGNAL. RADIO WAVES ARE DETECTED BY THE ANTENNA SHOWN
    IN THE UPPER LEFT PORTION OF THE SCHEMATIC.

THE DESIRED RADIO FREQUENCY IS SELECTED BY A RADIO FILTER
    CONTROLLED BY A VARIABLE CAPACITOR. THIS FILTER PERMITS ONLY
    SELECTED RADIO FREQUENCIES THROUGH. THIS VARIABLE CAPACITOR IS
    MECHANICALLY CONNECTED TO THE MANUAL OPERATED TUNING KNOB.
    THE HIGH FREQ.OSCILLATOR SECTION, SHOWN ABOVE, IS AN OSCILLATOR
    WHICH HAS A FREQ. 455 KHZ LOWER THAN THE SELECTED RADIO FREQ.,
    SELECTED BY THE TUNER. THIS 455 KHZ DIFFERENCE IS MAINTAINED
    THROUGH A MECHANICAL COUPLING TO THE TUNING KNOB.
    THIS HIGH FREQ.OSCILLATOR SIGNAL IS THEN OUTPUT TO THE MIXER

THE MIXER BLOCK, SHOWN ABOVE, COMBINES THE SELECTED RADIO FREQ.
    (RF) SIGNAL WITH THE OUTPUT OF THE H.F. OSCILLATOR AT THE TRAN
    SISTOR Q2. THE OUTPUT OF MIXER Q2,IS THE 455 KHZ DIFFERENCE
    BETWEEN THE RF SIGNAL AND H.F. OSCILLATOR.
    THIS 455 KHZ SIGNAL IS KNOWN AS THE INTERMEDIATE FREQ. OR IF
    SIGNAL. THE SIGNAL AT THE OUTPUT OF Q2, IS PASSED THROUGH
    CERAMIC FILTERS FL1 AND FL2 TO IMPROVE FREQ. SELECTIVITY. THE
    OUTPUT OF FL2 THEN ENTERS THE IF AMPLIFIER DESCRIBED NEXT.
    PURPOSE OF THE IF AMP IS TO AMPLIFY THE SIGNAL FROM THE MIXER.
    THE IF AMP CONTAINS TWO AMPLIFICATION STAGES IN TRANSISTORS
    Q3 AND Q4. AFTER THE SECOND AMPLIFICATION STAGE, THE SIGNAL IS
    THEN PASSED AGAIN THROUGH A FILTER ,FL3,FOR FREQ.SELECTIVITY.
    THE AUTOMATIC GAIN CONTROL (AGC) AMPLIFIER PROVIDES A GAIN
    CONTROL TO THE IF AMP. THIS GAIN CONTROL IS ACHIEVED BY CHANG-
    ING THE IF STAGE BASE BIAS VOLTAGES.
    THE OUTPUT OF Q5, WHICH ACTS AS A AMPLIFIER-RECTIFIER, IS
    FILTERED BY CAPACITOR C16 TO A BIAS ROUGHLY PROPORTIONAL TO
    THE IF SIGNAL LEVEL. THIS BIAS IS THEN USED TO BIAS THE BASE
    OF Q3 AND Q4, RESULTING IN AN INCREASE OR DECREASE OF GAIN.
    THE AUDIO AMPLIFIER CONVERTS THE AMPLITUDE MODULATED IF SIGNALLED
    TO AN AUDIO SIGNAL.
    THIS IS ACCOMPLISHED BY FILTERING THE IF SIGNAL BY CAPACITORS.
    THE REMAINING SIGNAL IS THE LOWER FREQUENCY AUDIO SIGNAL,WHICH
    IS CONNECTED TO THE VOLUME CONTROL.
    THE VOLUME CONTROL IS A VARIABLE RESISTOR WHICH GOVERNS THE
    VOLTAGE TO THE AUDIO PRE-AMP Q6. THE OUTPUT OF Q6 IS
    FURTHER AMPLIFIED BY Q7 AND OUTPUT TO A SPEAKER OR PHONE BY
    THE COMPLEMENTARY OUTPUT STAGE AMPLIFIERS Q8 AND Q9.
    THE POWER SUPPLY PROVIDES THE REGULATED DC VOLTAGE WHICH IS
    NECESSARY FOR ALL RECEIVER OPERATION.A TRANSFORMER REDUCES THE
    120 VOLT AC SIGNAL TO 32 VOLTS AC AT THE INPUT TO THE 4 DIODE
    BRIDGE. THIS BRIDGE RECTIFIES THE AC VOLTAGE TO A DC VOLTAGE.
    THE VOLTAGE LEVEL IS 21 VOLTS DC, SET BY ,RANSISTORS D9 AND D10.
    LAMPS PL1 AND PL2 ARE DRIVEN BY THE LOWER VOLTAGE
    .T THE TRANSFORMER SECONDARY OUTPUT. THE ENTIRE POWER SUPPLY
    AND RECEIVER IS PROTECTED BY A 0.75 AMP FUSE BY THE ON-SWITCH.

PLACE YOUR PROBE ON THE OUTPUT OF THE H.F. OSCILLATOR AT Q1.
    PLACE YOUR PROBE AT THE OUTPUT OF THE MIXER CIRCUIT.
    PLACE YOUR PROBE AT THE 1ST STAGE IF AMPLIFIER OUTPUT.
    PLACE YOUR PROBE AT THE AGC AMPLIFIER OUTPUT.
    PLACE YOUR PROBE ON THE 1ST STAGE AUDIO AMPLIFIER OUTPUT.
    PLACE YOUR PROBE ON THE FILTERED DC POWER SUPPLY.

YOU WERE IN THE RIGHT FUNCTIONAL BLOCK, BUT THE TEST POINT IS
    THE GATE OF Q1.
    THE DRAIN OF Q2.
    THE COLLECTOR OF Q3.
    THE Q5 COLLECTOR.
    THE COLLECTOR OF Q6.
    THE R33 RESISTOR.
    PLACE THE TEST PROBE AT THE PROPER TEST POINT.
    VERY GOOD, THE CORRECT TEST POINT WAS
    YOU MADE A GROSS ERROR IN FUNCTIONAL UNDERSTANDING OF THE
    RECEIVER, AND WILL RECEIVE MORE INSTRUCTION. CORRECT PT. WAS
    WOULD YOU LIKE TO REPEAT OF THE FUNCTIONAL DESCRIPTION
    THE RECEIVER DECRIPTION WILL BE GIVEN ON A FUNCTIONAL BASIS.
    IN ORDER TO ADVANCE THE FUNCTIONAL DESCRIPTION TEXT USE THE
    TURN COMMAND.

-1
5   IN ORDER TO ILLUSTRATE THE APPLICATION OF THIS SYSTEM,
5   AN EXAMPLE IS GIVEN OF A SIMPLE FAILURE..
5   CONSIDER THE FAILURE CASE WITH THE FOLLOWING SYMPTOMS
5    PILOT LIGHTS ON, BUT NO SOUND OR S-METER DEFLECTION.
5
5
5
5   VERY GOOD YOU WILL NOTICE THE VALUE IS NORMAL.
```

```
5    YOU DID NOT MEASURE THE INSTRUCTED TEST POINT.
5    YOU HAVE THE VOM SCALE READING THE WRONG PARAMETER.
5    THE VALUE IS NOMINAL, PROCEED.
5    ENTER THE READING INTO THE COMPUTER.
5
5
5    THE 1ST STEP WOULD BE TO DETERMINE IF THE POWER SUPPLY WORKS.
5    MEASURE THE DC VOLTAGE AT THE RESISTOR R33.
5    .MEASURE THE DC VOLTAGE AND ENTER IT INTO THE COMPUTER.
5    THE POWER SUPPLY APPEARS NORMAL. HENCE IT APPEARS THAT
5    SOMETHING UPSTREAM OF THE S METER HAS FAILED.
5    A GOOD PLACE TO START IS IN THE MIDDLE OF THE SIGNAL PATH,
5    IN THE IF STAGE. MEASURE THE DC VOLTAGE AT THE G3 EMITTER.
5    TRY THE Q4 EMITTER DOWNSTREAM.
5    TRY THE COLLECTOR OF G5.
5    THIS VALUE IS ALSO NORMAL, HENCE WE CAN CONCLUDE THAT DOWN-
5    STREAM OF Q3,THE SYSTEM APPEARS NOMINAL. HENCE IT APPEARS THAT
5    WE SHOULD PROCEED UP-STREAM OF THE TRANSISTOR Q3.
5    THE MOST LOGICAL POINT WOULD BE AT THE DRAIN OF THE MIXER, Q2.
5    NOTICE THAT THE VOLTAGE IS SIGNIFICANTLY DOWN FROM NORMAL.
5    NOW MEASURE GATE 1 OF THE MIXER Q2.
5    GATE 1 IS NORMALLY AT A LOW VOLTAGE DUE TO THE
5    SMALL RF SIGNAL. TRY GATE 2 OF Q2.
5    SINCE THE HI-FREQ OSCILATOR GATE IS NORMAL, THE NEXT STEP
5    WOULD BE TO MEASURE THE SOURCE VOLTAGE OF THE MIXER Q2.
5    NOTE THAT THIS DC VOLTAGE IS DOWN FROM NOMINAL, HENCE IT WOULD
5    APPEAR THAT THE PROPER BIAS IS NOT BEING APPLIED TO THE DRAIN
5    OF Q2.
5    SINCE THE PROPER VOLTAGE WAS MEASURED AT GATE 2 AT Q2, IT
5    APPEARS THAT THE COIL FROM THE DC POWER SUPPLY, TO THE DRAIN
5                                THE END
5    IT HAS BEEN A PLEASURE TO WORK WITH YOU.
5          ,   YOU HAVE COMPLETED THE FUNCTIONAL DESCRIPTION
5    .PORTION OF THE LESSON. THE NEXT SECTION WILL ILLUSTRATE A
5    METHOD OF ISOLATING A COMPONENT FAILURE.
5    OF Q2 ,L8, HAS OPENED, WHICH IT HAS.
5    VERY GOOD, NOTE THAT THE POWER SUPPLY DC VOLTAGE REFERENCE IS
5    NORMAL. NOTE THAT SINCE THE S METER(IN THE AGC) IS ZERO, THERE
5    MUST BE A FAILURE UPSTREAM OF THE AGC OUTPUT.
5    A LOGICAL PLACE WOULD BE MIDWAY BETWEEN THE ANTENNA AND THE
5    S METER. GENERALLY STARTING AT THE MIDPOINT OF A FAILED
5    SIGNAL PATH WILL RESULT IN FASTER FAILURE ISOLATION.
5    SINCE THIS VALUE IS NORMAL, WE WILL PROCEED DOWN THE SIGNAL
5    PATH TO FIND ANY ABNORMALITIES. PRESS TURN CR.
5    THE 2ND STAGE IF CIRCUIT APPEARS NORMAL, HENCE THE FAILURE
5    MUST BE IN THE AGC OR UPSTREAM OF THE IF AMP. PRESS TURN CR.
5    NOTE THAT THIS VALUE IS DOWN FROM NORMAL. THE ZERO READING ON
5    THE VOM IMPLIES THERE IS NOT SUFFICIENT VOLTAGE BEING
5    APPLIED TO THE Q2 DRAIN FROM THE POWER SUPPLY.
5    SINCE YOU FOUND THAT THE DC POWER SUPPLY WAS NORMAL, SOMETHING
5    HAS FAILED BETWEEN THE POWER SUPPLY AND Q2 DRAIN.
5    IN THIS CASE THE COIL HAS FAILED OPEN, RESULTING IN NO VOLTAGE
5    BEING APPLIED TO THE Q2 DRAIN. THIS RESULTED IN NO SIGNAL
.5   BEING AVAILABLE DOWN STREAM , HENCE NO S METER DEFLECTION.
-2
TERM
 *STOP* 0
C
     COMMON/THRUST/MODE,A(1000)
     COMMON/SWITCH/ISS1,ISS2,ISS3,ISS4,ISS5
C
C                   **** PARAMETER INPUTS ****
C
C
C
C           VARIABLE INPUTS
C
     EQUIVALENCE (IOCN1 ,A(021)),(IOCN2 ,A(022)),(IOCN3 ,A(023)),
    1            (JCRF3 ,A(220)),(JYES  ,A(223)),(JNO   ,A(224))
     CALL FETCH
     PAUSE 1
   1 DO 2 I = 1,1000
   2 A(I) = 0.0
     MODE = -1
   3 CONTINUE
     CALL CONVRT
     CALL DCOM
     JDCN  = A(010) + 0.01
     CALL KEDISP(JDCN)
     CALL QUE
C
     IF (IOCN1.EQ.-1) CALL INTRO
     CALL SETUP
     CALL VOM
     CALL FDES
     CALL EXAM1
C
     CALL DISPLY
     CALL RECORD
     IF (MODE.NE.-1) GO TO 4
``` continued

```
      4 CALL EXEC
        MODE = MODE + 1
        IF (MODE) 1,3,5
      5 CONTINUE
      6 CALL CONVRT
        CALL DCOM
C
        IF (IOCN1.EQ.1) CALL INTRO
        IF (IOCN1.EQ.2) CALL SETUP
        IF (IOCN1.EQ.3) CALL VOM
        IF (IOCN1.EQ.4) CALL FDES
        IF (IOCN1.EQ.5) CALL EXAM1
C
        CALL GUE
        CALL DISPLY
        CALL EXEC
        CALL RECORD
        IF (MODE.LE.0) GO TO 10
      7 CONTINUE
        IF (MODE.GT.0) GO TO 6
     10 IF (MODE.EQ.0) CALL CONVRT
        CALL EXEC
        IF (MODE.LT.0) GO TO 1
        MODE = 1
        GO TO 6
        END

COO    15:37  DEC 31, '99
        1                                        DEF     FETCH
        2                                        SYSTEM  SIG7FDP
        3         00000C00                       SYSTEM  BPM
        4         01 00C00              FETCH EQU       $
        5  01 00000    04800000 02              M:SEGLD  NAME,WAIT
           02 00000    01000004 01
           02 00001    00000005 01
        6  01 00001    32800004                  LW,8    WAIT
        7  01 00002    69300001                  BNEZ    $-1
        8  01 00003    E8000C0F A                B       *15
        9  01 00004                      WAIT   RES      1
       10  01 00005    04C4C3D6 A        NAME   TEXTC    C'DCOM'
           01 00006    D4404040 A
       11                                        END

C
      SUBROUTINE EXEC
C
C        MOD 1    MARCH, 1971
C
      COMMON/THRUST/INIT,A(1000)
      COMMON/SWITCH/ISS1,ISS2,ISS3,ISS4,ISS5
      COMMON/STP/ISTOP
      COMMON/XFNXEC/IXFNE
      COMMON/CARDIM/ALF(20)
      DIMENSION      IR(20),RAL(20)
C NOTE DIMENSION IDX(MIDX),VAL(MIDX)
      DIMENSION IDX(200),VAL(200),IDX1(1),VAL1(1),ICTY(1),VALTY(1)
      EQUIVALENCE (VAL,VAL1,VALTY),(IDX,IDX1,ICTY)
      INTEGER ALF,XYZ
      EQUIVALENCE (OUT   ,A(139))
      IF (INIT) 100,1500,1530
  100 IF (INIT.GT.-2) GO TO 110
      IF (ISTOP.NE.0) ISTOP = 0; CALL STOP
      IF (ILP.EQ.1) RETURN
      GO TO 1700
C
C              ******** SET NOMINAL PARAMETERS AND INITIAL VALUES *
C
  110 IRUN = 0
      PCOFLW = 0.
      ASSIGN 9410 TO JMPC
      IPCC = 0
      ILP = 0
      IXFNE = 0
      IF (A(131).EQ.0.0) A(131) = 3.0
      IF (A(132).EQ.0.0) A(132) = 0.1
      IF (A(133).EQ.0.0) A(133) = 10000.0
      IF (A(134).EQ.0.0) A(134) = 0.1
      IF (A(135).EQ.0.0) A(135) = 10000.0
      IF (A(145).EQ.0.0) A(145) = 1.0
      IF (A(146).EQ.0.0) A(146) = 1000.0
      IF (RNDOM.EQ.156.7390) GO TO 170
      RNDOM = 156.7390
      MIDX = 200
      LW = 9
      LR = 5
      LRA = 3
      IDIN = 122
      RUN = 0.0
      IREAL = 0
```

```
        ISTOP  = 0
        ICT  = 0
        ICT1   = 0
        JJ = 0
        ISAVE = 0
        ISAVE1 = 1
        ISAVET = 1
        CALL PRINT
170     RUN = RUN + 1.0
        A(138) = RUN
        WRITE (LW,9810) RUN
        WRITE (102,9820) RUN
        CALL DIN(IDIN,ISW)
        ISS1 = MOD(ISW/2 ,2)
        ISS2 = MOD(ISW/4 ,2)
        ISS3 = MOD(ISW/8 ,2)
        ISS4 = MOD(ISW/16,2)
        ISS5 = MOD(ISW/32,2)
        IF (IREAL.NE.0) IREAL = 0; ASSIGN 1400 TO JMPC; GO TO 1330
        IF(ISS4.EQ.0) GO TO 1103
        GO TO 230
201     IF (PCOFLW.LE.0.0) ISAVE = 1
        GO TO 230
211     ISAVE = 0
        GO TO 230
215     WRITE(LW,9803)
        WRITE(102,9811)
        IF (PCOFLW.LE.0.0) GO TO 217
        WRITE(102,9806); WRITE(LW,9807);
      1 WRITE(LW,9817) (IDX(I),VAL(I),I=1,ICT)
        IF (ICT1.GT.0) WRITE(LW,9818) (IDX(I),VAL(I),I=ICT+1,ICT+ICT1)
        IF (JJ.GT.0) J=ICT+ICT1; WRITE(LW,9819) (IDX(I),VAL(I),I=J+1,J+JJ)
217     IF (ICT1+JJ.LE.0) GO TO 219
        DO 218 I = 1,ICT1+JJ
        VALTY(I) = VALTY(ICT + I)
218     IDTY (I) = IDTY (ICT + I)
219     ICT    = 0; ISAVE1 = ISAVET = 1; PCOFLW = 0.
        GO TO 230
C
C             ******* READ CARD INPUT *********
C
230     READ(LR,232)ALF(I),I = 1,20
232     FORMAT(20A4)
        DECODE(80,235,ALF)XYZ
235     FORMAT(A1)
240     IF (XYZ.EQ.1HC) GO TO 198
        IF (XYZ.EQ.1H/) GO TO 230
        DECODE(80,250,ALF)XYZ
250     FORMAT(A3)
        IF (XYZ.EQ.3HPRI) GO TO 300
        IF (XYZ.EQ.3HPCC) GO TO 400
        IF (XYZ.EQ.3HRUN) GO TO 1090
        IF (XYZ.EQ.3HSAV) GO TO 201
        IF (XYZ.EQ.3HXSA) GO TO 211
        IF (XYZ.EQ.3HERA) GO TO 215
        IF (XYZ.EQ.3HSTO) GO TO 1000
        IF (XYZ.EQ.3HSEA) GO TO 700
        IF (IPCC.EQ.1) GO TO 400
        WRITE(LW,270)ALF(I),I = 1,20
270     FORMAT(12H INPUT ERROR/20A4)
198     DECODE(80,200,ALF) IR(I),I = 1,20
200     FORMAT(1X,19A4,A3)
210     WRITE(LW,220)( IR(I),I = 1,20)
220     FORMAT(20X,19A4,A3)
        GO TO 230
C
C             **** READ PRINT SPEC CARDS ****
C
300     CALL PRINT
        DECODE(80,235,ALF)XYZ
        IPCC = 0
        GO TO 240
C
C             **** READ PARAMETER CHANGES FROM CARDS ****
C
400     IF (XYZ.EQ.3HPCC) GO TO 650
410     DECODE(80,420,ALF)(IR(I),RAL(I),I = 1,5)
420     FORMAT(5(I4,E11.4))
        WRITE(LW,450)(IR(I),RAL(I),I = 1,5)
450     FORMAT(5(I5,E15.7))
        DO 600 IK = 1,5
        JK = IR(IK)
        IF (JK) 470,600,500
500     IF (JK.GT.999) GO TO 470
        IF (ICT + ICT1 + JJ.LT.MIDX) GO TO 504
        IF (PCOFLW.GT.0.0) GO TO 504
        ASSIGN 502 TO JMPC; GO TO 1280
502     WRITE(LW,450) (IR(K),RAL(K),K=IK,5)
504     A(JK)    = RAL(IK)
```

```
      IF (ISAVE.EQ.0) GO TO 550
      IF (ICT.EQ.0) GO TO 520
      DO 510 K = 1,ICT
      IF (JK.NE.IDX(K)) GO TO 510
      VAL(K) = RAL(IK)
      GO TO 600
  510 CONTINUE
  520 IF (ICT1 + JJ.LE.0) GO TO 526
      DO 524 K = ICT + ICT1 + JJ + 1, ICT + 2, -1
      IDX(K) = IDX(K - 1)
  524 VAL(K) = VAL(K - 1)
  526 ICT = ICT + 1
      IDX(ICT) = JK
      VAL(ICT) = RAL(IK)
      GO TO 600
  550 IF (ISAVE1.EQ.0) GO TO 600
      IF (JJ.LE.0) GO TO 556
      DO 554 K = ICT + ICT1 + JJ + 1, ICT + ICT1 + 2, -1
      IDX(K) = IDX(K - 1)
  554 VAL(K) = VAL(K - 1)
  556 ICT1 = ICT1 + 1
      IDX1(ICT + ICT1) = JK
      VAL1(ICT + ICT1) = RAL(IK)
  600 CONTINUE
      IF (PCTAPE - 1.0) 230, 780, 230
C
C               **** PARAMETER CHANGE CARD ERROR ****
C
  470 WRITE(LW,480)(IR(K),RAL(K),K = 1,5)
  480 FORMAT(11H CARD ERROR/5(I5,E15.7)/)
      WRITE(102,485)
  485 FORMAT($CARD ERROR$)
  490 PAUSE
      INIT = -2
      RETURN
  650 IPCC = 1
      PCTAPE = 0.
      WRITE(LW,670)
  670 FORMAT(/23H PARAMETER CHANGE CARDS)
C
C               **** ERASE TYPEWRITER STACK ****
C               **** ERASE TEMPORARY CARD STACK ****
C
      IF (JJ.LE.0) GO TO 682
  674 WRITE(102,9812)
      READ(102,235) ICHK
      IF (ICHK.EQ.1HY) GO TO 676
      IF (ICHK.EQ.1HN) GO TO 678
      IF (ICHK.EQ.1HL) GO TO 686
      GO TO 674
  676 WRITE (102,1270)
      WRITE (LW,9802)
      IF (PCOFLW.GT.0.0) WRITE(102,9806); WRITE(LW,9807);
     1 WRITE(LW,9819) (IDX(I),VAL(I),I=ICT+ICT1+1,ICT+ICT1+JJ)
      JJ = 0
      GO TO 682
  678 DO 680 I = ICT + 1, ICT + JJ
      IDTY (I) = IDTY (I + ICT1)
  680 VALTY(I) = VALTY(I + ICT1)
  682 ICT1 = 0, ISAVE1 = ISAVET = 1, PCOFLW = 0.
      GO TO 230
  686 WRITE(102,9813) (IDTY(I),VALTY(I),I=ICT+ICT1+1,ICT+ICT1+JJ)
      GO TO 674
C
C             **** SEARCH AND READ PARAMETER CHANGE CARDS FROM TAPE *
C
  700 IPCC = 0
      DECODE(80,720,ALF)CONF,XMACH,ALT,STGO
  720 FORMAT(8X,A2,1X,A3,1X,A2,1X,A3)
      REWIND LRA
  730 READ(LRA,232)ALF(I),I = 1,20
      DECODE(80,720,ALF)CONFX, XMACHX, ALTX
  750 FORMAT(1X,A2,1X,A3,1X,A2)
      IF (CONFX.EQ.2HAT) GO TO 950
      IF (XMACH.NE.XMACHX) GO TO 730
      IF (ALT.NE.ALTX) GO TO 730
      IF (CONF.NE.CONFX) GO TO 730
      WRITE(LW,770)
  770 FORMAT(/33H PARAMETER CHANGE CARDS FROM TAPE)
  740 READ(LRA,232)ALF(I),I = 1,20
      DECODE(80,800,ALF)XYZ
  800 FORMAT(A1)
      IF (XYZ.NE.1H ) GO TO 950
      PCTAPE = 1.0
      GO TO 410
  950 WRITE(LW,970)CONF,XMACH,ALT
  970 FORMAT(//29H NO DATA FOR IDENTIFICATION /A2,1H/A3,1H/A2)
      WRITE(102,9814) CONF,XMACH,ALT
      IF (STGO.NE.3H   ) GO TO 490
      IRUN = 1
```

```
          GO TO 230
  930 REWIND LRA
      GO TO 230
C
C                    **** END OF RUN ****
C
 1000 IF ((ICT.GT.0) WRITE(LW,9817) (IDX(I),VAL(I),I=1,ICT)
      IF ((ICT1.GT.0) WRITE(LW,9818) (IDX(I),VAL(I),I=ICT+1,ICT+ICT1)
      IF (JJ.GT.0)WRITE(LW,9819)(IDX(I),VAL(I),I=ICT+ICT1+1,ICT+ICT1+JJ)
      WRITE(LW,1050)
 1050 FORMAT(//11H END OF RUN)
      WRITE(102,1060)
 1060 FORMAT ($N$, $ TO CONTINUE, TYPE CON $)
      READ(102,1110)ICHK
      IF ((ICHK.EQ.3HCON) GO TO 2550
      STOP
 1090 IF ((ISS4.EQ.0) GO TO 1103
      ASSIGN 1400 TO JMPC; GO TO 1330
C
C              ******** TYPEWRITER INPUT ********
C
 1103 WRITE(102,1105)
 1105 FORMAT(12HINPUT PCC   )
      READ (102,235) ICHK
      IF ((ICHK.EQ.1HN) WRITE(LW,9801); GO TO 1140
 1107 WRITE (102,1108)
 1108 FORMAT (6HINPUT )
      READ(102,1110)ICHK
 1110 FORMAT(A3)
      IF ((ICHK.EQ.3HPCC) WRITE(LW,9801); GO TO 1140
      IF ((ICHK.EQ.3HERA) GO TO 1250
      IF ((ICHK.EQ.3HCAR) GO TO 230
      IF ((ICHK.EQ.3HRUN) ASSIGN 1400 TO JMPC; GO TO 1330
      IF ((ICHK.EQ.3HLIS) WRITE(102,9813) (IDTY(I),VALTY(I),I=ICT+ICT1+1,
     1                    ICT+ICT1+JJ); GO TO 1103
      IF ((ICHK.EQ.3HSTO) GO TO 1000
      WRITE (102, 1117)
 1117 FORMAT ($N$, $INPUT ERROR. COMMANDS ARE:$, $N$, $ PCC$, $N$,
     1        $ ERASE$, $N$, $ CARD$, $N$, $ RUN$, $N$, $ LIST$,
     2        $ STOP$ )
      GO TO 1107
C
C              **** READ PARAMETER CHANGES FROM TYPEWRITER ****
C
 1140 IF (MIDX-ICT-ICT1-JJ.LT.10) WRITE(102,9808) MIDX - (ICT+ICT1+JJ)
 1150 IF (ICT+ICT1+JJ.GE.MIDX) ASSIGN 1152 TO JMPC; GO TO 1280
 1152 WRITE(102,1170)
 1170 FORMAT($ I, V, = $)
      READ(102,232) ALF
      DECODE(1,235,ALF) ICHK
      IF ((ICHK.EQ.1HN) GO TO 1300
      DECODE(80,1171,ALF) IR(1),RAL(1)
 1171 FORMAT(I10,F10.0)
      IF (IR(1).GE.1000.OR.IR(1).LT.1) GO TO 1300
      WRITE(LW,450) IR(1),RAL(1)
      A(IR(1)) = RAL(1)
      IF( JJ.LT.1) GO TO 1210
      DO 1200 I = 1,JJ
      IF (IDTY(ICT+ICT1+I).EQ.IR(1))
     1    VALTY(ICT+ICT1+I) = RAL(1); GO TO 1150
 1200 CONTINUE
 1210 IF (ISAVET.EQ.0) GO TO 1150
      JJ      = JJ + 1
      IDTY(ICT+ICT1+JJ) = IR(1)
      VALTY(ICT+ICT1+JJ) = RAL(1)
      GO TO 1150
C
C              **** ERASE TYPEWRITER STACK ****
C
 1250 IF (PCOFLW.GT.0.0) WRITE(102,9806); WRITE(LW,9807);
     1 WRITE(LW,9819) (IDX(I),VAL(I),I=ICT+ICT1+1,ICT+ICT1+JJ)
      JJ      = 0
      PCOFLW = 0.; ISAVE1 = ISAVET = 1
      WRITE(102,1270)
 1270 FORMAT($N$ $TYPEWRITER STACK ERASED $ )
      WRITE(LW,9802)
      GO TO 1103
 1280 IF (PCOFLW.GT.0.0) GO TO JMPC
      ISAVE  = ISAVE1 = ISAVET = 0; PCOFLW = 1.
      WRITE(LW,9804)
      WRITE(102,9805)
      GO TO 1330
C
C              **** PARAMETER CHANGE FROM TYPEWRITER COMPLETE **
C
 1300 WRITE(102,9809)
      READ(102,235) ICHK
      IF ((ICHK.EQ.1HN) GO TO 1103
      ASSIGN 1400 TO JMPC; GO TO 1330
```

```
C                    **** TRANSFER TO A(   ) FROM CARD READER STACK **
C                    **** TRANSFER TO A( . ) FROM TYPEWRITER STACK ***
C
 1330 IF ((ICT + ICT1 + JJ).LE.0) GO TO JMPC
      DO 1390 I = 1, ICT+ICT1+JJ
      J  = IDX(I)
 1390 A(J) = VAL(I)
      GO TO JMPC
C
C            ******** TRANSFER PARAMETER VALUES AND
C                     COMPUTE STEP SIZE ********
C
 1400 A(89) = A(132)/A(131)
      DELT = A(89)
      N1 = A(145)
      N2 = A(146)
      DTDMP = A(133)
      DTOUT = A(134)
      TEOJ = A(135)
      CALL DIN(IDIN,ISW)
      ISS2 = MOD(ISW/4 ,2)
      IF (IRUN.EQ.1) INIT = -2
      RETURN
 1500 TDMP = DTDMP
      TOUT = DTOUT
      TM = A(1)
      GO TO 1700
 1530 IF (TEOJ.LT.TM) GO TO 2500
      IF(ISS2.GT.0) GO TO 1900
C
C                    ******** OUTPUT SECTION ********
C
 1540 IF (TOUT.GT.TM+.001) GO TO 1650
 1550 TOUT = TOUT + DTOUT
      IF (TOUT.LE.TM + 0.001) GO TO 1550
C
C                    **** PRINT TIME HISTORY ****
C
      CALL PRINT
 1650 IF (TDMP.GT.TM+0.001) GO TO 1900
 1680 TDMP = TDMP + DTDMP
      IF (TDMP.LE.TM + 0.001) GO TO 1680
 1700 IF (INIT.LE.-2) ILP = 1
      IF (OUT.NE.0.0) GO TO 1872
C
C                    **** PRINT A ARRAY DUMP ****
C
      J = 0
 1740 WRITE (LW,1750) N1,N2
 1750 FORMAT(//32H LIST OF NON-ZERO ELEMENTS IN A(I4,11H), THRU, A(I4,
     11H)/)
      DO 1850 I = N1,N2
      IF (A(I).EQ.0.0) GO TO 1850
      J = J + 1
      IF (J.LT.8) GO TO 1800
      WRITE(LW,1780)(IR(K),RAL(K),K = 1,7)
 1780 FORMAT(7(I4,E12.4))
      J = 1
 1800 IR(J) = I
      RAL(J) = A(I)
 1850 CONTINUE
      WRITE(LW,1780)(IR(K),RAL(K),K = 1,J)
      WRITE(LW,1870)
 1870 FORMAT(/)
      IF (IXFNE.NE.0) WRITE (102,9821)
 1872 IF (INIT.NE.0) GO TO 1900
C
C                    **** WAIT FOR START COMMAND FROM DISCRETE IDIN
C                         (BIT 12 OR BIT 13) ****
C
 1875 CALL DIN(IDIN,ISW)
      IVAR = IAND(ISW,1)
      ISS1 = MOD(ISW/2 ,2)
      ISS3 = MOD(ISW/8 ,2)
      IF(ISS1.GT.0) GO TO 2250
      IF (ISS3.GT.0) GO TO 2550
      IF (IVAR.EQ.0) IVARD = 0
      IF (IVAR.NE.0.AND.IVARD.EQ.0) IVARD = 1; GO TO 2250
      GO TO 1875
C
C                    **** RUN-TIME CHECK FOR STOP CONDITION FROM
C                         DISCRETE IDIN (BIT 10 OR BIT 13) ****
C
 1900 IF (INIT.LT.0) RETURN
      CALL DIN(IDIN,ISW)
      IVAR = IAND(ISW,1)
      ISS3 = MOD(ISW/8,2)
      IF (ISS3.GT.0) GO TO 2500
```

```
      IF (IVAR.EQ.0) IVARD = 0
      IF (IVAR.NE.0.AND.IVARD.EQ.0) GO TO 2800
 2250 TM = TM + DELT
      A(1) = TM
      RETURN
 2500 IF (ISTOP.NE.0) ISTOP = 0; CALL STOP
 2550 INIT = -2
      GO TO 1700
 2800 IREAL = 1
      IVARD = 1
      IF (ISTOP.NE.0) ISTOP = 0; CALL STOP
      ISS5 = MOD(ISW,32,2)
      IF (ISS5.NE.0) INIT = 0; RETURN
      INIT = -2
      GO TO 1700
C                   **** ERROR EXITS ****
 9410 WRITE(LW,9815)
C                   JMPC NOT ASSIGNED.
      WRITE(102,9816)
      INIT = -2
      GO TO 1700
 9801 FORMAT (/ 35H PARAMETER CHANGES FROM THE TYPEWRITER  )
 9802 FORMAT (/ 25H TYPEWRITER STACK ERASED. )
 9803 FORMAT (/ 19H CARD STACK ERASED. )
 9804 FORMAT (/    $ PCC STACK FILLED. THE FOLLOWING PCC WILL NOT BE$
     1             $ SAVED.$ )
 9805 FORMAT (     $ PCC STACK FILLED. N$)
 9806 FORMAT ($N$ $AMBIGUOUS STACK OPERATION. SEE LINE PRINTER.$)
 9807 FORMAT (/    $ DUE TO STACK OVERFLOW, THE FOLLOWING WERE TRANSFER$
     1             $ED TO THE A ARRAY PRIOR TO THIS ERASE REQUEST.$)
 9808 FORMAT (     $ UNUSED STACK = $ I2, $N$)
 9809 FORMAT (     $RUN    $)
 9810 FORMAT(1H1,50X,6HTHRUST// /43X 10HRUN NUMBER I4//)
 9811 FORMAT($N$ $CARD STACK ERASED$)
 9812 FORMAT ($N$ $OK TO ERASE TYPEWRITER STACK    Y OR N OR L(IST) $)
 9813 FORMAT (    $TYPEWRITER STACK$ ($N$ 3(I4,E11.4,4X)))
 9814 FORMAT ($N$ 29H NO DATA FOR IDENTIFICATION /A2,1H/A3,1H/A2)
 9815 FORMAT (//   $ TERMINATION BY EXEC EFN 9410.$
     1        /    $ PROGRAMMING ERROR IN EXEC. TAKE DUMP.$ //)
 9816 FORMAT ($N$ $ERROR TRAP IN EXEC. SEE LINE PRINTER.$ )
 9817 FORMAT (//   $ (SAVE,XSAVE) CARD STACK$/5(I6,E14.7))
 9818 FORMAT (//   $ TEMPORARY CARD STACK$/5(I6,E14.7))
 9819 FORMAT (//   $ TYPEWRITER STACK$/5(I6,E14.7))
 9820 FORMAT (    $N$ RUN NUMBER $ I3,$N$)
 9821 FORMAT ($N$ $ TRANSFER FUNCTION ERROR$)
      END

C
      SUBROUTINE CONVRT
C           FEBRUARY, 1972  - MODIFIED FOR REAL AND NON-REAL TIME
      DIMENSION    JDA(20),DASCF(20),JAD(24),ADSCF(24),DACV(20),
     1ADCV(24)
      COMMON/THRUST/INIT,A(1000)
      COMMON/SWITCH/ISS1,ISS2,ISS3,ISS4,ISS5
      COMMON/STP/ISTOP
      EQUIVALENCE (FACT  ,A(594))
      IF (INIT)100,200,500
  100 IF (INIT.LE.-2) RETURN
      FACT=1.
      A(500) = 589.0
      A(540) = 588.
      A(568) = 1.0
      A(569) = 1.0
      RETURN
  200 CONTINUE
      INUMAD = A(569)
      INUMDA = A(568)
      DO 250 I = 1,INUMAD
      ADSCF(I) = A(I+569)
  250 JAD(I) = A(I+539)
      DO 300 I = 1,INUMDA
      DASCF(I) = A(I+519)
  300 JDA(I) = A(I+499)
      DO 350 I = 1,INUMDA
      J = JDA(I)
  350 DACV(I) = A(J)*DASCF(I)
      IF (ISS2.EQ.0) GO TO 630
      CALL TIME
      ITAD=A(89)*10000.*FACT
      CALL CLOCK(ITAD,630S,900S)
      ICHECK = 1
      GO TO 630
  500 CONTINUE
  550 DO 600 I = 1,INUMDA
      J = JDA(I)
  600 DACV(I) = A(J)*DASCF(I)
      IF (ISS2.EQ.0) GO TO 630
      IF (ICHECK.EQ.0) CALL WAIT
      IF (ICHECK.EQ.1) ICHECK = 0; ISTOP = 1; CALL START
```

```
  630 CONTINUE
      CALL ADS4H (0,ADCV(1),INUMAD,0)
      CALL DABUT(0,DACV(1),INUMDA)
      DO 650 I = 1,INUMAD.
      J = JAD(I)
  650 A(J) = ADCV(I)*ADSCF(I)
  800 RETURN
  900 INIT = -2
      RETURN
      END

C
      SUBROUTINE DISPLY
      COMMON/THRUST/MODE,A(1000)
      COMMON/SWITCH/ISS1,ISS2,ISS3,ISS4,ISS5
      COMMON/STEXT/KETEXT(17),INTEXT(17),ITLIB(17,200)
      DIMENSION IDF(16),XTP(32),YTP(32),RNOM(32),V(2,30),IND(2),R(5,30)
      DIMENSION ITEXT1(3),ITEXT2(9),ITEXT3(9),ITEXT4(9),IT(8),ISTAT(8),
     1ITEXT5(10),IM(8),MCON(5)
      DIMENSION X(20),Y(20)
C
C         PARAMETER INPUTS
C
      EQUIVALENCE (XTP    ,A(401)),(YTP   ,A(451)),(V    ,A(601)),
     1            (R      ,A(701)),(DSP   ,A(212))
C
C         VARIABLE INPUT
C
      EQUIVALENCE (ITP    ,A(200)),(NTP   ,A(440)),(MDCN ,A(0501)),
     1            (IMETER,A(204)),(IFAIL ,A(206)),(TIME ,A(001)),
     2            (MCON   ,A(031)),(VALM  ,A(051)),(VOMN ,A(052)),
     3            (IGCN1  ,A(021)),(IGCN2 ,A(022)),(IGCN3 ,A(023)),
     4            (LBLK   ,A(250)),(NXY   ,A(251)),(X    ,A(260)),
     5            (Y      ,A(280)),(IUNTN ,A(054)),(IUNTM ,A(055)),
     6            (YL1    ,A(151)),(YL2   ,A(152)),(YL3  ,A(153)),
     7            (YL4    ,A(154)),(YL5   ,A(155)),(ITPD ,A(207)),
     8            (ITPMPV ,A(216)),(JHELP ,A(225))
C
C         VARIABLE OUTPUT
C
      EQUIVALENCE (XTPD   ,A(400)),(YTPD  ,A(450)),(VOMN1,A(445)),
     1            (VOMA   ,A(446))
C
      IF (MODE) 100,200,500
  100 CONTINUE
      IF (MODE.LE.-2) RETURN
      MCON(1) = 1
      MCON(2) = 2
      MCON(3) = 3
      MCON(4) = 4
      MCON(5) = 5
      DSP   = 1.
      XMIN  = 0.0
      XMAX  = 1.0
      YMIN  = 0.0
      YMAX  = 1.0
      X1    = 0.1
      X2    = 0.4
      Y1    = 0.35
      Y2    = 0.30
      JF    = 1
      IDB=1
      YL1   = 0.25
      YL2   = 0.20
      YL3   = 0.15
      YL4   = 0.10
      YL5   = 0.05
      RETURN
  200 CONTINUE
      IDSP  = DSP + 0.01
C
C         INITIALIZE S-50 SCOPE
C
      CALL DSELECT (IDSP)
      CALL DSCOPE(1)
      CALL DSETUP(IDF(1),465,1,0)
      CALL DSETUP(IDF(9),465,1,0)
      CALL DSETUP(ISTAT,10,0,0)
      CALL DSETUP(IT ,20,1,0)
C
      IF (IDSP.NE.1) GO TO 220
      CALL DINTEN(IDF(1),0)
      CALL DINTEN(IDF(9),0)
      CALL DINTEN(ISTAT,0)
      CALL DINTEN(IT,0)
  220 CONTINUE
C
      CALL DSCALE(XMIN,XMAX,YMIN,YMAX)
C
C
```

```
      CALL DCHAR(ISTAT,XMIN,YMIN,1H0)
      CALL DCHAR(ISTAT,XMIN,YMAX,1H0)
      CALL DCHAR(ISTAT,XMAX,YMAX,1H0)
      CALL DCHAR(ISTAT,XMAX,YMIN,1H0)
      CALL DCONTROL(IT,1)
      CALL DCONTROL (IDF,1)
      CALL DCONTROL (ISTAT,1)
      CALL DISP(1)
C
C           INITIALIZE DD-40 SCOPE
C
      CALL DSELECT(0)
      CALL DSCOPE(1)
      CALL DSCALE(XMIN,XMAX,YMIN,YMAX)
      CALL DSETUP(IM,50,1,0)
      CALL DISP(1)
      CALL DTEXT(IM,.40,.30,6HTIME=1)
      CALL DTEXT (IM,0.,0.8,7HLEVEL=1)
      IT0   = IM(2)
      CALL DCONTROL(IM,1)
  500 CONTINUE
      IM(2) = IT0
      CALL DSELECT (IDSP)
      CALL DSETUP(IDF(IDB),465,1,0)
C
C           DISPLAY MEASURED AND DESIRED TEST POINT
C
      XTPD  = 0.  , YTPD  = 0.
      IF (ITPMPV.NE.0) XTPD = XTP(ITPMPV)  , YTPD = YTP(ITPMPV)
      IF (ITPMPV.NE.0) CALL DCHAR(IDF(IDB),XTPD,YTPD,1H0)

XTPD1 = XTP(ITPD)
      YTPD1 = YTP(ITPD)
      IF (ITPD.NE.0) CALL DCHAR(IDF,XTPD1,YTPD1,1HX)
C
C           DISPLAY NOMINAL OUTPUT
C
      IF (MDCN.EQ.0) GO TO 540
      CALL DTEXT(IDF(IDB),X1,Y1,17HNOMINAL VALUE = 1)
      IF (IUNTN.EQ.1) CALL DTEXT(IDF(IDB),0.50,Y1,9HVOLTS DC1)
      IF (IUNTN.EQ.2) CALL DTEXT(IDF(IDB),0.50,Y1,9HVOLTS AC1)
      IF (IUNTN.EQ.3) CALL DTEXT(IDF(IDB),0.50,Y1,9H OHMS   1)
      IF (IUNTN.EQ.4) CALL DTEXT(IDF(IDB),0.50,Y1,10HKILO-OHMS1)
      VOMND = VOMN
      ENCODE (8,510,IND) VOMND
  510 FORMAT (F7.2,1H1)
      CALL DTEXT(IDF(IDB),0.35,Y1,IND)
C
C           DISPLAY VOM READING
C
      IF (MDCN.NE.2) GO TO 540
      CALL DTEXT(IDF(IDB),X1,Y2,17HMEASURED VALUE= 1)
      VOMA  = 0.
      IF (IMETER.LE.4) VOMM = VALM
      IF (IMETER.GE.9) VOMM = VALM
      IF ((IMETER.GE.9).AND.(IUNTM.GE.1))  VOMM = 0.001*VOMM
      ENCODE (8,510,IND) VOMM
      CALL DTEXT(IDF(IDB),0.35,Y2,IND)
C
C           DISPLAY MEASURED UNITS
C
      IF (IMETER.LE.4) CALL DTEXT(IDF(IDB),0.50,Y2,9HVOLTS-DC1)
      IF ((IMETER.GE.5).AND.(IMETER.LE.8)) CALL DTEXT(IDF(IDB),0.50,Y2,
     1     9HVOLTS-AC1)
      IF ((IMETER.EQ.9).AND.(IUNTM.LE.3)) CALL DTEXT(IDF(IDB),0.50,Y2,
     1     9H OHMS   1)
      IF ((IMETER.GE.9).AND.(IUNTM.GE.4)) CALL DTEXT(IDF(IDB),0.50,Y2,
     1     10HKILO-OHMS1)
  540 CONTINUE
C
      MC1   = MCON(1)
      MC2   = MCON(2)
      MC3   = MCON(3)
      MC4   = MCON(4)
      MC5   = MCON(5)
      CALL DTEXT(IDF(IDB),.0,YL1,ITLIB(1,MC1))
      CALL DTEXT(IDF(IDB),.0,YL2,ITLIB(1,MC2))
      CALL DTEXT(IDF(IDB),.0,YL3,ITLIB(1,MC3))
      CALL DTEXT(IDF(IDB),.0,YL4,ITLIB(1,MC4))
      CALL DTEXT(IDF(IDB),.0,YL5,ITLIB(1,MC5))
C
C           DISPLAY S-50 KEYBOARD
C
      CALL DTEXT(IDF(IDB),-1,0.,KETEXT)
C
C
C           DISPLAY FUNC. BLK OUTLINES
C
      IF (LBLK.EQ.0) GO TO 545
``` continued

```
C
        XX=X(1)
        YY=Y(1)
        CALL DCHAR(IDF,XX,YY,1H )
        DO 542 I=2,NXY
        XX=X(I)
        YY=Y(I)
        CALL DLINE(IDF,XX,YY)
  542 CONTINUE
  545 CONTINUE
C
        CALL DCONTROL(IDF(9/IDB),0)
        CALL DCONTROL(IDF(IDB),1)
        IF (IDB.EQ.1) IDB=9;GO TO 550
        IDB=1
  550 CONTINUE
C
C                   DISPLAY TIME
C
        CALL DSELECT(0)
        ENCODE(8,560,IND) TIME
  560 FORMAT(F5.0,1H )
        CALL DTEXT(IM,0.6,0.3,IND)
        ENCODE (8,573,IND) IOCN1
        CALL DTEXT(IM,0.1,0.8,IND)
  573 FORMAT (I4,1H )
        ENCODE (8,573,IND) IOCN2
        CALL DTEXT(IM,0.1,0.75,IND)
        ENCODE (8,573,IND) IOCN3
        CALL DTEXT(IM,0.1,0.70,IND)
        IF (JHELP.EQ.1) CALL DTEXT(IM,.4,.5,15HHELP AT STA. 11)
        CALL DFROMTO(IM,IM(1),IM(2))
        RETURN
        END

C
        SUBROUTINE KEDISP(JOCN)
        COMMON/THRUST/MODE,A(1000)
        COMMON/STEXT/KETEXT(17),INTEXT(17)
        DIMENSION JBUFF(6)
C
C                   VARIABLE OUTPUTS
C
        EQUIVALENCE (JCRFG ,A(220)),(JCHAR ,A(221)),(JWORD ,A(222)),
       1            (JYES  ,A(223)),(JNO   ,A(224)),(JHELP ,A(225)),
       2            (JDONE ,A(226)),
       3            (CRFG  ,A(240)),(CHAR  ,A(241)),(WORD  ,A(242))
C
        IF (MODE) 100,200,500
  100 IF (MODE.LE.-2) RETURN
        JCR   = 8Z00000025
        JCL   = 8Z000000FF
C                   SHORT COMMANDS
C                       TURN    = SLASH
C                       YES     =   COLON
C                       NO      =   SEMI-COLON
        JT    = 8Z00000061
        JER   = 8Z00000000
        JY    = 8Z0000007A
        JN    = 8Z0000005E
        JWMAX = 16
        KETEXT(17) = 4H
        MSK1  = 128
        MSK2  = 8Z80000000
        MSK3  = 8Z0000007F
        MSK4  = 8Z000000FF
        MSK5  = 8Z00404040
        MSK6  = 8ZFF00FFFF
        MSK7  = 8ZFFFF00FF
        MSK8  = 8ZFFFFFFC0
        JTTX  = 4HTURN
        JYTX  = 4HYES
        JNTX  = 4HNO
        IBLANK = 4H
        RETURN
  200 CONTINUE
        JCHAR = 0
        JWORD = 1
        JCRFG = 0
        JBUFF(1) = 0
        JBUFF(2) = 0
        JBUFF(3) = JCL
        JBUFF(4) = JCL
C           INITIAL CLEAR OF 316 S-50 BUFFER
C
        CALL DWRITE(JBUFF, 911,4)
C
        DO 220 I=1,14
```

```
  220 KETEXT(1) = IBLANK
      KETEXT(15) = 4H  I
      IKEY   =-1
      IFUN   =-1
  500 CONTINUE
      IKEYO  = IKEY
      IFUNO  = IFUN
C
C         READ 316  S-50 DISPLAY BUFFER
C
      IF (MODE.GT.0) CALL DINPUT(JBUFF,JDCN)
      IKEY   = JBUFF(3)
      IFUN   = JBUFF(4)
C
      IKEY   = IAND(IKEY,MSK4)
      IFUN   = IAND(IFUN,MSK4)
      JCRFG  = 0
      JYES   = 0
      JNO    = 0
      JDONE  = 0
C
C         CLEAR 316  S-50 DISPLAY BUFFER
C
      JBUFF(1) = 0
      JBUFF(2) = 0
      JBUFF(3) = JCL
      JBUFF(4) = JCL
      CALL DWRITE(JBUFF, 911,4)
C
      IF (IKEY.EQ.JER) GO TO 580
      IF (IKEY.EQ.JCL) RETURN
      IF (IKEY.EQ.JCR) GO TO 560
      IF (IKEY.EQ.JT) KETEXT(1) = JTTX ; GO TO 2000
      IF (IKEY.EQ.JY) KETEXT(1) = JYTX ; GO TO 2000
      IF (IKEY.EQ.JN) KETEXT(1) = JNTX ; GO TO 2000
      IF (JWORD.GT.14) RETURN
      JCHAR  = JCHAR + 1
      IF (JCHAR.GT.4) JWORD = JWORD + 1 ; JCHAR = 1
  510 IF (JCHAR.GT.1) GO TO 520
      JSB    = 0
      JSB    = IAND(IKEY,MSK1)
      KB     = IAND(IKEY,MSK3)
      KB     = 512*KB
      KB     = 256*KB
      KB     = 128*KB
      IF (JSB.NE.0) KB = IOR(MSK2,KB)
      KBUFF  = IOR(KB,MSK5)
      GO TO 550
C
  520 CONTINUE
      IF (JCHAR.GT.2) GO TO 530
      KBUFF  = IAND(KBUFF,MSK6)
      KB     = 256*IKEY
      KB     = 256*KB
      KBUFF  = IOR(KBUFF,KB)
      GO TO 550
C
  530 CONTINUE
      IF (JCHAR.GT.3) GO TO 540
      KBUFF  = IAND(KBUFF,MSK7)
      KB     = 256*IKEY
      KBUFF  = IOR(KBUFF,KB)
      GO TO 550
C
  540 CONTINUE
      KBUFF  = IAND(KBUFF,MSK8)
      KBUFF  = IOR(KBUFF,IKEY)
  550 CONTINUE
      IF ((JWORD.GT.0).AND.(JWORD.LE.14)) KETEXT(JWORD) = KBUFF
      GO TO 1000
C
C         COMPUTER ENTRY FROM S-50 KEYBOARD
C
  560 CONTINUE
      JCRFG  = 1
      DO 570 I=1,16
      INTEXT(I) = KETEXT(I)
  570 CONTINUE
      IF (INTEXT(1).EQ.4HYES ) JYES = 1
      IF (INTEXT(1).EQ.4HNO  ) JNO  = 1
      IF (INTEXT(1).EQ.4HHELP) JHELP = 1
      IF (INTEXT(1).EQ.4HNO..) JNO  = 1
      IF (INTEXT(1).EQ.4HDONE) JDONE = 1
      IF (JHELP.EQ.1) JCRFG = 0
C
C         ERASE KEYBOARD TEXT
C
  580 CONTINUE
      DO 590 I=1,14
```

```
      KETEXT(I)  = IBLANK
  590 CONTINUE
      JCHAR  = 0
      JWRD   = 1
 1000 CONTINUE
      CRFG   = JCRFG
      CHAR   = JCHAR
      WORD   = JWRD
      YES    = JYES
      RETURN
 2000 CONTINUE
      JWRD   = JWRD + 2
      RETURN
      END

C
      SUBROUTINE DSTORE
      COMMON/THRUST/MODE,A(1000)
      COMMON/STEXT/KETEXT(17),INTEXT(17),ITLIB(17,200)
      DIMENSION KARD(20),XTP(45),YTP(45),TP(10),V(2,40),R(2,40)
      DIMENSION LCNT(9),LCNT1(9)
C
C
C
      EQUIVALENCE (XTP   ,A(401)),(YTP    ,A(451)),(PCON   ,A(210)),
     1            (RCNTR ,A(138)),(V      ,A(601)),(R      ,A(701)),
     2            (LCNT  ,A(041))
C
      ICNTR  = RCNTR + 0.01
      IF ((ICNTR.GT.1) PCON = 0.
      IPCON  = PCON + 0.01
      LP     = 9
      IDF    = 4
C
C          READ DATA FILE
C
  100 READ (IDF,110) KARD(I),I=1,20
      IF (IPCON.EQ.1) WRITE (LP,110) KARD(I),I=1,20
  110 FORMAT (20A4)
      DECODE (80,120,KARD) ITEXT
  120 FORMAT (A1)
      IF (ITEXT.EQ.1HC) GO TO 100
      DECODE (80,130,KARD) ITEXT
  130 FORMAT (A4)
      IF (ITEXT.EQ.4HTPTX) ITPF = 1  ,  GO TO 200
      IF (ITEXT.EQ.4HTPTY) ITPF = 2  ,  GO TO 200
      IF (ITEXT.EQ.4HVOLT) ITPF = 1  ,  GO TO 300
      IF (ITEXT.EQ.4HOHMS) ITPF = 2  ,  GO TO 300
      IF (ITEXT.EQ.4HTEXT) GO TO 400
      IF (ITEXT.EQ.4HTERM) REWIND 4
      RETURN
C
C          TEST POINT DISPLAY POSITIONS X AND Y AXES
C
  200 CONTINUE
      IFLG   = 0
      IC     = 0
  210 READ (IDF,220) ICK,IF,(TP(I),I=1,7)
      IF (IPCON.EQ.1) WRITE (LP,220) ICK,IF,(TP(I),I=1,7)
  220 FORMAT (I2,I7,7F10.2)
      IF (ICK.EQ.-2) GO TO 100
      IF (ITPF.EQ.2) GO TO 240
      DO 230 I=1,7
  230 XTP(IC+I)= TP(I)
      GO TO 260
  240 CONTINUE
      DO 250 I=1,7
  250 YTP(IC+I)= TP(I)
  260 CONTINUE
      IC     = IC + 7
      GO TO 210
C
C          READ VOLTAGE AND RESISTANCE ARRAY SPECIFICATION CARDS
C
  300 CONTINUE
      IFLG   = 0
  310 READ (IDF,320) ICK,I1,I2,(KARD(I),I = 1,18)
      IF (IPCON.EQ.1) WRITE(LP,320) ICK,I1,I2,(KARD(I),I = 1,18)
  320 FORMAT (I2,I3,I3,18A4)
      IC     = 0
C
C          READ VOLTAGE AND RESISTANCE DATA CARDS
C
  330 READ(IDF,340) ICK,IF,(TP(I),I = 1,7)
      IF (IPCON.EQ.1) WRITE (LP,340) ICK,IF,(TP(I),I = 1,7)
  340 FORMAT (I2,I7,7F10.2)
      IF (ICK.EQ.-1) GO TO 310
```

```
      IF (ICK.EQ.-2) GO TO 100
      IF (ITPF.EQ.2) GO TO 360
C
C        READ VOLTAGE DATA INTO VOLTAGE ARRAY
C
      DO 350 I=1,7
  350 V(I2,IC+I) = TP(I)
      GO TO 380
C
C        READ RESISTANCE DATA INTO RESISTANCE ARRAY
C
  360 CONTINUE
      DO 370, I = 1,7
  370 R(I2,IC+I) = 1000.*TP(I)
  380 IC    = IC +.7
      GO TO 330
C
C              READ TEXT DATA INTO TEXT ARRAY
C
  400 CONTINUE
C
  405 CONTINUE
      IC=1
  450 READ(IDF,410) ICK,(KARD(I),I=1,16)
  410 FORMAT(I2,16A4,14X)
      KARD(17)=4HI
      IF ((IPCON.EQ.1).AND.(ICK.LE.-1)) WRITE (LP,410)
     1           ICK,(KARD(I),I=1,16)
      IF (ICK.EQ.-1) GO TO 405
      IF (ICK.EQ.-2) GO TO 100
      IF (IPCON.EQ.1) WRITE(LP,420) ICK,(KARD(I),I=1,17),IC
  420 FORMAT(I2,17A4,4X,I5)
      DO 430 J=1,17
      ITLIB(J,IC)=KARD(J)
  430 CONTINUE
      JFILE = ICK + 20
      WRITE(JFILE) KARD(I),I=1,17
      LCNT(ICK + 1) = IC
      IC=IC+1
      GO TO 450
      END
      SUBROUTINE QUE
      COMMON/THRUST/MODE,A(1000)
      COMMON/STEXT/KETEXT(17),INTEXT(17),ITLIB(17,200)
      DIMENSION LCNT(9)
C
C             PARAMETER INPUT
C
      EQUIVALENCE (QCN1 ,A(025)),(QCN2 ,A(026)),(QCN3 ,A(027)),
     1            (DELAY,A(030))
C
C            VARIABLE INPUTS
C
      EQUIVALENCE (LCNT ,A(041)),(ION  ,A(300)),(ITP  ,A(200)),
     1            (IMETER,A(204)),(T    ,A(001)),(JHELP,A(225))
C
C            VARIABLE OUTPUT
C
      EQUIVALENCE (IQCN1,A(021)),(IQCN2,A(022)),(IQCN3,A(023)),
     1            (IQCN4,A(024)),(MC1  ,A(031)),(MC2  ,A(032)),
     2            (MC3  ,A(033)),(MC4  ,A(034)),(MC5  ,A(035))
      IF (MODE.LE.-2) RETURN
      IF(MODE) 100,200,500
  100 CONTINUE
      QCN1  = 1.
      QCN2  = 1.
      QCN3  = 1.
      QCN4  = 1.
      DELAY = 1500.
      RETURN
  200 CONTINUE
      IQCN1  = QCN1 + 0.01
      IQCN2  = QCN2 + 0.01
      IQCN3  = QCN3 + 0.01
      IQCN4  = QCN4 + 0.01
      IQCN10 = IQCN1
      IDELY  = DELAY + 0.01
      TI    = 0.
      THELP = 0.
      JERFG = 0
      IRER  = 0
      IVER  = 0
C
C            REWIND TEXT STATEMENT FILES
C
      REWIND 20
      REWIND 21
      REWIND 22
      REWIND 23
```

```
        REWIND 24
        REWIND 25
        REWIND 26
C
C           READ IN COMMON TEXT BLOCK
C
        DO 220,J=1,LCNT(1)
        READ(20) ITLIB(I,J),I=1,17
  220 CONTINUE
        JLCNT = LCNT(2)
        DO 250 J=101,JLCNT + 100,1
        READ(21)ITLIB(I,J),I=1,17
  250 CONTINUE
        REWIND 20
        REWIND 21
        A(101) = LCNT(1)
        A(102) = LCNT(2)
        A(103) = LCNT(3)
        A(104) = LCNT(4)
        RETURN
  500 CONTINUE
C
C           DELAY - APPROX. 60 MILLISEC. IF IDELY = 1500
C
        DO 520 I=1,IDELY
        ID      = 2.+DELAY
  520 CONTINUE
C
        OCN1    = IOCN1
        OCN2    = IOCN2
        OCN3    = IOCN3
        OCN4    = IOCN4
C
        IF (JERFG.NE.0) GO TO 550
        MCS1    = MC1
        MCS2    = MC2
        MCS3    = MC3
        MCS4    = MC4
        MCS5    = MC5
  550 CONTINUE
C
C           RESISTANCE AND VOLTAGE  GROSS ERROR CHECKS
C
        IF ((I8N.NE.0).AND.(ITP.NE.0).AND.(IMETER.GE.9)) IRER=1
        IF (IRER.EQ.0) GO TO 522
        MC1 = 29 , MC2 = 30 , MC3 = 31 , MC4 = 32 , MC5 = 5
  522 CONTINUE
        IF ((I9N.EQ.0).AND.(ITP.NE.0).AND.(IMETER.LE.8)) IVER=1
        IF (IVER.EQ.0) GO TO 524
        MC1 = 5 , MC2 = 5 , MC3 = 34 , MC4 = 5 , MC5 = 5
  524 CONTINUE
        IF (I8N.NE.0) IVER = 0
        IF (I9N.EQ.0) IRER = 0
C
C       STUDENT HELP TEXT
C
        IF (JHELP.EQ.0) THELP = T
        IF (T.GT.THELP + 10.) JHELP = 0
        IF (JHELP.EQ.1) MC1=5 , MC2=5 , MC3=18 , MC4=5 , MC5=5
        JERFG = IVER + IRER + JHELP
C
        IF (JERFG.NE.0) GO TO 560
        MC1     = MCS1
        MC2     = MCS2
        MC3     = MCS3
        MC4     = MCS4
        MC5     = MCS5
  560 CONTINUE
C
C       COURSE FINISHED CHECK
C
        IF (INTEXT(1).EQ.4HFINI) IOCN1=5 , IOCN2=10 , IOCN3 = 1
C
C
        IF(IOCN10.EQ.IOCN1) GO TO 600
        JLCNT   = LCNT(IOCN1 + 1)
        JFILE   = 20 + IOCN1
        REWIND JFILE
        DO 540 J=101,JLCNT + 100,1
        READ(JFILE) ITLIB(I,J),I=1,17
  540 CONTINUE
        REWIND JFILE
  600 CONTINUE
        IOCN10 = IOCN1
        RETURN
        END
``` continued

```
SUBROUTINE DCOM

THIS ROUTINE COMPUTES TEST POINT SAMPLED

COMMON/THRUST/MODE,A(1000)
    COMMON/SWITCH/ISS1,ISS2,ISS3,ISS4,ISS5

DIMENSION V(2,40),R(2,40)
    DIMENSION DI1(14),DI2(14),DI3(14),IDI4(14),IDI5(14)
    LOGICAL DI1,DI2,DI3
    REAL METER

PARAMETER INPUTS

EQUIVALENCE (V    ,A(601)),(R    ,A(701)),(SFACT ,A(2081))

VARIABLE INPUTS

EQUIVALENCE (VOMA ,A(446))

VARIABLE OUTPUTS

EQUIVALENCE (ITP   ,A(200)),(TP    ,A(201)),(ATD   ,A(202)),
   1            (METER ,A(203)),(IMETER,A(204)),(FAIL  ,A(205)),
   2            (IFAIL ,A(206)),(IDI4  ,A(320)),(IDI5  ,A(3001)),
   3            (VOM   ,A(3401)),(BFO  ,A(3411)),(TUNE  ,A(3421)),
   4            (ATDPV ,A(215)),(ITPMPV,A(216))

IF (MODE) 100,200,500
100 CONTINUE
    ISET   = 2
    ICLEAR = 1
    SFACT  = 8.0
    JF     = 1
    FAIL   = 1.
    VOMLMT = 12.0
    RETURN
200 CONTINUE
C
C
C       IF IFAIL = 1, A NOMINAL CONDITION EXISTS
C
    IFAIL = FAIL + 0.01
C
C       INPUT DATA FROM CARD FILE AND REWIND UNITS
C       CALL IN DATA FROM FILE TDATA DURING THE FIRST RUN ONLY
C
    REWIND 20
    REWIND 21
    REWIND 22
    REWIND 23
    REWIND 24
    CALL DSTORE
C
    REWIND 20
    REWIND 21
    REWIND 22
    REWIND 23
    REWIND 24
C
500 CONTINUE
C
C       INPUT TEST POINT VIA DISCRETE INPUTS
C
C       SET DIS. INPUTS 123,124,125
C
    CALL DOUT(191,ISET)
    CALL DOUT(192,ISET)
C
    CALL DIN14(121,DI1)
    CALL DIN14(123,DI2)
    CALL DIN14(124,DI3)
    CALL DIN14(125,IDI4)
    CALL DIN14(126,IDI5)
C
C       COMPUTE CHASSIS TEST POINT
C
    I      = 0
510 I      = I + 1
    IF (DI1(I)) GO TO 530
    IF (I.EQ.14) GO TO 520
    GO TO 510
520 I      = 0
530 ITP    = I
    IF (ITP.NE.0) GO TO 650
C
    I      = 0
560 I      = I + 1
    IF (DI2(I)) GO TO 580
```

```
              IF (I.EQ.14) GO TO 570
              GO TO 560
        570   I      = 0
        580   IF (I.NE.0) ITP = I + 14 ;  GO TO 650
              I      = 0
        590   I      = I + 1
              IF (ID13(I)) GO TO 610
              IF(I.GE.7) GO TO 600
              GO TO 590
        600   I      = 0
        610   IF (I.NE.0) ITP = I + 28
        650   TP     = ITP
C
C                   COMPUTE VOM METER SCALE
C
              I      = 0
        700   I      = I + 1
              IF (ID14(I).LT.0) GO TO 720
              IF (I.GE.13) GO TO 710
              GO TO 700
        710   I      = 0
        720   IMETER = I
              METER  = IMETER
C
C                   CLEAR DIS. INPUTS 123,124,125
C
              CALL DOUT(121,ICLEAR)
              CALL DOUT(122,ICLEAR)
C
C                   OUTPUT ANALOG VOLTAGE TEST POINT READING
C
              IF (IMETER.EQ.0) ATD = 0.
              IF (IMETER.EQ.1) ATD = SFACT*V(IFAIL,ITP)
              IF (IMETER.EQ.2) ATD = SFACT*V(IFAIL,ITP)*0.1
              IF (IMETER.EQ.3) ATD = SFACT*V(IFAIL,ITP)*0.01
              IF (IMETER.EQ.4) ATD = SFACT*V(IFAIL,ITP)*0.001
              IF (IMETER.EQ.5) ATD=1.20*V(IFAIL,ITP)
              IF (IMETER.EQ.6) ATD= 1.0*V(IFAIL,ITP)
              IF (IMETER.EQ.7) ATD=.100*V(IFAIL,ITP)
              IF (IMETER.EQ.8) ATD=0.01*V(IFAIL,ITP)
              RM     = R(IFAIL,ITP)
C
              IF (IMETER.EQ.9) ATD = SFACT*RM/(10. + RM)
              IF (IMETER.EQ.10) ATD = SFACT*RM/(1000. + RM)
              IF (IMETER.EQ.11) ATD = SFACT*RM/(100000. + RM)
              IF (IMETER.EQ.12) ATD = SFACT*RM/(10000000. + RM)
              IF (ABS(ATD).GT.VOPLMT) ATD = SIGN(VOPLMT,ATD)
              IF (ITP.NE.0) ATDPV = ATD ; ITPMPV = ITP
              RETURN
              END
              SUBROUTINE INTRO
              COMMON/THRUST/MODE,A(1000)
              COMMON/STEXT/KETEXT(17),INTEXT(17),ITLIB(17,200)
              DIMENSION MCON(5),IN(80),INAME(30)

INTRODUCTION ROUTINE

VARIABLE INPUTS

EQUIVALENCE (IQCN1 ,A(021)),(IQCN2 ,A(022)),(IQCN3 ,A(023)),
             1            (JCRFG ,A(220)),(JYES  ,A(223)),(JNO   ,A(224)),
             2            (IT    ,A(001)),(JHELP ,A(225))

VARIABLE OUTPUTS
C
              EQUIVALENCE (MC1   ,A(031)),(MC2   ,A(032)),(MC3   ,A(033)),
             1            (MC4   ,A(034)),(MC5   ,A(035))
C
              IF(MODE.LE.-2) RETURN
              IF(MODE) 100,200,500
        100   CONTINUE
              RETURN
        200   CONTINUE
              IVISIT = 1
              IQCN3  = 1
        500   CONTINUE
              GO TO (510,520,530,540,550,560,570,580,600,600) IQCN2
              GO TO 1000
        510   CONTINUE
              MC1 = 109 ; MC2 = 109 ; MC3 = 109 ; MC4 = 109 ; MC5 = 109
C                   INITIAL TEST PATTERN
              CALL KEDISP(0)
              IF (JCRFG.EQ.1) IQCN2 = 2
              GO TO 1000
        520   CONTINUE
```

```
C           INTRODUCTION AND SUBJECT,S NAME INPUT
      CALL KEDISP(0)
      MC1 = 101 ; MC2 = 102 ; MC3 = 106 ; MC4 = 107 ; MC5 = 108
      DECODE (64,860,INTEXT) IN
  860 FORMAT(64A1)
      DO 870 J=1,64
      IF (IN(J).NE.1H ) GO TO 870
      IFN=J-1
      GO TO 875
  870 CONTINUE
  875 CONTINUE
      DECODE(IFN,865,INTEXT) INAME
  865 FORMAT(5A4)
      ITLIB(10,110) = INAME(1)
      ITLIB(11,110) = INAME(2)
      ITLIB(12,110) = INAME(3)
C
C           SAVE SUBJECTS NAME IN ITLIB LINE 13
C
      ITLIB(1,13) = INAME(1)
      ITLIB(2,13) = INAME(2)
      ITLIB(3,13) = INAME(3)
      ITLIB(8,103) = INAME(1)
      ITLIB(9,103) = INAME(2)
      IF(JCRFG.EQ.1) IGCN2 = 9      ; IGCN3 = 1
C
      GO TO 1000
  530 CONTINUE
      CALL KEDISP(0)
      GO TO (532,534) IQCN3
  532 CONTINUE
C           FIRST VISIT QUESTION
      MC1 = 103 ; MC2 = 104 ; MC3 =   5 ; MC4 =   5 ; MC5 = 5
      IF (JNO.EQ.1) IVISIT = 2
C
      IF (JCRFG.EQ.1) IGCN3 = 2
      GO TO 1000
  534 CONTINUE
      MC1 = 162 ; MC2 = 163 ; MC3 = 164 ; MC4 = 165 ; MC5 = 166
      IF(JCRFG.EQ.1) IGCN2 = 5 ; IQCN3 = 1
      IF ((JCRFG.EQ.1).AND.(IVISIT.EQ.2)) IGCN2 = 4
      GO TO 1000
  540 CONTINUE
C           INSTRUCTION REQUEST TEST
      MC1 = 150 ; MC2 = 151 ; MC3 = 5 ; MC4 = 5 ; MC5 = 5
      CALL KEDISP(0)
      IF(JCRFG.EQ.1) IGCN2 = 7
      IF ((JCRFG.EQ.1).AND.(JYES.EQ.1)) IGCN2 = 5 ; IGCN3 = 2 ; TI = T
      GO TO 1000
  550 CONTINUE
C           SYSTEM INSTRUCTION SEQUENCE
      CALL KEDISP(0)
      IF(JCRFG.EQ.1) IGCN3 = IGCN3 + 1
      IF (IQCN3.EQ.1) TI = T
      IF(IGCN3.EQ.1) MC1=110; MC2=111; MC3=112; MC4=113; MC5=5
      IF (IGCN3.EQ.2) MC1=130 ; MC2=131 ; MC3=132 ; MC4= 5 ; MC5= 5
      IF ((T.GT.TI+10.).AND.(IGCN3.EQ.2)) MC4 = 133
      IF (IGCN3.EQ.3) MC1=121 ; MC2=122 ; MC3=123 ; MC4=124 ; MC5=125
    1     ; TI = T
      IF (IGCN3.EQ.4) MC1=115 ; MC2= 5 ; MC3= 5 ; MC4= 5 ; MC5= 5
      IF ((T.GE.TI+2).AND.(IQCN3.EQ.4)) MC1=116 ; MC2=117 ; MC3=118
    1     ; MC4 = 119
      IF ((T.GE.TI+10.).AND.(IQCN3.EQ.4)) MC1=126 ; MC2=127 ; MC3=128
    1     ; MC4 = 120
      IF (IQCN3.EQ.5) MC1=135 ; MC2=136 ; MC3=137 ; MC4=138
      IF (IQCN3.EQ.6) MC1=139 ; MC2=140 ; MC3=141 ; MC4=142
      IF (IGCN3.GT.6) IGCN2 = 6 ; IGCN3 = 1
      GO TO 1000
  560 CONTINUE
C           REPEAT INSTRUCTIONAL BLOCK
      MC1 = 150 ; MC2 = 5 ; MC3 = 5 ; MC4 = 5; MC5 = 5
      CALL KEDISP(0)
      IF (JCRFG.EQ.1) IGCN2 = 7 ; IGCN3 = 1
      IF ((JCRFG.EQ.1).AND.(JYES.EQ.1)) IGCN2 = 5 ; IGCN3 = 4 ; TI = T
      GO TO 1000
  570 CONTINUE
C           1ST SYSTEM INSTRUCTION TEST
      MC1 = 143 ; MC2 = 144 ; MC3 = 145 ; MC4 = 5 ; MC5 = 5
      CALL KEDISP(0)
      IF (JCRFG.EQ.1) IQCN3 = IGCN3 + 1
      IF (IGCN3.GT.1) MC4 = 146
      IF ((IQCN3.EQ.2).AND.(INTEXT(1).EQ.4HTURN).AND.(JCRFG.EQ.1))
    1       IGCN2 = 8 ; IGCN3 = 1
      IF (IGCN3.EQ.3) IQCN2 = 5 ; IGCN3 = 2 ; TI = T
      GO TO 1000
  580 CONTINUE
C           2ND SYSTEM INSTRUCTION TEST
      MC1 = 147 ; MC2 = 148 ; MC3 = 149 ; MC4 = 5
      CALL KEDISP(0)
```

```
      IF (JCRFG.EQ.1) IOCN3 = IOCN3 + 1
      IF (IOCN3.GT.1) MC4 = 146
      IF (IOCN3.EQ.3) IOCN2 = 5 , IOCN3 = 2 , TI = T
      IF (INTEXT(1).EQ.4HHELP) IOCN2=10, IOCN3 = 1 , MC4=5 , JHFIP = 0
      GO TO 1000
  600 CONTINUE
C               HUMAN INTEREST BIT
      IF (((INAME(1).NE.ITLIB(1,153)).AND.(IOCN3.EQ.1)) IOCN2= 3
     1     , GO TO 1000
      IF (IOCN3.EQ.1) MC1 = 154 , MC2 = 155 , MC3 = 5, MC4=5 , MC5=5
      CALL KEDISP(0)
      IF (JCRFG.EQ.1) IOCN3 = IOCN3 + 1
      IF ((IOCN3.EQ.2).AND.(JYES.EQ.1)) MC1 = 156 , MC2 = 5
      IF ((IOCN3.EQ.2).AND.(JNO .EQ.1)) MC1 = 158 , MC2 = 5
      IF (IOCN3.GE.3) IOCN2 = 3 , IOCN3 = 1
      GO TO 1000
  800 CONTINUE
C               REPEAT INTRO MODULE
      CALL KEDISP(0)
      IF (JCRFG.EQ.1) IOCN3 = IOCN3 + 1
      IF (IOCN3.EQ.1) MC1=167 , MC2=168 , MC3=169 , MC4=5 , MC5=5
      IF (IOCN3.EQ.2) MC1=170 , MC2=171 , MC3=5
      IF (IOCN3.EQ.3) IOCN1=2 , IOCN2=1 , IOCN3=1
      IF ((JCRFG.EQ.1).AND.(JYES.EQ.1)) IOCN1=1, IOCN2=5 , IOCN3=2, TI=T
      GO TO 1000
 1000 CONTINUE
      RETURN
      END
C
      SUBROUTINE PRINT
      RETURN
      END
C
      SUBROUTINE RECORD
      RETURN
      END

SUBROUTINE SETUP
      COMMON/THRUST/MODE,A(1000)
      DIMENSION MCON(5),IDIS(14)

VARIABLE INPUTS

EQUIVALENCE (IOCN1 ,A(021)),(IOCN2 ,A(022)),(IOCN3 ,A(023)),
     1            (JCRFG ,A(220)),(JYES  ,A(223)),(JNO   ,A(224)),
     2            (VOL   ,A(340)),(BFO   ,A(341)),(TUNE  ,A(342)),
     3            (IDIS  ,A(300))

VARIABLE OUTPUTS

EQUIVALENCE (MCON  ,A(031))
      IF (MODE.LE.-2) RETURN
      IF (MODE) 100,200,500
  100 CONTINUE
      RETURN
  200 CONTINUE
      RETURN
  500 CONTINUE
C
      IF (IOCN2.LE.5) IOCN2 = 6
C
      GO TO (510,520,530,540,550,560,570,580) IOCN2
      GO TO 1000
  510 CONTINUE
C               ON-OFF VOLUME TEST
      MCON(1) = 101 , MCON(2) = 106 , MCON(3)= 102 , MCON(4) = 105
      CALL KEDISP(0)
      IF ((JCRFG.EQ.1).AND.(VOL.LT.10.)) IOCN2 = 2 , IOCN3 = 1
      IF ((JCRFG.EQ.1).AND.(VOL.GT.10.)) IOCN3 = 2
      IF ((JCRFG.EQ.1).AND.(VOL.LT.-1.)) IOCN3 = 3
      IF(IOCN3.EQ.2) MCON(1) = 107
      IF(IOCN3.EQ.3) MCON(1) = 108
      GO TO 1000
  520 CONTINUE
C               BFO SETTING TEST
      MCON(1) = 103 , MCON(2) = 109
      CALL KEDISP(0)
      IF ((JCRFG.EQ.1).AND.(BFO.LT.10.)) IOCN2 = 3 , IOCN3 = 1
      IF ((JCRFG.EQ.1).AND.(BFO.GT.10.)) IOCN3 = 2
      IF ((JCRFG.EQ.1).AND.(BFO.LT.-1.)) IOCN3 = 3
      IF (IOCN3.EQ.2) MCON(1) = 110
      IF (IOCN3.EQ.3) MCON(1) = 111
      GO TO 1000
  530 CONTINUE
C               MODE SETTING TEST
      MCON(1) = 104 , MCON(2) = 112
      CALL KEDISP(0)
      IF ((JCRFG.EQ.1).AND.(IDIS(3).LT.0)) IOCN2 = 4 , IOCN3 = 1
```

```
      IF ((JCRFG.EQ.1).AND.(IDI5(3).GE.0)) IQCN3 = 2
      IF (IQCN3.EQ.2) MCON(1) = 113
      GO TO 1000
  540 CONTINUE
C                 BAND SELECT KNOB TEST
      MCON(1) = 103 ; MCON(2) = 114
      CALL KEDISP(0)
      IF ((JCRFG.EQ.1).AND.(IDI5(2).LT.0)) IQCN2 = 5 ; IQCN3 = 1
      IF ((JCRFG.EQ.1).AND.(IDI5(2).GE.0)) IQCN3 = 2
      IF (IQCN3.EQ.2) MCON(1) = 115
      GO TO 1000
  550 CONTINUE
C                 MAIN TUNER TEST
      MCON(1) = 104 ; MCON(2) = 116
      CALL KEDISP(0)
      IF ((JCRFG.EQ.1).AND.(TUNE.LT.10.)) IQCN2 = 6 ; IQCN3 = 1
      IF ((JCRFG.EQ.1).AND.(TUNE.GT.10.)) IQCN3 = 2
      IF ((JCRFG.EQ.1).AND.(TUNE.LT.-1.)) IQCN3 = 3
      IF (IQCN3.EQ.2) MCON(1) = 117
      IF (IQCN3.EQ.3) MCON(1) = 118
      GO TO 1000
  560 CONTINUE
C                 ALTERNATE SET UP PROCEDURE
      MCON(1)=129; MCON(2)=125; MCON(3)=126; MCON(4)=127; MCON(5)=128
      CALL KEDISP(0)
      IF (JCRFG.EQ.1) IQCN2 = 7 ; IQCN3 = 1
      GO TO 1000
  570 CONTINUE
C                 FINAL CHECK
      IF (IQCN3.EQ.1) MCON(1) = 120 ; MCON(2) = 121
      CALL KEDISP(0)
      IF (JCRFG.EQ.0) GO TO 1000
      IQCN3 = 3
      IF (IDI5(3).EQ.0) IQCN3 = 2 ; MCON(1) = 113 ; MCON(2) = 130
      IF (IDI5(2).EQ.0) IQCN3 = 2 ; MCON(1) = 115 ; MCON(2) = 130
      IF (TUNE.GT.10.) IQCN3 = 2 ; MCON(1) = 117 ; MCON(2) = 130
      IF (TUNE.LT.4.0) IQCN3 = 2 ; MCON(1) = 118 ; MCON(2) = 130
      IF (BFO.GT.10.) IQCN3=2 ; MCON(1) = 110 ; MCON(2) = 130
      IF (BFO.LT.4.0) IQCN3=2 ; MCON(1) = 111 ; MCON(2) = 130
      IF (VOL.GT.10.) IQCN3 = 2 ; MCON(1) = 107 ; MCON(2) = 130
      IF (VOL.LT.4.0) IQCN3 = 2 ; MCON(1) = 108 ; MCON(2) = 130
      MCON(2) = 5
      IF (IQCN3.EQ.3) IQCN2 = 8 ; IQCN3 = 1
      GO TO 1000
  580 CONTINUE
C                 SETUP COMPLETION TEXT
      MCON(1)=123; MCON(2)=124; MCON(3)=131; MCON(4)=132 ; MCON(5)=133
      CALL KEDISP(0)
      IF (JCRFG.EQ.1) IQCN1 = 3 ; IQCN2 = 1 ; IQCN3 = 1
 1000 CONTINUE
      RETURN
      END
C
      SUBROUTINE VOM
      COMMON/THRUST/MODE,A(1000)
      COMMON/STEXT/KETEXT(17),INTEXT(17),ITLIB(17,200)
      DIMENSION MCON(5),IDI5(14),V(2,40),R(2,40)
C
C         PARAMETER INPUTS
C
C
C         VARIABLE INPUTS
C
      EQUIVALENCE (IQCN1 ,A(021)),(IQCN2 ,A(022)),(IQCN3 ,A(023)),
     1            (JCRFG ,A(220)),(JYES ,A(223)),(JNO ,A(224)),
     2            (IDI5 ,A(300)),(V ,A(601)),(R ,A(701)),
     3            (ITP ,A(200)),(T ,A(001)),(IMETER,A(204)),
     4            (ITPMPV,A(216))
C
C
C         VARIABLE OUTPUTS
C
      EQUIVALENCE (VOMN ,A(052)),(MDCN ,A(050)),(VALM ,A(051)),
     1            (IFAIL ,A(206)),(MC1 ,A(031)),(MC2 ,A(032)),
     2            (MC3 ,A(033)),(MC4 ,A(034)),(MC5 ,A(035)),
     3            (IUNTN ,A(054))
C
      IF (MODE.LE.-2) RETURN
      IF (MODE) 100,200,500
  100 CONTINUE
      RETURN
  200 CONTINUE
      CALL KEYIN(0,0,0,0,0)
      RETURN
  500 CONTINUE
      CALL KEDISP(0)
      IF ((INTEXT(1).EQ.4HOONE).AND.(JCRFG.EQ.1)) IQCN2= 6 ; IQCN3=1
     1          ; GO TO 1000
      GO TO (510,520,530,540,550,560) IQCN2
```

-continued

```
      GO TO 1000
  510 CONTINUE
C
C         INTRODUCTION AND VOM EXPERIANCE TEST
C
      IF(JCRFG.EQ.1) IOCN3 = IOCN3 + 1
      IF (IOCN3.EQ.1) MC1=101 , MC2=102 , MC3=103 , MC4= 5 , MC5=5
      IF (IOCN3.EQ.2) MC1=160 , MC2=161 , MC3=5
      IF (JYES.EQ.1) IOCN2 = 5 , IOCN3 = 1
      IF (JNO.EQ.1) IOCN2 = 2 , IOCN3 = 1
      GO TO 1000
  520 CONTINUE
C
C         VOM INSTRUCTION TEXT
C
      IF (JCRFG.EQ.1) IOCN3 = IOCN3 + 1
      IF (IOCN3.EQ.1) MC1=125 , MC2=126 , MC3=127 , MC4=128 , MC5=129
      IF (IOCN3.EQ.2) MC1=130 , MC2=131 , MC3= 5 , MC4= 5 , MC5= 5
      IF (IOCN3.EQ.3) MC1=132 , MC2=133 , MC3=134 , MC4= 5 , MC5= 5
      IF (IOCN3.EQ.4) MC1=135 , MC2=136 , MC3=192
      IF (IOCN3.EQ.5) MC1=137 , MC2=138 , MC3=139 , MC4=140 , MC5= 5
      IF (IOCN3.EQ.6) MC1=141 , MC2=142 , MC3=143 , MC4=144 , MC5=145
      IF (IOCN3.EQ.7) MC1=118 , MC2=119 , MC3= 5 , MC4= 5 , MC5= 5
      IF ((IOCN3.EQ.8).AND.(IMETER.LE.1)) MC4 = 120 , MC5=121
      IF ((IOCN3.EQ.8).AND.(IMETER.GE.2)) MC4 = 122 , MC5=193
      IF (IOCN3.EQ.9) MC1=109 , MC2=110 , MC3=111 , MC4=112 , MC5=113
      IF (IOCN3.EQ.10) MC1=104 , MC2=105 , MC3= 5 , MC4= 5 , MC5= 5
      IF ((IOCN3.LT.11).OR.(IOCN3.GT.12)) GO TO 526
      IF (JCRFG.EQ.1) CALL KEYIN(0,0,4,4,LFLG)
      IF (LFLG.EQ.0) MC4 = 106 , IOCN3 = 12
      IF (LFLG.GE.1) MC4 = 107 , IOCN3 = 11
      GO TO 1000
  526 IF (IOCN3.GE.13) IOCN2 = 3 , IOCN3 = 1
      GO TO 1000
  530 CONTINUE
C
          SAMPLE VOLTAGE MEASUREMENT

IFAIL = 1, MDCN = 0 , IPAR = 0 , ITPD = 24
      VOMN    = V(1,24) , IUNTN = 1 , IMSW = 2
      IF (ITP.NE.0) ITPM = ITP
      IF (JCRFG.EQ.1) IOCN3 = IOCN3 + 1
      IF (IOCN3.EQ.1) MC1=166 , MC2=167 , MC3=168 , MC4=169 , MC5=170
     1  , LFLG = -1
      IF (IOCN3.EQ.2) IOCN3 = 3 , MC4 = 5 , MC5 = 5
      IF (IOCN3.EQ.3) MC1=171 , MC2= 5 , MC3= 5 , MDCN = 1
      IF (IOCN3.GT.3) MDCN = 2
      IF ((IOCN3.GT.3).AND.(IOCN3.LT.100)) CALL KEYIN(1,0,24,ITPM,LFLG)
      IF ((IOCN3.LT.100).AND.(LFLG.EQ.0)) IOCN3 = 100
      IF (IOCN3.EQ.100) MC5 = 8
      IF (IOCN3.GT.100) IOCN2=4 , IOCN3=1 , MDCN = 0
      GO TO 1000
  540 CONTINUE

RESISTANCE MEASUREMENT INSTRUCTIONS

IF (JCRFG.EQ.1) IOCN3 = IOCN3 + 1
      MDCN = 0
      IF (IOCN3.EQ.1) MC1=146 , MC2=147 , MC3=148 , MC4=149 , MC5=150
      IF (IOCN3.EQ.2) MC1=156 , MC2=157 , MC3=158 , MC4= 5 , MC5= 5
      IF (IOCN3.EQ.3) MC1=123 , MC2=119 , MC3= 5
      IF ((IOCN3.EQ.4).AND.(IMETER.EQ.10))MC4=120 , MC5=121
      IF ((IOCN3.EQ.4).AND.(IMETER.NE.10)) MC4=124 , MC5=193
      IF (IOCN3.EQ.5) MC1=151 , MC2=152 , MC3=153 , MC4=154 , MC5=155
      IF (IOCN3.EQ.6) MC1=114 , MC2=115 , MC3=116 , MC4=117 , MC5= 5
      IF (IOCN3.EQ.7) MC1=162 , MC2=105 , MC3= 5 , MC4= 5
      IF (IOCN3.NE.8) GO TO 546
      IF (JCRFG.EQ.1) CALL KEYIN(0,1,6,6,LFLG)
      IF (LFLG.EQ.0) MC5 = 163
      IF (LFLG.GE.1) MC5 = 164 , IOCN3 = 1
  546 IF (IOCN3.EQ.9) IOCN2 = 5 , IOCN3 = 1
      GO TO 1000
  550 CONTINUE
C
C         SAMPLE RESISTANCE MEASUREMENT
C
      IF (JCRFG.EQ.1) IOCN3 = IOCN3 + 1
      IF (ITP.NE.0) ITPM = ITP
      VOMN   =      R(1,22) , IUNTN = 3
      IFAIL  = 1
      IF( IOCN3.EQ.1) MC1=175 , MC2=176 , MC3=177 , MC4=5   , MC5=5
     1 , MDCN = 1
      LFLG   = -1
      IF ((IOCN3.EQ.2).AND.(IMETER.EQ.9)) MC5=195
      IF ((IOCN3.EQ.2).AND.(IMETER.NE.9)) MC5=196
      IF ((IOCN3.EQ.3) MC1=178 , MC2=179 , MC3=5,MC5=5
      IF (IOCN3.GT.3) MDCN = 2
      IF ((IOCN3.GT.3).AND.(IOCN3.LT.100)) CALL KEYIN(1,1,22,ITPM,LFLG)
```

```
      IF ((IQCN3.LT.100).AND.(LFLG.EQ.0)) IQCN3 = 100
      IF (IQCN3.EQ.100) MC5 = 8
      IF (IQCN3.GT.100) IQCN2=6 ; IQCN3=1 ; MDCN = 0
      GO TO 1000
  560 CONTINUE
C
C         REPEAT VOM MODULE TEST
C
      MC1 = 194 ; MC2 =191; MC3 = 5 ; MC4 = 5 ; MC5 = 5
      MDCN   = 0 ; ITPMPV = 0
      IF (JCRFG.EQ.1) IQCN1 = 4 ; IQCN2 = 1 ; IQCN3 = 1
      IF ((JCRFG.EQ.1).AND.(JYES.EQ.1)) IQCN1 = 3
      GO TO 1000
  830 CONTINUE
C
C         CHECK DATA RESPONCE
C
      LFLG   =-1
      CALL KEYIN(1,IPAR,ITPD,ITPM,LFLG)
      MC1=5 ; MC2 = 5 ; MC3 = 5 ; MC4 = 5 ; MC5 = 5
      MDCN   = 2
      IF (LFLG.EQ.0) IQCN3 = 100
      GO TO 1000
  850 CONTINUE
      MC3 = 183
      IF (T.GE.TI + 5) IQCN2 = 2 ; IQCN3 = 1 ; MDCN = 0
 1000 CONTINUE
      RETURN
      END

C
      SUBROUTINE FDES
      COMMON/THRUST/MODE,A(1000)
      COMMON/STEXT/KETEXT(17),INTEXT(17),ITLIB(17,200)
      DIMENSION JBLK(6)
C
C         JBLK(1)    = HI FREQ. OSCIL. FLAG.
C         JBLK(2)    = MIXER FLAG
C         JBLK(3)    = IF AMP. FLAG
C         JBLK(4)    = AGC FLAG
C         JBLK(5)    = AUDIO FLAG
C         JBLK(6)    = POWER SUPPLY FLAG
C
C
C         INPUT VARIABLES
C
      EQUIVALENCE (T       ,A(001)),(ITP      ,A(200)),(JYES    ,A(223))
C
C         OUTPUT PARAMETERS
C
      EQUIVALENCE (IQCN1 ,A(021)),(IQCN2 ,A(022)),(IQCN3 ,A(023)),
     1            (LBLK  ,A(250)),(MC1   ,A(031)),(MC2   ,A(032)),
     2            (MC3   ,A(033)),(MC4   ,A(034)),(MC5   ,A(035)),
     3            (JCRFG ,A(220)),(ITPD  ,A(207)),(ITPMPV ,A(216))
      IF (MODE.LE.-2) RETURN
      IF (MODE) 100,200,500
  100 CONTINUE
      RETURN
  200 CONTINUE
      CALL KEYIN(0,0,0,0,0)
      DO 210 IJK=1,6
      JBLK(IJK) = 0
  210 CONTINUE
      ITPM    = 0
      RETURN
  500 CONTINUE
      IF (ITP.NE.0) ITPM = ITP
C
C         TEST POINT TO FUNCTION BLOCK DECODER
C
      IF (ITPM.GT.0) IBLKM = 5
      IF ((ITPM.GE.29).AND.(ITPM.LE.31)) IBLKM = 1
      IF ((ITPM.GE.1 ).AND.(ITPM.LE.4 )) IBLKM = 2
      IF ((ITPM.GE.5 ).AND.(ITPM.LE.10)) IBLKM = 3
      IF ((ITPM.GE.11).AND.(ITPM.LE.12)) IBLKM = 4
      IF ((ITPM.GE.22).AND.(ITPM.LE.24)) IBLKM = 6
C
      CALL KEDISP(0)
      GO TO (510,520,530,540,550,560,570,580,590,600,
     1       610,620,630,640,650,660) IQCN2
      GO TO 1000
  510 CONTINUE
C         INTRODUCTION
      IF (JCRFG.EQ.1) IQCN3 = IQCN3 + 1
      IF (IQCN3.EQ.1) MC1=51 ; MC2=52 ; MC3=53 ; MC4=54 ; MC5=55
      IF (IQCN3.EQ.2) MC1=57 ; MC2=58 ; MC3=59 ; MC4=60 ; MC5=61
      IF (IQCN3.EQ.3) MC1=89 ; MC2=90 ; MC3=14 ; MC4=5 ; MC5=5
      ITLIB(4,14)=ITLIB(1,13) ; ITLIB(5,14)=ITLIB(2,13)
     1            ; ITLIB(6,14) = ITLIB(3,13)
```

```
            IF (IQCN3.EQ.4) IQCN2=2 , IQCN3=1 , MC3=5
            CALL FUND(0,0,0)
            GO TO 1000
      520 CONTINUE
    C           HI FREQ. OSCIL. TEST
            IBLK   = 1    , ITPD  = 29  , LBLK = 2
            GO TO 900
      530 CONTINUE
    C          MIXER TEST
            IBLK  = 2   , ITPD  = 4
            GO TO 900
      540 CONTINUE
    C         SKIP REST OF TEXT TEST
            MC1    = 62  , MC2 = 63 , MC3=5 , MC4=5 , MC5=5
            IF (JCRFG.EQ.1) IQCN2 = IQCN2 + 1
            IF (INTEXT(1).EQ.4HD9NE) IQCN2 = 9 , LBLK = 0
            GO TO 1000
      550 CONTINUE
    C           IF TEST PT. TEST
            IBLK   = 3   , ITPD= 6
            GO TO 900
      560 CONTINUE
    C       AGC
    C       AGC TEST PT. TEST
            IBLK   = 4  , ITPD= 12
            GO TO 900
      570 CONTINUE
    C         AUDIO TEST PT. TEST
            IBLK   = 5     , ITPD = 26
            GO TO 900
      580 CONTINUE
    C        POWER SUPPLY TEST PT. TEST
            IBLK   = 6  , ITPD = 24
            LBLK   = 0
            GO TO 900
      590 CONTINUE
    C              INTRODUCTION OF RECEIVER OPERATION
            IF (JCRFG.EQ.1) IQCN3 = IQCN3 + 1
            IF (IQCN3.EQ.1) MC1=110 , MC2=111 , MC3=112 , MC4=5 , MC5=5
           1   ,   ITPM = 0 , ITPD = 0
            IF (JYES.EQ.1) IQCN1=5 , IQCN2=1 , IQCN3=1
            IF (IQCN3.EQ.2) MC1=113 , MC2=114 , MC3=115
            IF (IQCN3.EQ.3) MC1=116 , MC2=117 , MC3=118
            IF (IQCN3.EQ.4) MC1=120 , MC2=121 , MC3=122 , MC4=5 , MC5=5
            IF (IQCN3.EQ.5) MC1=124 , MC2=125 , MC3=126 , MC4=127
            IF (IQCN3.GE.6) IQCN2 =10  , IQCN3= 1
            GO TO 1000
      600 CONTINUE
    C          HI FREQ. OSCILLATOR TEST
            IBLK   = 1 , ITPD = 29
            GO TO 800
      610 CONTINUE
    C             MIXER TEST
            IBLK   = 2 , ITPD = 4
            GO TO 800
      620 CONTINUE
    C             IF STAGE TEST
            IBLK   = 3 , ITPD = 6
            GO TO 800
      630 CONTINUE
    C             AGC TEST
            IBLK   = 4 , ITPD = 12
            GO TO 800
      640 CONTINUE
    C             AUDIO TEST
            IBLK   = 5 , ITPD = 26
            GO TO 800
      650 CONTINUE
    C             POWER SUPPLY TEST
            IBLK   = 6 , ITPD = 24
            GO TO 800
      660 CONTINUE
            LBLK   = 0
            MC1=189 , MC2=5 , MC3=5 , MC4=5 , MC5=5
            IF (JCRFG.EQ.0) GO TO 1000
            IF (INTEXT(1).EQ.4HN0 ) IQCN1=5 , IQCN2=1 , IQCN3 = 1,GO TO 1000
            IQCN2 = 9 , IQCN3 = 1 , ITPM=0
            DO 602 IJK=1,6
            JBLK(IJK)=0
      602 CONTINUE
            GO TO 1000
      800 CONTINUE
            IF ((INTEXT(1).EQ.4HD0NE).AND.(JCRFG.EQ.1)) IQCN2=16 , IQCN3=1
           1   , GO TO 1000
            GO TO (810,820,830,840,850) IQCN3
            GO TO 1000
      810 CONTINUE
    C            PREVIOUS FUNCTIONAL DESCRIPTION TEST.
    C
```

```
        IF (JBLK(IBLK).EQ.1) IQCN3=2 ; TI=T ; MC2=5; MC3=5; MC4=5;MC5=5
       1        ; GO TO 820
        IFLAG = JBLK(IBLK)
        LBLK  = 1
        CALL FUND(1,IBLK,IFLAG)
        JBLK(IBLK) = IFLAG
        GO TO 1000
    820 CONTINUE
C              CORRECT BLOCK/TEST PT. TEST AND TEST TEXT
        MC1 = 170 + IBLK
        IF (ITPM.EQ.0) GO TO 1000
        IF (ITPM.EQ.ITPD) GO TO 840
        IF (IBLKM.EQ.IBLK) GO TO 830
        TI   = T
        GO TO 850
    830 CONTINUE
C              RIGHT BLOCK,WRONG TEST PT. TEXT
        IQCN3 = 3
        MC3 = 178 ; MC4 = 178 + IBLK ; MC5 = 185 ; IQCN3 = 2
        GO TO 1000
    840 CONTINUE
C              RIGHT TEST PT. AND BLOCK TEXT
        IQCN3 = 4
        MC3 = 186 ; MC4 = 178 + IBLK ; MC5 = 5
        IF (JCRFG.EQ.1) GO TO 860
        GO TO 1000
    850 CONTINUE
C              TEST FAILURE CONDITION
        IQCN3 = 2 ; MC3 = 64 + IBLKM
        ITPM  = 0
        GO TO 1000
    860 CONTINUE
        ITPM  = 0
        IQCN2 = IQCN2 + 1 ; IQCN3 = 1 ; LBLK = 0 ; ITPMPV = 0
        GO TO 1000
    900 CONTINUE
C              TEST PT. FAMILIARIZATION TEST AND TEXT
        IF (JCRFG.EQ.1) IQCN2 = IQCN2 + 1 ; MC5 = 5 ; ITPMPV = 0
        IF ((JCRFG.EQ.1).AND.(INTEXT(1).EQ.4HDONE)) IQCN2=9 ; IQCN3=1 ;
       1        LBLK = 0 ; GO TO 1000
        CALL FUND(1,IBLK,1)
        MC2   = 74 + IBLK
        MC3   = 5
        IF (IBLK.EQ.1) MC3 = 64
        IF (IBLK.EQ.2) MC3 = 74
        IF (ITPD.EQ.ITPM) GO TO 1000
        IF (ITPD.EQ.ITPM) MC5 = 81 + IBLK ; GO TO 1000
        IF (IBLKM.EQ.IBLK) MC5 = 71 ; GO TO 1000
        MC5   = 64 + IBLKM
        GO TO 1000
   1000 CONTINUE
        ITPO  = ITPM
        RETURN
        END
        SUBROUTINE EXAM1
        COMMON/THRUST/MODE,A(1000)
        COMMON/STEXT/KETEXT(17),INTEXT(17),ITLIB(17,200)
        DIMENSION MCON(5),IDIS(14),V(2,40),R(2,40)
C
C
C              PARAMETER INPUTS
C
C
C              VARIABLE INPUTS
C
        EQUIVALENCE (IQCN1 ,A(021)),(IQCN2 ,A(022)),(IQCN3 ,A(023)),
       1            (JCRFG ,A(220)),(JYES  ,A(223)),(JNO   ,A(224)),
       2            (IDIS  ,A(300)),(V     ,A(601)),(R     ,A(701)),
       3            (ITP   ,A(200))
C
C              VARIABLE OUTPUTS
C
        EQUIVALENCE (MCON  ,A(031)),(MDCN  ,A(050)),(VALM  ,A(051)),
       1            (IFAIL ,A(206)),(IUNTN ,A(054)),(VOMN  ,A(052)),
       2            (YL1   ,A(151)),(YL2   ,A(152)),(ITPD  ,A(207)),
       3            (ITPMPV,A(216))
C
        IF (MODE.LE.-2) RETURN
        IF (MODE) 100,200,500
    100 CONTINUE
        RETURN
    200 CONTINUE
        IPAR = 0
        NTP  = 0
        RETURN
    500 CONTINUE
        IFAIL = 2
        IUNTN = 1
        IF (IQCN3.EQ.1) MDCN = 1
``` continued

```
      IF (IGCN3.GE.2) MDCN = 2
      IF (IGCN3.GE.101) MDCN = 0
      CALL KEDISP(0)
      IF(JCRFG.EQ.1) IQCN3 = IQCN3 + 1
      IF (IQCN3.EQ.101) MCBN(5) = 5
      IF (IQCN2.NE.IQCN28) ITPMPV = 0
      IQCN28 = IQCN2
      GO TO (510,520,530,540,550,560,570,580,590,600) IQCN2
      GO TO 1000
  510 CONTINUE
C          FAILURE SYMPTOMS
      ITLIB(2,141) = ITLIB(1,13)  , ITLIB(3,141) = ITLIB(2,13)
      ITLIB(4,141) = ITLIB(3,13)
      IF (IGCN3.EQ.1) MCBN(1)=141, MCBN(2)=142, MCBN(3)=143, MCBN(4)=5
     1  , MCBN(5) = 5
      ITPMPV = 0
      MDCN  = 0 , NTP = 0
      IF (IQCN3.EQ.2) MCBN(1)= 103 , MCBN(2) = 104 , MCBN(3)=5
      IF (IQCN3.GE.3) IQCN2 = 2 , IQCN3 = 1
      GO TO 1000
  520 CONTINUE
C
C          POWER SUPPLY TEST
C
      YL1  = 1.0 , YL2  = 0.95
      IF (IQCN3.EQ.1) MCBN(3)=115, MCBN(4)=116, MCBN(5)=112
      NTP  = 24
      IF (IQCN3.EQ.100) MCBN(3)=145 , MCBN(4)=146 , MCBN(5)=147
      IF (IQCN3.EQ.101) MCBN(3)=148 , MCBN(4)=149 , MCBN(5)=150
      IF (IQCN3.GE.102) IQCN2 = 3 , IQCN3 = 1 , MDCN = 0
      GO TO 1000
  530 CONTINUE
C
C          CHECK Q3 EMMITTER
C
      IF (IQCN3.EQ.1) MCBN(3)=120 , MCBN(4) = 121 , MCBN(5)=5
      NTP  = 7
      IF (IQCN3.EQ.100) MCBN(3)=151 , MCBN(4)=152 , MCBN(5)= 5
      IF (IQCN3.GE.101) IQCN2 = 4 , IQCN3 = 1 , MDCN = 0
      GO TO 1000
  540 CONTINUE
C          CHECK EMMITTER OF Q4
      IF (IQCN3.EQ.1) MCBN(3)= 122, MCBN(4)=5, MCBN(5)=5
      NTP  = 10
      IF (IQCN3.EQ.100) MCBN(3)=153 , MCBN(4)=154 , MCBN(5)= 5
      IF (IQCN3.GE.101) IQCN2 = 5 , IQCN3 = 1 , MDCN = 0
      GO TO 1000
  550 CONTINUE
C          CHECK COLLECTOR OF Q5
      IF (IQCN3.EQ.1) MCBN(3)=123 , MCBN(4)=5
      NTP  = 12
      IF (IQCN3.EQ.101) MCBN(3)=124 , MCBN(4)=125, MCBN(5)=126
      IF (IQCN3.GT.101) IQCN2 = 6 , IQCN3 = 1 , MDCN = 0
      GO TO 1000
  560 CONTINUE
C          CHECK DRAIN OF Q2
      IF (IQCN3.EQ.1) MCBN(3)=127, MCBN(4)=5, MCBN(5)=5
      NTP  = 4
      IF (IQCN3.EQ.100) MCBN(3)=155 , MCBN(4)=156 , MCBN(5)=157
      IF (IQCN3.EQ.101) MCBN(3)=158 , MCBN(4)=159 , MCBN(5)= 5
      IF (IQCN3.EQ.102) MCBN(3)=160 , MCBN(4)=161 , MCBN(5)=162
      IF (IQCN3.GE.103) IQCN2 =10 , IQCN3 = 1 , MDCN = 0
      GO TO 1000
  570 CONTINUE
C          CHECK GATE 1 OF Q2
      IF (IQCN3.EQ.1) MCBN(3)= 129
      NTP  = 2
      IF (IQCN3.GT.100) IQCN2 = 8 , IQCN3 = 1 , MDCN = 0
      GO TO 1000
  580 CONTINUE
C          CHECK GATE 2 OF Q2
      MCBN(3) = 130 , MCBN(4) = 131
      NTP  = 1
      IF (IQCN3.GT.100) IQCN2 = 9 , IQCN3 = 1 , MDCN = 0
      GO TO 1000
  590 CONTINUE
          CHECK SOURCE OF Q2
      MCBN(3) = 132 , MCBN(4) = 133
      NTP  = 3
      IF(IQCN3.GT.100) MDCN = 0
      IF (IQCN3.EQ.101) MCBN(3)=134, MCBN(4)=135, MCBN(5)=136
      IF (IQCN3.EQ.102) MCBN(3)=137, MCBN(4)=138, MCBN(5)=5
      IF (IQCN3.GE.103) IQCN2 = 10 , IQCN3 = 1
      GO TO 1000
  600 CONTINUE
          THE END
      YL1  = 0.25 , YL2  = 0.2
      MCBN(1)=139 , MCBN(2)= 140 , MCBN(3)=5 , MCBN(4)= 5 , MCBN(5)=5
```

```
         MDCN    = 0
         ITLIB(12,140) = ITLIB(1,13)
         ITLIB(13,140) = ITLIB(2,13)
         ITLIB(14,140) = ITLIB(3,13)
         GO TO 1000
    00 CONTINUE
         ITPD    = NTP
         VOMN    = V(1,NTP)
         IF (JYES.EQ.1) IOCN2 = 1 , IOCN3 = 1 , ITPMPV = 0
         LFLG    =-1
         IF (ITP.NE.0) ITPM = ITP
         IF((NTP.NE.0).AND.(IOCN3.LT.100).AND.(IOCN3.GT.1))
      1      CALL KEYIN(1,IPAR,NTP,ITPM,LFLG)
         IPASS   = 0
         IF ((IOCN3.LT.100).AND.(LFLG.GE.0).AND.(LFLG.LE.2)) IOCN3 = 100
         RETURN
         END
         SUBROUTINE KEYIN(LEV,I,ITPD,ITPMI,LFLG)
         COMMON/THRUST/MODE,A(1000)
         COMMON/STEXT/KETEXT(17),INTEXT(17),ITLIB(17,200)
         DIMENSION MCON(5),IDIS(14),V(2,40),R(2,40),IN(20)

C        DATA INPUT CODE
C           LEV    -    ERROR TEST LEVEL
C           I      -    DESIRED PARAMETER  0-VOLTS , 1- RESISTANCE
C           ITPD   -    DESIRED TEST POINT
C           ITPMI  -.   TEST POINT ACTUALLY MEASURED
C           LFLG   -.   OUTPUT FLAG DENOTING STUDENT RESPONSE
C        DATA OUTPUT FLAG (LFLG) CODE
C           0      DATA INPUT IN TOLERANCE
C           1      DATA INPUT EXCEEDS LOWER TOLERANCE
C           2      DATA INPUT EXCEEDS UPPER TOLERANCE
C           3      DATA FROM WRONG MEASURED PARAMETER
C           4      DATA FROM WRONG TEST POINT
C           5      HUMAN MEASUREMENT ERROR
C           6      SYNTEX ERROR, NO DECIMAL POINT
C
C
C           PARAMETER INPUTS
C
C
C           VARIABLE INPUTS
C
         EQUIVALENCE ((IOCN1  ,A(021)),(IOCN2  ,A(022)),(IOCN3  ,A(023)),
      1              (JCRFG  ,A(220)),(JYES   ,A(223)),(JNO    ,A(224)),
      2              (IDIS   ,A(300)),(V      ,A(601)),(R      ,A(701)),
      3              (ITP    ,A(200)),(IFAIL  ,A(206)),(IMETER ,A(204)),
      4              (SFACT  ,A(208)),(ATDPV  ,A(215)),(ITPMPV ,A(216)))
C
C           VARIABLE OUTPUTS
C
         EQUIVALENCE ((MCON   ,A(031)),(MDCN   ,A(050)),(VALM   ,A(051)),
      1              (VOMN   ,A(052)),(IUNTM  ,A(055)),(ERM    ,A(060)),
      2              (ERPAR  ,A(061)),(ERTP   ,A(062)))
C
         IF (MODE.LE.-2) RETURN
         IF (MODE) 100,200,500
    100 CONTINUE
         RETURN
    200 CONTINUE
         VML     = 0.1*SFACT
         VMH     = 0.9*SFACT
         LFLGO   =-1
         RETURN
    500 CONTINUE
         ITPM    = ITPMI
         IF (JCRFG.EQ.0) RETURN
C
C           DECODE INPUT FROM S-50 KEYBOARD
C
         IUNTM   = 0
         DECODE(16,520,INTEXT) IN
    520 FORMAT (16A1)
         IDPFG   = 0
         DO 530 INK=1,16
         IF (IN(INK).EQ.1H.) IDPFG = 1
         IF (IN(INK).NE.1HK) GO TO 530
         INKK    = INK - 1
         IUNTM   = 1
         GO TO 540
    530 CONTINUE
         INKK    = 16
    540 CONTINUE
C
C        DECIMAL POINT ERROR TEXT
C
         IF (IDPFG.EQ.0) LFLGO = 6 , LFLG = 6 , VALM = 0. , GO TO 1100
C
         DECODE (INKK,550,INTEXT) VALM
```

```
  550 FORMAT (F9.2)
      IF (IUNTM.EQ.1) VALM = 1000.*VALM
C
C            COMPUTE NOMINAL AND TOLERANCE LEVELS
C
      TOL    = 0.1
      VNOM   = V(1,ITPM) ; VOMOUT = V(IFAIL,ITPM)
      IF (I.EQ.1) VNOM = R(1,ITPM) ; VOMOUT = R(IFAIL,ITPM)
      TOLL   = VNOM - TOL*ABS(VNOM)
      TOLH   = VNOM + TOL*ABS(VNOM)
      VOMN   = VNOM
      IF (I.EQ.1) VOMN = 0.001*VNOM
      LFLGO  = 0
      IF (VALM.LT.TOLL) LFLGO = 1
      IF (VNOM.NE.VOMOUT) LFLGO = 1
      IF (VALM.GT.TOLH) LFLGO = 2
      IF (ITPM.NE.ITPD) LFLGO = 4
      IF ((I.EQ.0).AND.(IMETER.GT.4)) LFLGO = 3
      IF ((I.EQ.1).AND.(IMETER.LT.9)) LFLGO = 3
  000 LFLG   = LFLGO
      IF ((LFLG.GE.0).AND.(LFLG.LE.2)) LFLGO = -1
C
C            SET WRONG SCALE OR WRONG TEST PT. TEXT
C
      IF (LEV.EQ.0) RETURN
      IF (LFLG.EQ.0) MCON(5) = 23
      IF ((LFLG.LT.1).OR.(LFLG.GT.2)) GO TO 1100
C
C            COMPUTE MEASUREMENT ERROR
C
      EMIN   = 0.1
      IF (I.EQ.1) EMIN = 1.
      EMTOL  = 0.05*ABS(VOMOUT)
      IF (EMTOL.LT.EMIN) EMTOL = EMIN
      ERMES  = ABS(VOMOUT) - VALM
      ERMES  = ABS(ERMES)

MCON(5) = 24
      IF (ERMES.LT.EMTOL) GO TO 1100
            MEASUREMENT ERROR TEXT
      IF ((ABS(ATDPV).LT.VML).AND.(I.EQ.0)) MCON(4) = 26
      IF ((ATDPV.GT.VMH).AND.(I.EQ.1)) MCON(4) = 27
      MCON(5) = 20
      LFLG = 5 ; LFLGO = 5

1100 CONTINUE
      IF (LFLG.EQ.3) MCON(5) = 21 ; ERPAR = ERPAR + 1.
      IF (LFLG.EQ.4) MCON(5) = 22 ; ERTP = ERTP + 1.
      IF (LFLG.EQ.6) MCON(5) = 19
C
      IF (IGCN1.NE.5) RETURN
      WRITE(9,1200) IGCN1,IGCN2,IGCN3,LFLG,VOMOUT,VALM
 1200 FORMAT (4I6,2F9.2)
C
      RETURN
      END
C
      SUBROUTINE FUND(ICL,IUNIT,IFLAG)
      COMMON/THRUST/MODE,A(1000)
C
C            ICL     = CLEAR FLAG
C            IUNIT   = FUNCTIONAL BLOCK DESIGNATOR
C            IFLAG   = INSTRUCTIONAL COMPLETION FLAG
C
C            TO INITIALIZE THIS ROUTINE CALL FUND(0,0,0)
C
      DIMENSION X(20),Y(20)
      DIMENSION MCON(5)
C
C            OUTPUT VARIABLES
C
      EQUIVALENCE (MCON  ,A(031)),(JCRFG ,A(220)),(LBLK  ,A(250)),
     1            (NXY   ,A(251)),(X     ,A(260)),(Y     ,A(280)),
     2            (T     ,A(001))
C
      IF (ICL.NE.0) GO TO 500
      LATCH = 0
      RETURN
  500 CONTINUE
      IF ((LATCH.EQ.0).AND.(IFLAG.EQ.0)) LATCH = 1 ; TI = T ; IGCN3 = T
      IF (JCRFG.EQ.1) IGCN3 = IGCN3 + 1
      GO TO (510,520,530,540,550,560) IUNIT
      LBLK = 0
      GO TO 1000
  510 CONTINUE
C     H F. OSCILLATOR
      MCON(1) = 101
      X(1)=.10
      X(2)=.10
```

```
            X(3)=.41
            X(4)=.41
            X(5)=.10
            Y(1)=.49
            Y(2)=.75
            Y(3)=.75
            Y(4)=.49
            Y(5)=.49
            NXY=5
            IF (IFLAG.EQ.1) GO TO 1000
            MCON(1)=101 ; MCON(2) = 128 ; MCON(3) = 129 ; MCON(4) = 130
            MCON(5)=131
            IF (IQCN3.EQ.2)MCON(2)=132 ; MCON(3)=133;MCON(4)=5 ; MCON(5)=5
            IF (IQCN3.EQ.3) IFLAG = 1 ; LATCH = 0 ; GO TO 800
            GO TO 1000
    520 CONTINUE
C      MIXER
            MCON(1) = 103
            X(1)=.02
            X(2)=.02
            X(3)=.35
            X(4)=.35
            X(5)=.02
            Y(1)=.76
            Y(2)=.99
            Y(3)=.99
            Y(4)=.76
            Y(5)=.76
            NXY=5
            IF (IFLAG.EQ.1) GO TO 1000
            MCON(1)=103 ; MCON(2) = 134 ; MCON(3) = 135 ; MCON(4) = 136
            MCON(5)=137
            IF (IQCN3.EQ.2)MCON(2)=138;MCON(3)=139;MCON(4)=140;MCON(5)=141
            IF (IQCN3.EQ.3) IFLAG = 1 ; LATCH = 0 ; GO TO 800
            GO TO 1000
    530 CONTINUE
C      I F AMPLIFIER
            MCON(1) = 104
            X(1)=.35
            X(2)=.35
            X(3)=.47
            X(4)=.47
            X(5)=.705
            X(6)=.705
            X(7)=.45
            X(8)=.45
            X(9)=.35
            Y(1)=.76
            Y(2)=.88
            Y(3)=.88
            Y(4)=.96
            Y(5)=.96
            Y(6)=.71
            Y(7)=.71
            Y(8)=.76
            Y(9)=.76
            NXY=9
            IF (IFLAG.EQ.1) GO TO 1000
            MCON(1)=104 ; MCON(2) = 142 ; MCON(3) = 143 ; MCON(4) = 144
            MCON(5)=145
            IF (IQCN3.EQ.2) IFLAG = 1 ; LATCH = 0 ; GO TO 800
            GO TO 1000
    540 CONTINUE
C      A G C AMPLIFIER
            MCON(1) = 105
            X(1)=.74
            X(2)=.99
            X(3)=.99
            X(4)=.93
            X(5)=.93
            X(6)=.86
            X(7)=.86
            X(8)=.74
            X(9)=.74
            Y(1)=.98
            Y(2)=.98
            Y(3)=.68
            Y(4)=.68
            Y(5)=.65
            Y(6)=.65
            Y(7)=.68
            Y(8)=.68
            Y(9)=.98
            NXY=9
            IF (IFLAG.EQ.1) GO TO 1000
            MCON(1)=105 ; MCON(2) =146 ; MCON(3) =147 ; MCON(4) =148
            MCON(5) = 5
            IF (IQCN3.EQ.2) MCON(2)=149;MCON(3)=150;MCON(4)=151;MCON(5)=152
            IF (IQCN3.EQ.3) IFLAG = 1 ; LATCH = 0 ; GO TO 800
            GO TO 1000
```

```
    550 CONTINUE
C       AUDIO
        MCON(1)   = 106
        X(1)=.46
        X(2)=.73
        X(3)=.74
        X(4)=.99
        X(5)=.99
        X(6)=.68
        X(7)=.68
        X(8)=.46
        X(9)=.46
        Y(1)=.70
        Y(2)=.70
        Y(3)=.70
        Y(4)=.70
        Y(5)=.48
        Y(6)=.48
        Y(7)=.52
        Y(8)=.52
        Y(9)=.70
        NXY=9
        IF (IFLAG.EQ.1) GO TO 1000
        MCON(1)=106 , MCON(2) =153 , MCON(3) =154 , MCON(4) = 5
        MCON(5) = 5
        IF (IQCN3.EQ.2) MCON(2)=155; MCON(3)=156; MCON(4) = 157
        IF (IQCN3.EQ.3) MCON(2)=158; MCON(3)=159;MCON(4)=160;MCON(5)=161
        IF (IQCN3.EQ.4) IFLAG = 1 ; LATCH =0 ; GO TO 800
        GO TO 1000
    560 CONTINUE
C       POWER SUPPLY
        MCON(1)  = 107
        X(1)=.63
        X(2)=.63
        X(3)=.98
        X(4)=.98
        X(5)=.63
        Y(1)=.25
        Y(2)    = 0.48
        Y(3)    = 0.48
        Y(4)=.25
        Y(5)=.25
        NXY=5
        IF (IFLAG.EQ.1) GO TO 1000
        MCON(1)=107; MCON(2)=162 , MCON(3)=163 , MCON(4)=164 , MCON(5)=165
        IF (IQCN3.EQ.2) MCON(2)=166;MCON(3)=167;MCON(4)=168; MCON(5)=169
        IF (IQCN3.EQ.3) IFLAG = 1 ; LATCH = 0 ; GO TO 800
        GO TO 1000
    800 CONTINUE
C       DIPLAY TEXT CLEAR
        MCON(1)=5 , MCON(2)=5 , MCON(3)=5 , MCON(4)=5 , MCON(5)=5
        GO TO 1000
   1000 CONTINUE
        RETURN
        END
```

What is claimed is:

1. Automated instructional apparatus for teaching a student by manipulation of at least one operating control to operate equipment including a plurality of equipment points normally maintained at predetermined conditions and for teaching a student to operate a tester of the equipment capable of indicating the point conditions, said apparatus comprising in combination:

equipment simulation means for simulating said equipment including test points for simulating said equipment points;

control simulation means for simulating said operating control;

control detection means for sensing the position of the control simulation means and for generating digital control condition signals representing the position of the control simulation means;

control storage means for storing the control condition signals;

test point storage means for storing digital test point condition signals representing a simulated condition at each of said test points;

tester simulation means for simulating said tester and for indicating the simulated conditions at the test points in response to a tester indicating signal;

selector means for selecting at least one of the test points for indication by the tester simulation means;

instruction means for presenting instructions to the student; and data processing means for enabling the instruction means to present a first instruction requesting the student to move the control simulation means to a first position, for scanning the control storage means to detect the actual position to which the student moves the control simulation means, for comparing the first position to the actual position, for enabling the instruction means to present an instruction informing the student about the results of the comparing, and for transmitting to the tester simulation means a tester simulating signal derived from the digital test point condition signals corresponding to the one test point selected by the selection means, whereby the tester and equipment are realistically simulated and the errors in the student's movement of the control simulation means can be detected and communicated to the student, so that the student is readily taught to operate an actual piece of equipment and a tester.

2. Apparatus, as claimed in claim 1, wherein the operating control comprises an equipment operating control and wherein the control simulation means simulates the equipment operating control, whereby student errors in operating the equipment simulation means can be communicated to the student.

3. Apparatus, as claimed in claim 1, wherein the operating control comprises a tester operating control and wherein the control simulation means simulates the tester operating control, whereby errors in operating the tester simulation means can be communicated to the student.

4. Apparatus, as claimed in claim 3, wherein the control simulation means comprises tester control means for identifying a desired sensitivity of the tester simulation means to the tester indicating signal, wherein the control detection means comprises means for sensing the state of the tester control means and for generating a digital tester control signal representing the state of the tester control means, wherein the control storage means comprises means for storing the digital tester control signal, and wherein the data processing means comprises means for altering the tester indicating signal depending on the state of the tester control means, whereby errors in selecting the sensitivity of the tester simulation means can be communicated to the student.

5. Apparatus, as claimed in claim 1, wherein the data processing means further comprises means for recording errors made by the student during the movement of the control simulation means.

6. Apparatus, as claimed in claim 1, wherein the data processing means comprises means for enabling the instruction means to repeat the first instruction in response to an error by the student in moving the control simulation means.

7. Apparatus, as claimed in claim 1, wherein the data processing means comprises menas for storing remedial instructions and means for enabling the instruction means to display the remedial instructions in response to a predetermined number of errors by the student in moving the control simulation means.

8. Apparatus, as claimed in claim 1, wherein the data processing means comprises means for enabling the student to skip the first instruction, whereby instructions already familiar to the student can be omitted.

9. Apparatus, as claimed in claim 1, wherein the test point storage means comprises means for storing digital test point failure condition signals representing a simulated failure condition on at least one of the test points at the same time that a digital test point condition signal is stored in connection with the one test point.

10. An automated method of instructing a student to manipulate at least one operating control in order to learn the use of a piece of equipment having a plurality of points normally maintained at predetermined conditions and the use of a tester for the equipment, said method comprising the steps of:
  simulating the equipment, points, operating control and tester;
  storing digital test point condition signals having values representing a simulated condition at each of the points;
  requesting the student to move the simulated operating control to a first position;
  comparing the first position with the position to which the student moves the operating control;
  informing the student about the results of the comparison;
  selecting at least one of the points for indication by the simulated tester; and
  indicating on the simulated tester the condition of the one point, whereby the student learns to operate the tester and equipment by manipulating the simulated operating control.

11. A method, as claimed in claim 10, wherein the operating control comprises an equipment operating control and wherein the step of simulating the operating control comprises the step of simulating the equipment operating control, whereby student errors in operating the simulated equipment are communicated to the student.

12. A method, as claimed in claim 10, wherein the operating control comprises a tester operating control and wherein the step of simulating the operating control comprises the step of simulating the tester operating control whereby student errors in operating the simulated tester are communicated to the student.

13. A method, as claimed in claim 12, wherein the tester operating control comprises a detector for sensing the condition of the equipment points, wherein the step of simulating the tester operating control comprises the step of simulating the detector, wherein the step of requesting comprises the step of requesting the student to move the simulated detector to a first predetermined simulated point, and wherein the step of comparing comprises the step of comparing the first predetermined simulated point with the simulated point on which the student actually places the detector.

14. A method, as claimed in claim 13, and further comprising the steps of:
  displaying a diagram or pictorial representation of said equipment to the student; and
  identifying on said diagram or pictorial representation the simulated test point touched by the simulated detector.

15. A method, as claimed in claim 10, wherein the step of storing digital test point condition signals comprises the step of storing a digital test point failure condition signal having a value representing a simulated failure condition at a predetermined point.

16. A method, as claimed in claim 10, and further comprising the step of accumulating and recording errors made by the student in the movement of the simulated operating control.

17. A method, as claimed in claim 10, and further comprising the step of repeating the step of requesting in response to a predetermined number of errors made by the student in the movement of the simulated operating control.

18. A method, as claimed in claim 10, and further comprising the steps of:
  storing remedial instructions; and
  displaying the remedial instructions to the student in response to a predetermined number of errors made by the student in the movement of the simulated operating control.

19. Automated instructional apparatus for teaching a student to evaluate equipment having a plurality of points normally maintained at predetermined conditions by means of a device capable of sensing the conditions of the points and a tester capable of indicating the point conditions sensed by the detector, said apparatus comprising in combination:
  equipment simulation means for simulating said equipment including test points for simulating said equipment points;
  test point storage means for storing digital test point condition signals representing a simulated condition at each of said test points;

tester simulation means for simulating said tester and for indicating the simulated conditions at the test points;
a detector adapted to communicate with the test points;
detection storage means for storing a different digital test point identification signal for each test point communicated with by the detector;
display means for presenting a graphic illustration of the equipment, including the test points; and
data processing means for sequentially scanning the detection storage means to determine the test point communicated with by the detector, generating a tester indicating signal corresponding to the digital test point condition signal representing the test point communicated with by the detector, transmitting the tester indicating signal to the tester simulation means, and enabling the display means to indicate on the graphic illustration the test point communicated with by the detector, whereby the indicating means indicates the simulated condition at the test point communicated with by the detector so that the tester simulation means responds to the equipment simulation means in the same manner as an actual tester would respond to an actual piece of equipment and whereby the student is graphically informed of the relationship between the equipment and the test point communicated with by the detector.

20. Apparatus, as claimed in claim 19, wherein the display means comprises a cathode ray tube and wherein the graphic illustration is fixed to the face of the cathode ray tube.

21. Automated instructional apparatus for teaching a student to operate equipment including a plurality of equipment points normally maintained at predetermined conditions and a tester of the equipment capable of indicating the point conditions, including a detector for sensing the condition of the equipment points, said apparatus comprising in combination:
    equipment simulation means for simulating said equipment including test points for simulating said equipment points;
    detector simulation means movable by the student for communicating with the test points and for selecting at least one of the test points for indication;
    means for generating a different test point identification signal for each test point communicated with by the detector simulation means;
    control storage means for storing the digital test point identification signals;
    test point storage means for storing digital test point condition signals representing a simulated condition at each of said test points;
    tester simulation means for simulating said tester and for indicating the simulated conditions at the test point selected by the detector simulation means in response to a tester indicating signal;
    instruction means for presenting instructions to the student; and
    data processing means for enabling the instruction means to present a first instruction requesting the student to move the detector simulation means to a first test point, for scanning the control storage means to determine the actual test point communicated with by the detector simulation means, for comparing the first test point to the actual test point, for enabling the instruction means to present an instruction informing the student about the results of the comparing, and for transmitting to the tester simulation means a tester indicating signal corresponding to the digital test point condition signal representing the test point communicated with by the detector simulation means, whereby the tester and equipment are realistically simulated and the errors in the student's movement of the detector simulation means to the proper test point can be detected and communicated to the student, so that the student is readily taught to operate an actual piece of equipment and a tester.

22. Automated instructional apparatus for teaching a student by manipulation of at least one continuous operating control to operate equipment including a plurality of equipment points normally maintained at predetermined conditions and for teaching a student to operate a tester of the equipment capable of indicating the point conditions, said apparatus comprising in combination:
    equipment simulation means for simulating said equipment including test points for simulating said equipment points;
    control simulation means for simulating said continuous operating control and for generating an analog voltage which varies continuously as the position of the control simulation means is changed;
    control detection means including an analog-to-digital converter for converting the analog voltage to a digital control condition signal representing the position of the control simulation means;
    control storage means for storing the control condition signal;
    test point storage means for storing digital test point condition signals representing a simulated condition at each of said test points;
    tester simulation means for simulating said tester and for indicating the simulated conditions at the test points in response to a tester indicating signal;
    selector means for selecting at least one of the tester points for indication by the tester simulation means;
    instruction means for presenting instructions to the student; and
    data processing means for enabling the instruction means to present a first instruction requesting the student to move the control simulation means to a first position, for scanning the control storage means to detect the actual position to which the student moves the control simulation means, for comparing the first position to the actual position, for enabling the instruction means to present an instruction informing the student about the results of the comparing, and for transmitting to the tester simulation means a tester simulating signal derived from the digital test point condition signals corresponding to the one test point selected by the selection means, whereby the tester and equipment are realistically simulated and the errors in the student's movement of the control simulation means can be detected and communicated to the student, so that the student is readily taught to operate an actual piece of equipment and a tester.

* * * * *